US012208684B2

(12) United States Patent
Kim et al.

(10) Patent No.: US 12,208,684 B2
(45) Date of Patent: Jan. 28, 2025

(54) VEHICLE INFORMATION DISPLAY APPARATUS AND METHOD

(71) Applicant: HYUNDAI MOBIS CO., LTD., Seoul (KR)

(72) Inventors: Tae Hun Kim, Seongnam-si (KR); Sung Joon Ahn, Seongnam-si (KR); Seung Hwan Lee, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 409 days.

(21) Appl. No.: 17/507,518

(22) Filed: Oct. 21, 2021

(65) Prior Publication Data

US 2022/0118851 A1 Apr. 21, 2022

(30) Foreign Application Priority Data

Oct. 21, 2020 (KR) ........................ 10-2020-0136790
Oct. 21, 2020 (KR) ........................ 10-2020-0136791
Oct. 21, 2020 (KR) ........................ 10-2020-0136792
Oct. 21, 2020 (KR) ........................ 10-2020-0136793
Oct. 21, 2020 (KR) ........................ 10-2020-0136794

(51) Int. Cl.
*B60K 35/28* (2024.01)
*B60K 35/00* (2006.01)
*B60K 35/60* (2024.01)
*B60K 35/80* (2024.01)

(52) U.S. Cl.
CPC .............. *B60K 35/00* (2013.01); *B60K 35/28* (2024.01); *B60K 35/60* (2024.01); *B60K 35/80* (2024.01); *B60K 2360/167* (2024.01); *B60K 2360/566* (2024.01); *B60K 2360/782* (2024.01)

(58) Field of Classification Search
CPC ............... B60J 3/04; G02B 2027/0118; B60K 2370/1529; B60K 2370/27; B60R 2300/205; G01C 21/365
See application file for complete search history.

(56) References Cited

U.S. PATENT DOCUMENTS 10,688,915 B1 * 6/2020 Rastoll ..................... B60Q 1/28
2010/0289634 A1 * 11/2010 Ikeda ..................... B60Q 9/005 340/441
2011/0106365 A1 * 5/2011 Miyake ................. B60K 35/00 345/593
2011/0178700 A1 * 7/2011 Park .................. G01C 21/3611 701/533

(Continued)

FOREIGN PATENT DOCUMENTS

JP 2007010498 A * 1/2007

OTHER PUBLICATIONS

Translation of Yosuke JP 2007010498, year 2007.*

*Primary Examiner* — Kenneth J Malkowski
(74) *Attorney, Agent, or Firm* — Novo TechIP International PLLC

(57) ABSTRACT

A vehicle information display apparatus may include: an input unit configured to receive driving speed information of a vehicle; a memory configured to store a program for performing speed-based mobile phone screen control by using the driving speed information of the vehicle; and a processor configured to execute the program. The processor may adjust the transparency or button size of the mobile phone screen according to the driving speed of the vehicle.

4 Claims, 80 Drawing Sheets

(56) References Cited

U.S. PATENT DOCUMENTS

| | | | | |
|---|---|---|---|---|
| 2013/0093860 | A1* | 4/2013 | Shimotani | G06F 3/0416 348/51 |
| 2014/0313218 | A1* | 10/2014 | Lee | G09G 5/10 345/589 |
| 2015/0062175 | A1* | 3/2015 | Kim | G06F 3/04886 345/639 |
| 2015/0192424 | A1* | 7/2015 | Kuo | G01C 21/367 701/454 |
| 2018/0022292 | A1* | 1/2018 | Lowell | B60R 11/02 224/276 |
| 2023/0017486 | A1* | 1/2023 | Homma | B60R 16/02 |

* cited by examiner

Description
- WHEN 10 SECONDS HAVE PASSED WITH NO MANIPULATION AFTER ACTIVATION, BUTTONS ARE REMOVED, AND ONLY INFORMATION IS DISPLAYED (AREA 1) - WHEN INACTIVATED, BUTTONS ON BOTH SIDES ARE REMOVED - WHEN INACTIVATED, BUTTONS ON BOTH SIDES ARE REMOVED

VEHICLE INFORMATION DISPLAY APPARATUS AND METHOD

CROSS-REFERENCE TO RELATED APPLICATIONS

This application claims priority to and the benefit of Korean Patent Applications No. 10-2020-0136790, No. 10-2020-0136791, No. 10-2020-0136792, No. 10-2020-0136793, No. 10-2020-0136794, filed on Oct. 21, 2020, the disclosure of which is incorporated herein by reference in its entirety.

BACKGROUND OF THE INVENTION

1. Field of the Invention

The present disclosure relates to a vehicle information display apparatus and method.

2. Discussion of Related Art

According to the related art, the size of a display in a vehicle has been gradually increased with the improvement in shape of the vehicle. Furthermore, a technology of utilizing the entire area across a display, windshield and window as a display has been developed.

Depending on a driving environment or a user's needs, various pieces of traveling information or infotainment information need to be properly displayed. However, the related art has a limitation in that it displays only limited information.

BRIEF SUMMARY OF THE INVENTION

Various embodiments are directed to a vehicle information display apparatus and method which can display vehicle information according to a driving condition and a user's needs.

In an embodiment, a vehicle information display apparatus may include: an input unit configured to receive driving speed information of a vehicle; a memory configured to store a program for performing speed-based mobile phone screen control by using the driving speed information of the vehicle; and a processor configured to execute the program. The processor may adjust the transparency or button size of the mobile phone screen according to the driving speed of the vehicle.

The processor may adjust transparency levels of some areas displayed on the mobile phone screen according to the driving speed of the vehicle in consideration of a preset range of reference speed, and lower the transparency levels as the driving speed of the vehicle increases.

The processor may adjust the sizes of buttons displayed on the mobile phone screen according to the driving speed of the vehicle in consideration of a preset range of reference speed, and increase the button sizes as the driving speed of the vehicle increases.

When it is checked that a user's hand approaches the mobile phone, the processor may increase the button sizes.

In another embodiment, a vehicle information display method may include the steps of: (a) receiving driving speed information of a vehicle; and (b) adjusting at least one of the transparency and button size of the screen of a mobile phone mounted on a steering wheel, by using the driving speed information of the vehicle.

The step (b) may include adjusting transparency levels of some areas displayed on the mobile phone screen according to the driving speed information of the vehicle in consideration of a preset range of reference speed, and lowering the transparency levels as the driving speed of the vehicle increases.

The step (b) may include adjusting the sizes of buttons displayed on the mobile phone screen according to the driving speed information of the vehicle in consideration of a preset range of reference speed, and increasing the button sizes as the driving speed of the vehicle increases.

The step (b) may include increasing the button sizes when it is checked that a user's hand approaches the mobile phone.

In accordance with the embodiments of the present disclosure, the vehicle information display apparatus and method may enable a user to perform a pre-setting operation on the internal display of a vehicle through a mobile phone app interworking with a vehicle device, control the internal display to display a driving safety pop-up screen, set/remove a focus on the internal display screen, control the internal display screen according to voice recognition or independent mode setting, and control the mobile phone screen for each driving speed, thereby increasing the user's convenience.

The effects of the present disclosure are not limited to the above-mentioned effects, and other effects which are not mentioned herein will be clearly understood by those skilled in the art from the following descriptions.

DETAILED DESCRIPTION OF THE INVENTION

The advantages and characteristics of the present disclosure and a method for achieving the advantages and characteristics will be clearly described through the following embodiments with reference to the accompanying drawings.

However, the present disclosure is not limited to the following embodiments, but may be implemented in various shapes different from each other, and the following embodiments are only provided to easily deliver the purposes, configurations and effects of the present disclosure to those skilled in the art to which the present disclosure pertains. Therefore, the scope of the present disclosure is defined by claims.

Terms used in this specification are used for describing embodiments, and not intended to limit the present disclosure. The terms of a singular form may include plural forms unless referred to the contrary. The meaning of 'comprise' and 'comprising' used in the specification specifies a component, step, operation, and/or element but does not exclude the presence or addition of other components, steps, operations, and/or elements.

Figure 1:
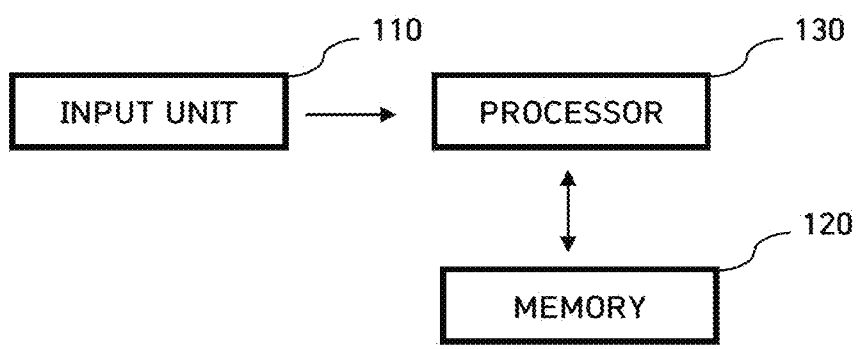
FIG. 1 is a diagram illustrating a vehicle information display apparatus in accordance with an embodiment of the present disclosure.

FIG. 1 is a diagram illustrating a vehicle information display apparatus in accordance with an embodiment of the present disclosure.

The vehicle information display apparatus in accordance with the embodiment of the present disclosure includes an input unit configured to receive at least one of a user request signal and driving condition information, a memory configured to store a program for displaying a driving safety pop-up screen according to the user request information or the driving condition information, and a processor configured to execute the program. The processor recommends a function corresponding to the driving condition information when the driving condition information is used.

The processor changes and displays at least any one of the color, size and blink of a rotation icon button, in consideration of heading information of a vehicle based on a navigation route.

The processor displays a wiper tab on the driving safety pop-up screen in consideration of weather information.

The processor displays a door/window tab on the driving safety pop-up screen in consideration of driving route information.

The processor changes and displays at least any one of the color, size and blink of an auto parking icon button, in consideration of destination arrival information.

The processor extracts essential information from information displayed on an internal display screen before the driving safety pop-up screen is displayed, and displays the extracted information at the top of the driving safety pop-up screen.

The processor controls the display of the driving safety pop-up screen according to a preset pop-up priority.

A vehicle information display method in accordance with an embodiment of the present disclosure includes step (a) of receiving at least any one of a user request signal and driving condition information and step (b) of displaying a driving safety pop-up screen according to the user request signal or the driving condition information.

When heading information of a vehicle based on a navigation route is received in step (a), a display method of a rotation icon button on the driving safety pop-up screen is changed in step (b).

When weather information is received in step (a), a wiper tab is displayed on the driving safety pop-up screen in step (b).

When driving route information is received in step (a), a door/window tab is displayed on the driving safety pop-up screen in step (b).

When destination arrival information is received in step (a), a display method of an auto parking icon button is changed on the driving safety pop-up screen in step (b).

Step (b) includes extracting essential information from information displayed on an internal display screen before the driving safety pop-up screen is displayed, and displaying the extracted information at the top of the driving safety pop-up screen.

Step (b) includes controlling the display of the driving safety pop-up screen in consideration of a preset pop-up priority.

FIGS. 2 to 16 illustrate a driving safety pop-up screen display process and UIs (User Interfaces) accompanied by the process, in accordance with the embodiment of the present disclosure.

Figure 2:
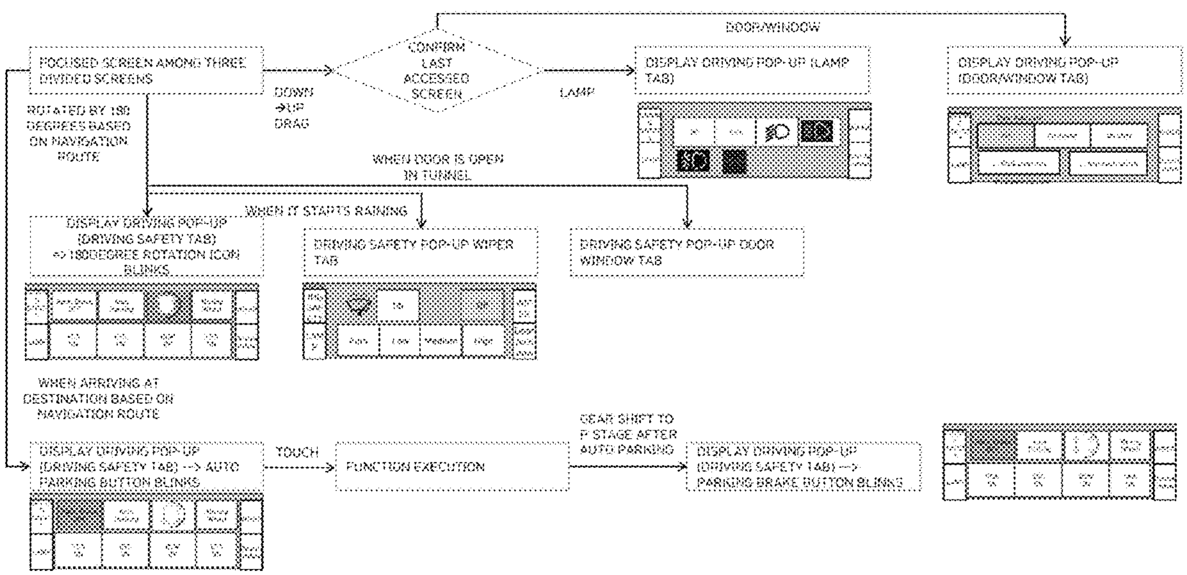
FIGS. 2 to 16 are diagrams illustrating examples in which a driving safety pop-up screen is displayed in accordance with an embodiment of the present disclosure.

Referring to FIG. 2, a user checks the last accessed screen for a focused screen in the area of an internal display.

When a door/window screen is the last accessed screen, the driving safety pop-up screen, related to the door/window tab for controlling the on/off of door or window, on speed, and on shift, is displayed.

When a lamp screen is the last accessed screen, the driving safety pop-up screen related to a lamp tab for controlling a high beam, fog light and taillight is displayed.

When the vehicle is rotated by 180 degrees on the basis of a navigation route, a driving safety tab is displayed as a pop-up screen, the color of a 180-degree rotation icon button is changed and displayed, or the 180-degree icon button is displayed blinking.

When it is sensed that it is raining, the wiper tab is displayed as the driving safety pop-up screen, and icon buttons such as once, on/off, auto, low, medium and high buttons are displayed.

When it is checked that a window is open at the time of entering a tunnel, the door/window tab is displayed as the driving safety pop-up screen.

When the vehicle has arrived at a destination based on the navigation route, the driving safety tab is displayed as the driving safety pop-up screen, and an auto parking icon button is displayed in a different color, or displayed blinking.

When the auto parking icon button is pressed, au auto parking function is performed. Then, when the gear is shifted to P stage after the parking is completed, the color of a parking brake icon button is changed to a different color, or the corresponding icon button is displayed blinking.

Figure 3:
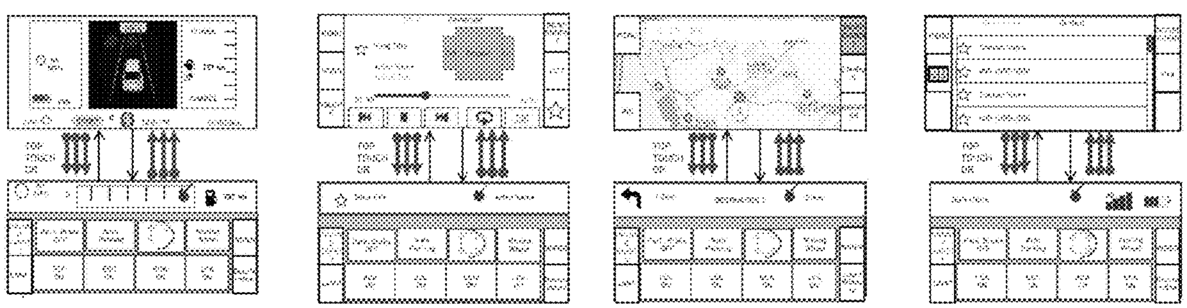

Referring to FIG. 3, the driving safety pop-up screen is displayed as an input is conducted by a preset method (e.g. drag with three fingers).

When the driving safety pop-up screen is displayed, essential information is extracted from information which has been displayed on the previous internal display screen, and displayed at the top of the driving safety pop-up screen.

For example, when the previous internal display screen is a cluster screen, speed information, gear information and distance-to-empty information are displayed at the top of the driving safety pop-up screen.

When the previous internal display screen is a media screen, a song title and artist information are displayed.

When the previous internal display screen is a navigation screen, route guide information, destination information and distance-to-empty information are displayed in the form of icons at the top of the driving safety pop-up screen.

When the previous internal display screen is a call history/contact screen, user information, communication state information and battery information are displayed at the top of the driving safety pop-up screen.

When the upper area of the driving safety pop-up screen is touched by the user, the driving safety pop-up screen disappears and returns to the previous screen.

Figure 4:
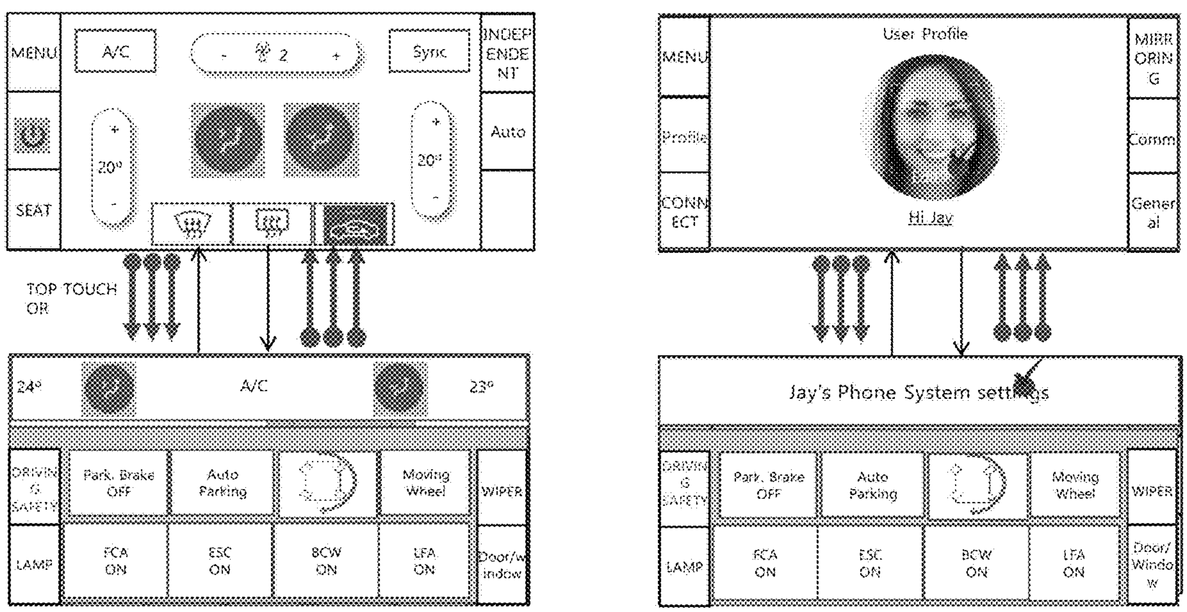

Referring to FIG. 4, when the previous internal display screen is an air conditioning screen, a driver seat setting temperature and a passenger seat setting temperature are displayed at the top of the driving safety pop-up screen.

When the previous internal display screen is a setting screen, user information and information on system settings by the corresponding user are displayed at the top of the driving safety pop-up screen.

Figure 5:
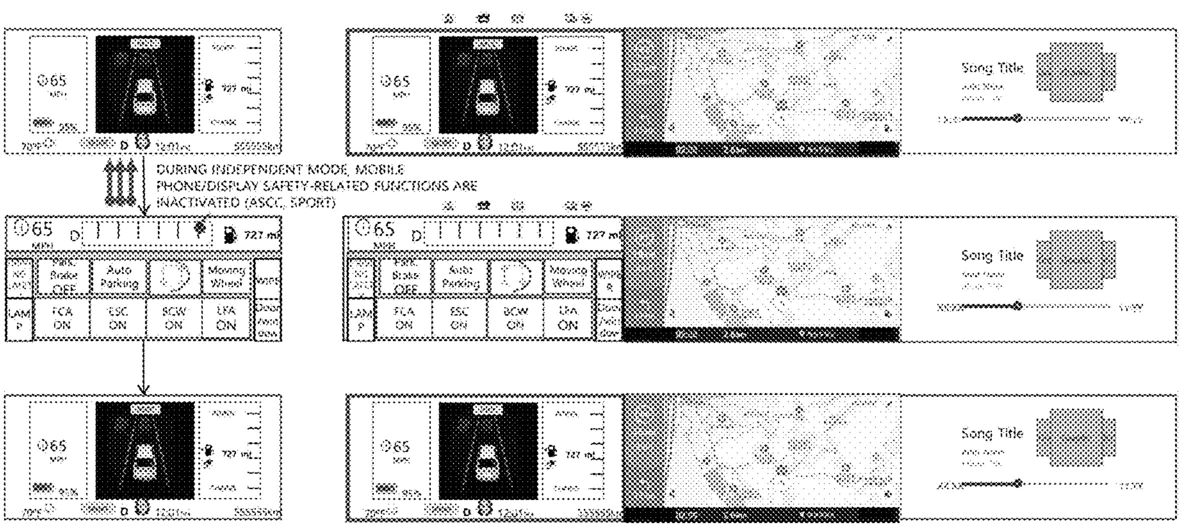

Referring to FIG. 5, no independent mode is present on the cluster screen, and the cluster screen is manipulated only through mirroring. As described above, only a focus change occurs on the basis of a preset time (e.g. 10 seconds).

The driving safety pop-up screen is displayed by a preset method (e.g. up/down drag with a user's three fingers). When the driving safety pop-up screen is displayed, the user may touch the upper area of the screen so as to return to the previous screen.

Figure 6:
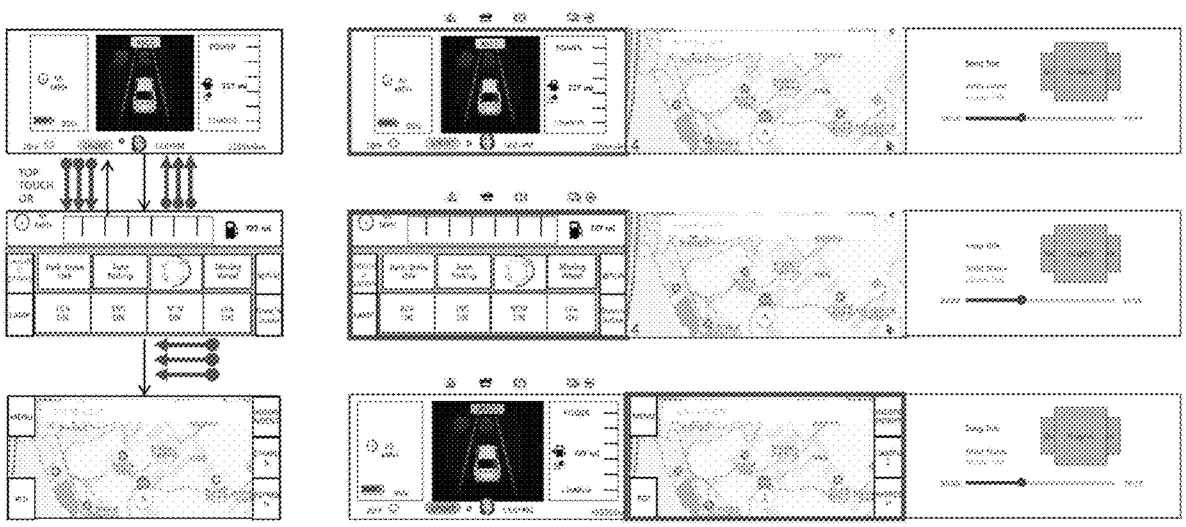

Referring to FIG. 6, the cluster screen is changed to the driving safety pop-up screen by a drag input based on the preset method.

The focused cluster screen is replaced with the driving safety pop-up screen and the cluster-related essential information displayed at the top of the driving safety pop-up screen. In this state, when right-to-left drag is conducted, the focus is moved to a first area.

At this time, when the driving safety pop-up screen is changed to another screen through the right-to-left drag, the driving safety pop-up is removed.

Figure 7:
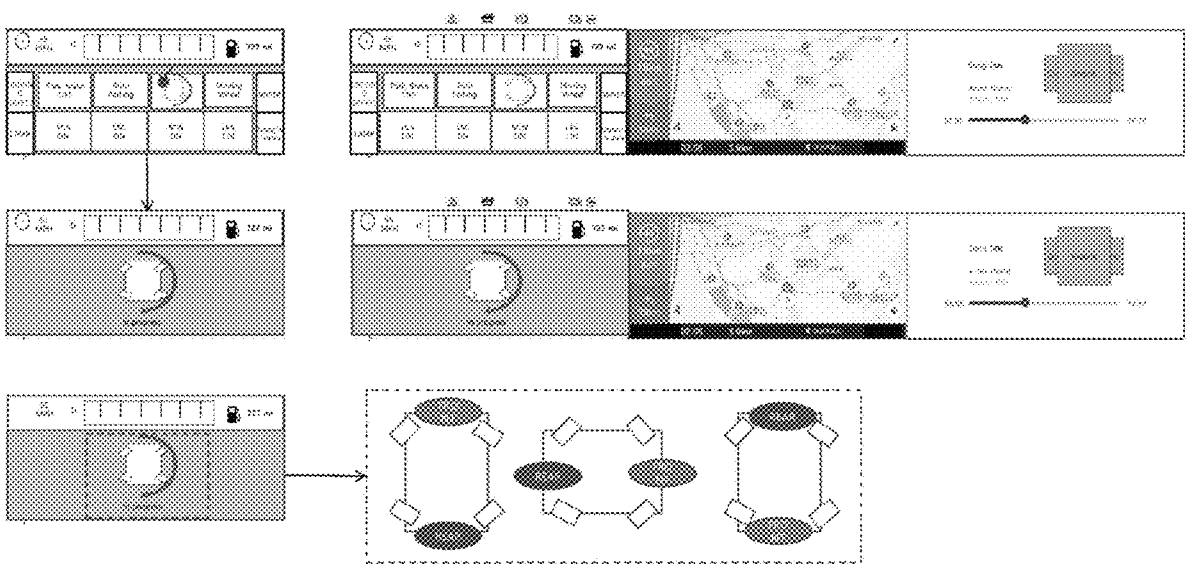
Figure 8:
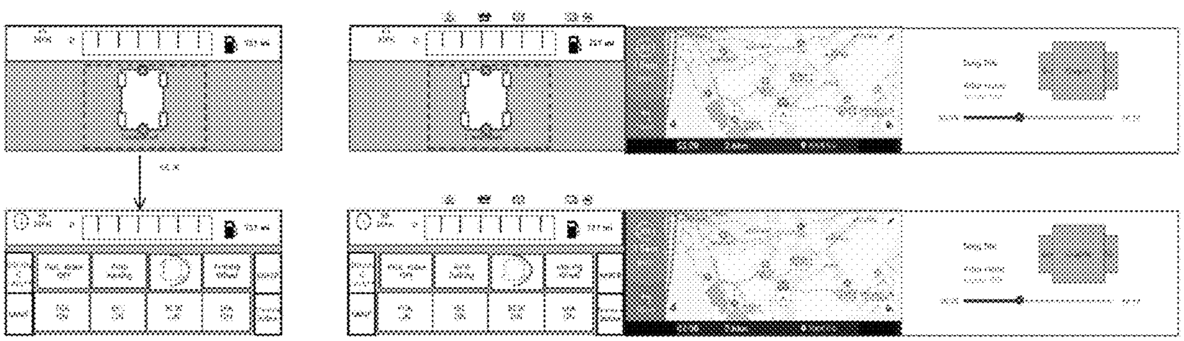

FIGS. 7 and 8 illustrate the case in which a 180-degree rotation icon is clicked on the driving safety pop-up screen.

When it is checked that the vehicle has rotated by 180 degrees on the basis of navigation route guidance, the color of the 180-degree rotation icon on the driving safety pop-up screen may be changed to a different color, or the corresponding icon may be displayed blinking, as descried above.

When the 180-degree rotation icon is touched on the driving safety pop-up screen, a separate screen is displayed to show that the vehicle is being rotated by 180 degrees.

At this time, information related to the situation in which the vehicle is rotated is continuously provided as animation, according to the rotation state.

When the 180-degree rotation is completed, guide information (message or voice) on the rotation completion is provided.

When a preset time (e.g. three seconds) has passed after the vehicle was completely rotated by 180 degrees, the screen is returned to the driving safety pop-up screen. However, although the outside of the pop-up screen is touched during the 180-degree rotation process, the 180-degree rotation process is not canceled.

Figure 9:
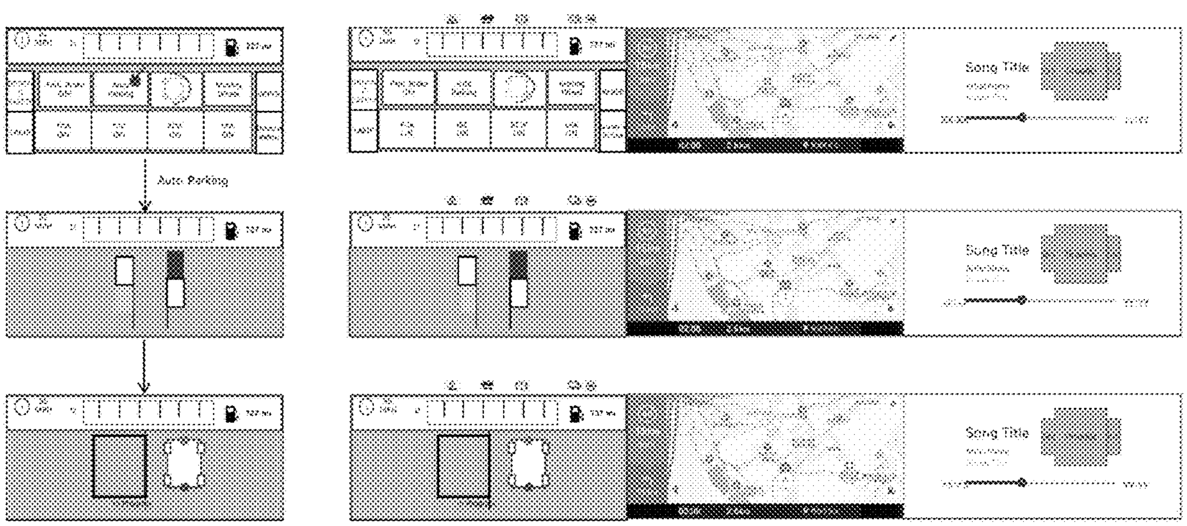
Figure 10:
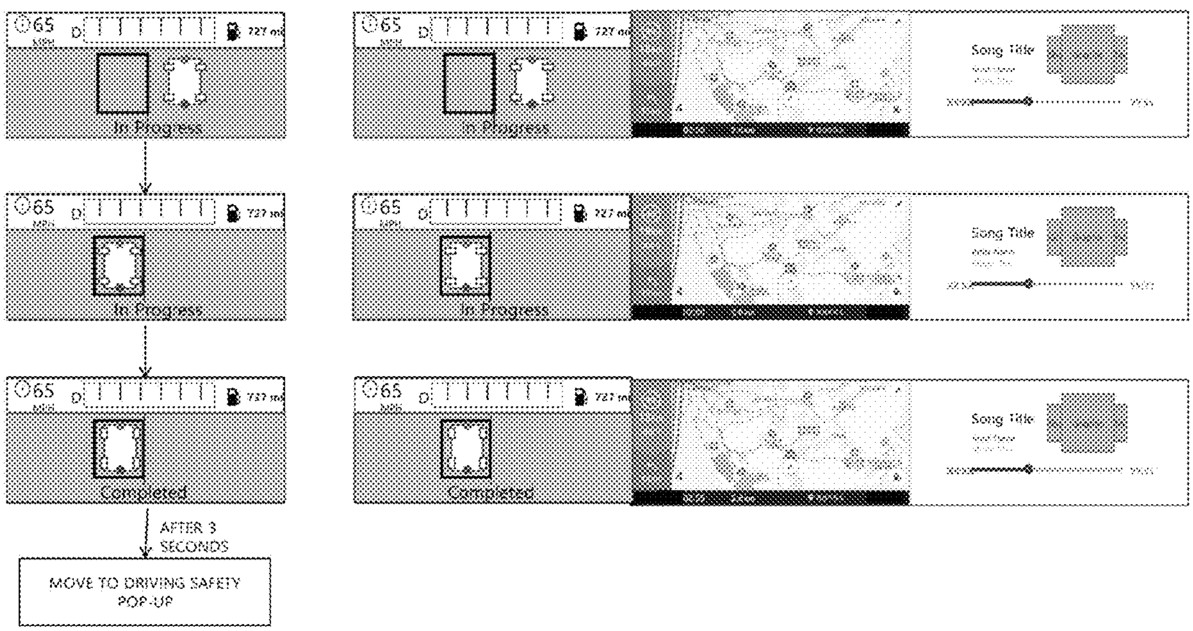

Referring to FIGS. 9 and 10, when the auto parking icon is selected on the driving safety pop-up screen, information on a parking zone and the progress of parking is displayed.

When the parking is completed, completion-related guide information (icon display, message, voice or the like) is provided, and the driving safety pop-up screen is displayed after a preset time (e.g. three seconds).

Although the outside of the pop-up screen is touched while the auto parking is performed, the auto parking is not canceled.

When a separate cancel button click, voice command or brake operation, which is related to a cancelation request, is inputted according to a user's needs (e.g. the case in which another parking space is found) while the auto parking is performed, the auto parking may be canceled.

Figure 11:
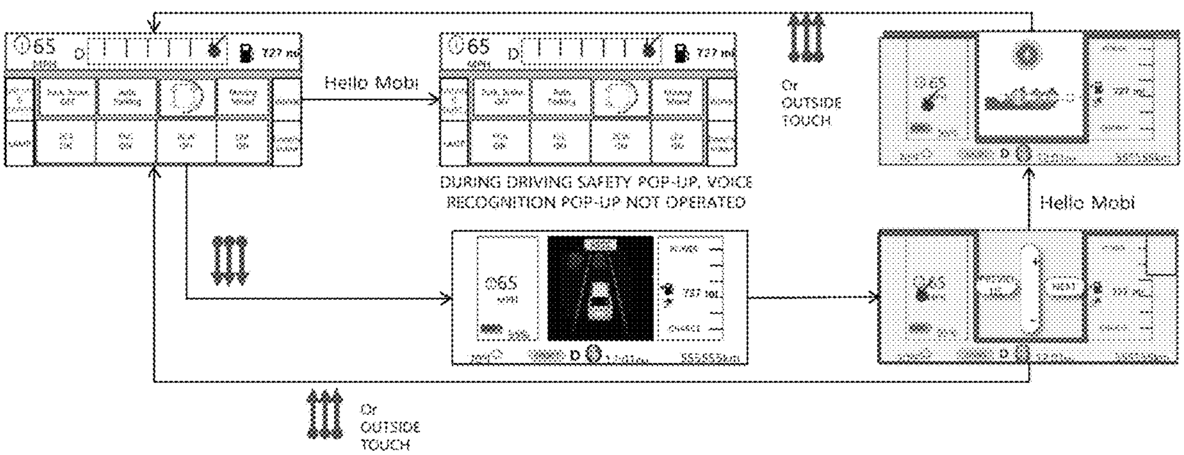
Figure 12:
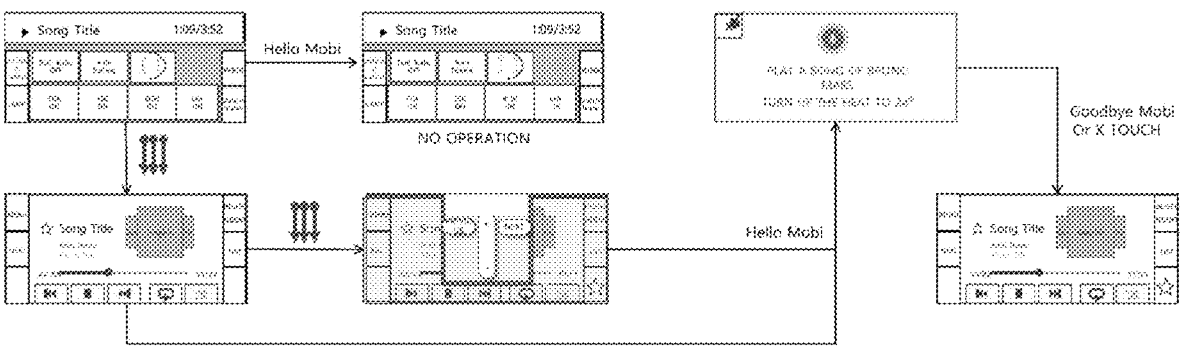

Referring to FIGS. 11 and 12, the driving safety pop-up function is performed according to the pop-up priority.

The pop-up priority is set in descending order of phone pop-up, driving safety pop-up, voice recognition and volume/channel.

When a voice (e.g. Hello Mobi) is inputted on the driving safety pop-up screen, an operation for voice recognition is not performed according to the pop-up priority.

When the cluster screen is displayed through up/down drag on the driving safety pop-up screen, the volume/channel function may be controlled. When a voice (e.g. Hello Mobi) is inputted on the volume/channel screen, an operation for voice recognition is performed according to the pop-up priority.

When down/up drag is inputted on a voice recognition screen or the outside of the screen is touched, the driving safety pop-up screen is displayed.

When down/up drag is inputted on the volume/channel control screen or the outside of the screen is touched, the driving safety pop-up screen is displayed.

Referring to FIG. 12, although a voice is inputted while the minimum information related to media is displayed at the top and the driving safety pop-up screen is displayed, a voice recognition related screen is not displayed according to the pop-up priority, but a media-related screen is displayed by up/down drag.

The media-related screen is changed to the volume/channel control screen by up/down drag.

When a voice is inputted on the volume/channel control screen, a screen for voice recognition is displayed according to the pop-up priority, and recommendation command information is displayed. Examples of the recommendation command information may include "Make a call", "Play a song of Bruno Mars", and "Turn up the heat to 24□".

At this time, the recommendation command information is selected and recommended in consideration of a driving condition, outside condition, driving history information and function execution history information.

When an end voice (e.g. Goodbye Mobi) is inputted on the voice recognition screen or an x button is touched, the display of the voice recognition screen is ended, and a function screen (e.g. media screen) allocated to the corresponding internal display area is displayed.

Figure 13:
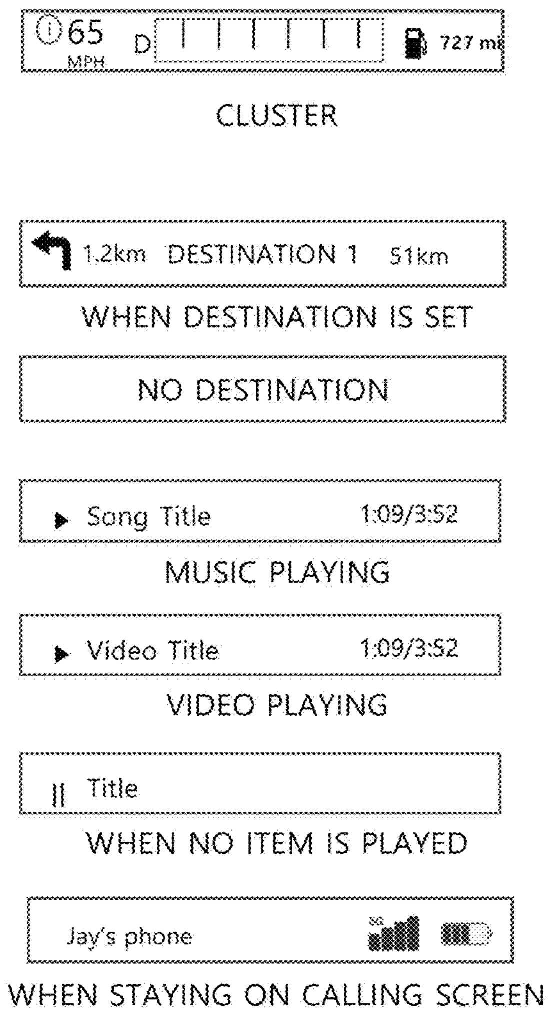
Figure 14:
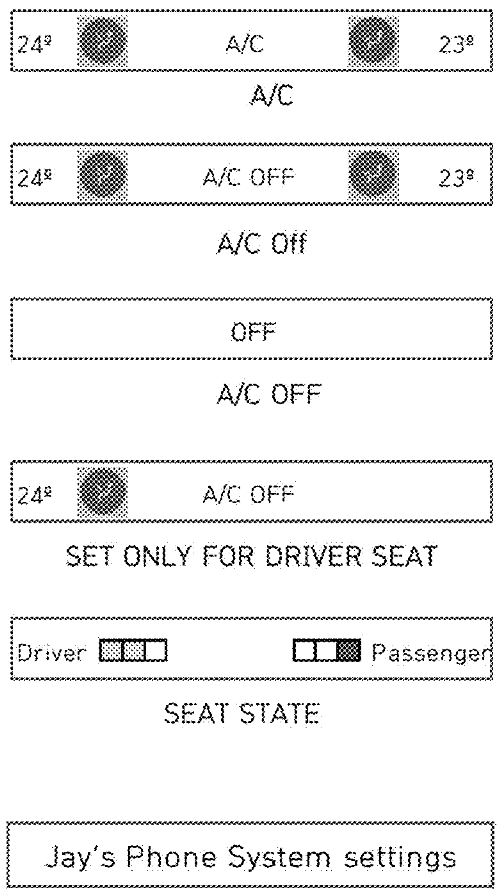

FIGS. 13 and 14 illustrate a module screen in case of driving safety pop-up.

Referring to FIG. 13, when the driving safety pop-up is displayed on the cluster screen, the navigation screen, the media screen and the call history/contact screen, the essential information on each of the screens is displayed at the top of the driving safety pop-up screen.

As the essential information on the cluster screen, DIS warning, speed, gear, power/regenerative brake graphics and distance-to-empty information are displayed.

When a destination is set on the navigation screen, next route information, destination information and distance-to-empty information are displayed as the essential information. When no destination is set, no destination is displayed.

While a song is played, the essential information on the media screen includes playing (or pause), song title, current running time and entire time information.

When a video is played, the essential information on the media screen includes playing (or pause), video title, current running time and entire time information.

When no item is played, the essential information on the media screen includes II (Pause) and title information on the last played item.

The essential information on the calling screen includes the name of a connected mobile phone, communication performance (antenna strength) and battery state information.

Referring to FIG. 14, the essential information on the air conditioning screen includes temperature, wind direction, A/C, wind direction in passenger seat, and temperature information.

The essential information on a seat screen includes driver information, driver seat state, passenger seat state and passenger information.

The essential information on the setting screen includes phone name and system settings-related information.

Figure 15:
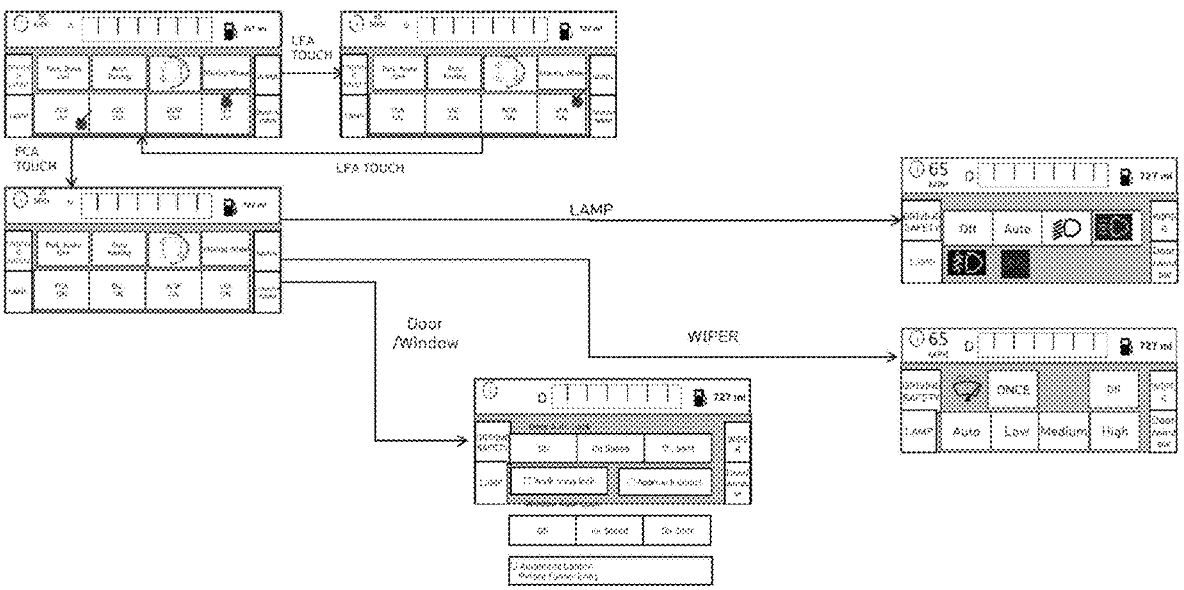
Figure 16:
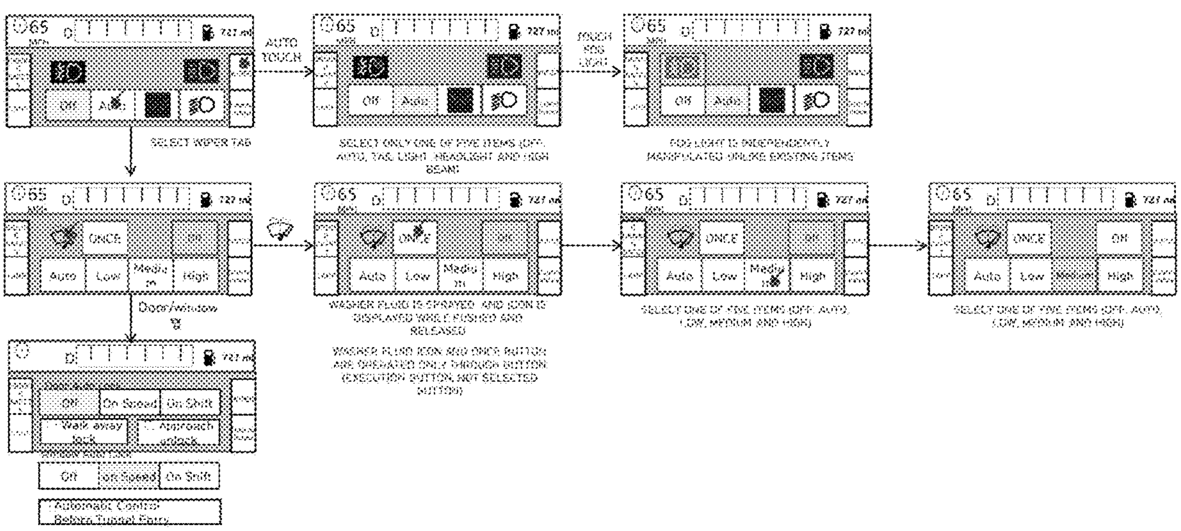

Referring to FIGS. 15 and 16, when an LFA or FCA button is touched on the driving safety pop-up screen, the on/off of the corresponding function is controlled.

As a lamp, wiper or door/window button is touched on the driving safety pop-up screen, the screen of the corresponding function is displayed.

As a button for auto, fog light or washer fluid is touched on a wiper screen, the corresponding function is performed.

On the door/window screen, one door auto lock button and one window auto lock button needs to be selected, and the other check boxes are operated through toggle.

A vehicle information display apparatus in accordance with another embodiment of the present disclosure includes an input unit configured to receive any one of focus state information on an internal display screen, information on whether a button is pressed, and information on whether a user's hand approaches a mobile phone, a memory configured to store a program for controlling the display of the internal display screen by using the focus state information on the internal display screen, the information on whether a button is pressed, or the information on whether the user's hand approaches the mobile phone, and a processor configured to execute the program.

When a cluster area of the internal display screen is focused and no button manipulation is conducted for a preset time, the processor removes the focus, and maintains the display of the buttons.

By using the information on whether the user's hand approaches the mobile phone, the processor focuses the internal display screen when checking that the user's hand is approaching the mobile phone.

When no button manipulation is conducted for the preset time while the internal display screen is focused, the processor removes the focus, and controls the internal display screen such that the buttons within the screen disappear and change to information.

By using the information on whether the user's hand approaches the mobile phone, the processor switches a voice input screen to a keyboard input screen when checking that the user's hand is approaching the mobile phone within a preset distance or less.

The processor provides an interface through which a voice signal can be received on the keyboard input screen.

By using the information on whether the user's hand approaches the mobile phone, the processor changes the display method for a button at a location approached by the hand when checking that the user's hand is approaching the mobile phone within the preset distance or less.

By using the information on whether the user's hand approaches the mobile phone, the processor controls the internal display screen to display a guide image to guide the hand to a button around the location approached by the hand when checking that the user's hand is approaching the mobile phone within the preset distance or less.

A vehicle information display method in accordance with another embodiment of the present disclosure includes step (a) of receiving focus state information on an internal display screen, information on whether a button is manipulated, and information on whether a user's hand approaches a mobile phone, and step (b) of controlling the display of the internal display screen by using the focus state information on the internal display screen, the information on whether a button is manipulated, and the information on whether the user's hand approaches the mobile phone.

In step (b), when a cluster area of the internal display screen is focused and no button manipulation is conducted for a preset time, the focus is removed, and the display of buttons is maintained.

In step (b), when it is checked that the user's hand is approaching the mobile phone on the basis of the information on whether the user's hand approaches the mobile phone, the internal display screen is focused.

In step (b), when no button manipulation is conducted for the preset time while the internal display screen is focused, the focus is removed, and the buttons within the screen disappear and change to information.

In step (b), when it is checked that the user's hand is approaching the mobile phone within a preset distance or less, on the basis of the information on whether the user's hand approaches the mobile phone, a voice input screen is switched to a keyboard input screen.

In step (b), when it is checked that the user's hand is approaching the mobile phone within the preset distance or less, on the basis of the information on whether the user's hand approaches the mobile phone, the display method of a button at the location approached by the hand is changed, or a guide image is displayed to guide the hand to a button around the location approached by the hand.

FIGS. 17 to 44 are diagrams illustrating screen display examples when a focus is removed and a user's hand approaches a mobile phone, in accordance with an embodiment of the present disclosure.

Figure 17:
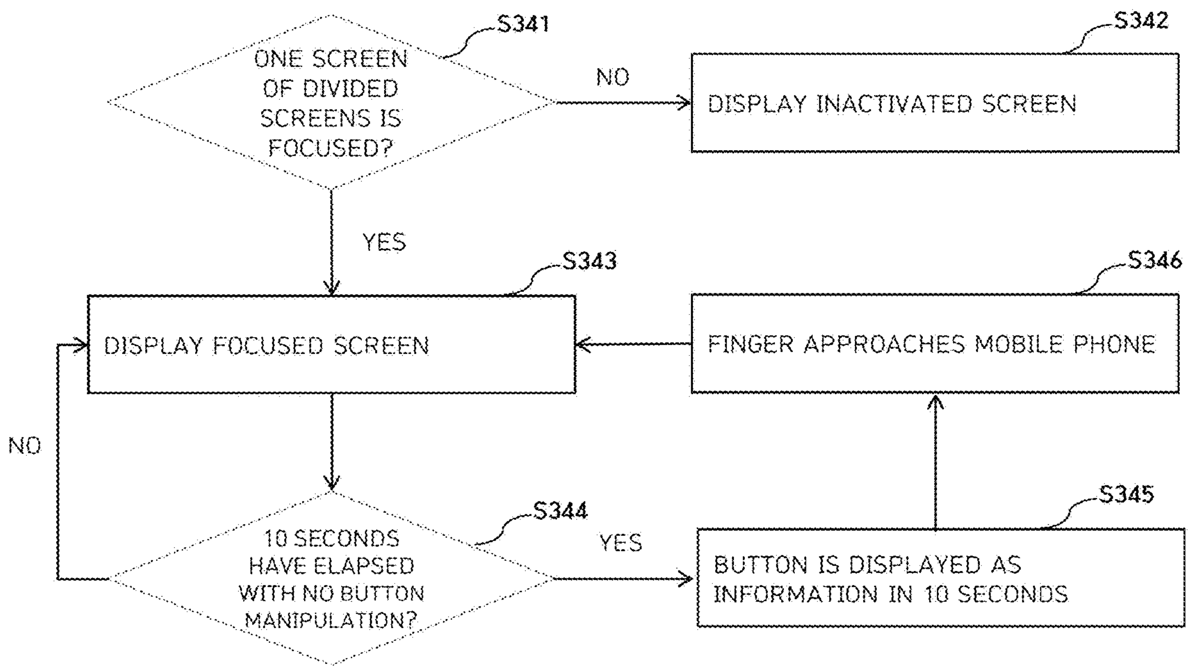
FIGS. 17 to 44 are diagrams illustrating screen examples in which a focus is removed and a user's hand approaches a mobile phone, in accordance with an embodiment of the present disclosure.

Referring to FIG. 17, the processor checks whether one screen among divided screens of the internal display screen is focused, in step S341. When no screen is focused, the processor displays an inactivated screen in step S342.

When it is checked in step S341 that there is a focused screen, the processor displays the focused screen in step S343, and checks whether no button manipulation is conducted for a preset time (e.g. 10 seconds), in step S344.

When it is checked in step S344 that a button manipulation is conducted within the preset time, the focused screen of step S343 is continuously displayed.

When it is checked in step S344 that no button manipulation is conducted for the preset time, the buttons are displayed as information after 10 seconds in step S345. When a finger approaches the mobile phone in step S346, the focused screen is displayed in step S343.

Then information on whether the finger approaches the mobile phone in step S346 is acquired through a sensor (e.g. IR sensor, ToF sensor, camera or the like). At this time, information on whether the finger approaches the front surface of the mobile phone is acquired.

Figure 18:
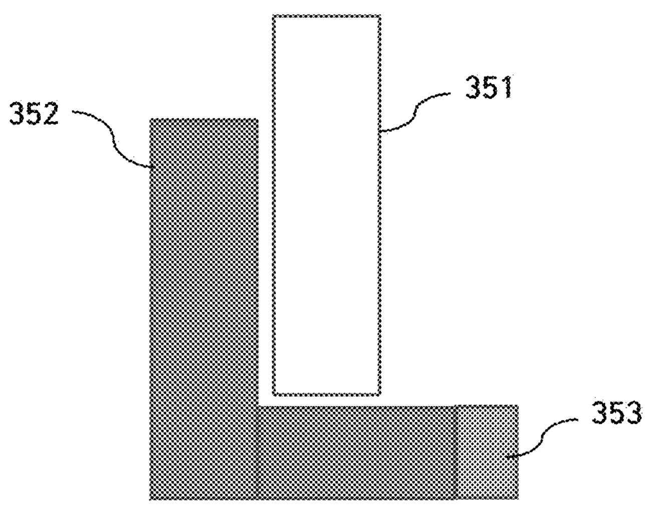

FIG. 18 illustrates a configuration in which a mobile phone 351, a holder 352 having the mobile phone held thereon, and a sensor 353 are included. The sensor 353 is disposed at the front of the holder 352 mounted on a steering wheel.

When a user's finger approaches the front of the mobile phone 351, the internal display screen is switched to a screen which is focused on the basis of the approach.

Figure 19:
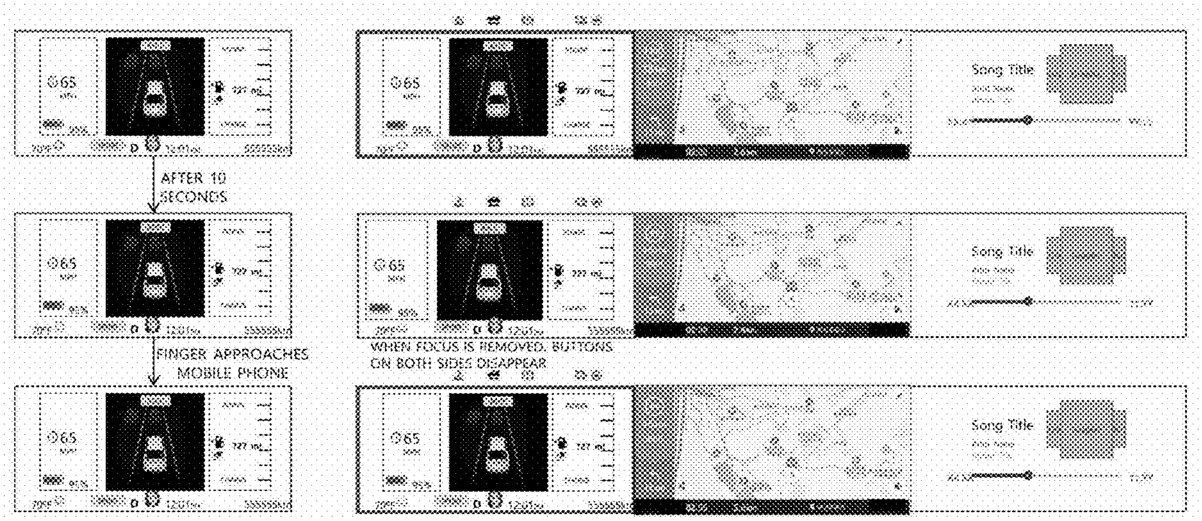

Referring to FIG. 19, when the cluster area is focused and no button manipulation is conducted for a preset time (e.g.

10 seconds), the focus of the cluster area of the internal display is removed, and the buttons such as ASCC and SPORT are maintained.

Since the cluster area is related to safe driving, the buttons such as ASCC and SPORT are always maintained and always mirrored with the mobile phone, and no independent function is provided for the cluster area.

When the user's hand approaches the mobile phone, the cluster area of the internal display is focused again.

Figure 20:
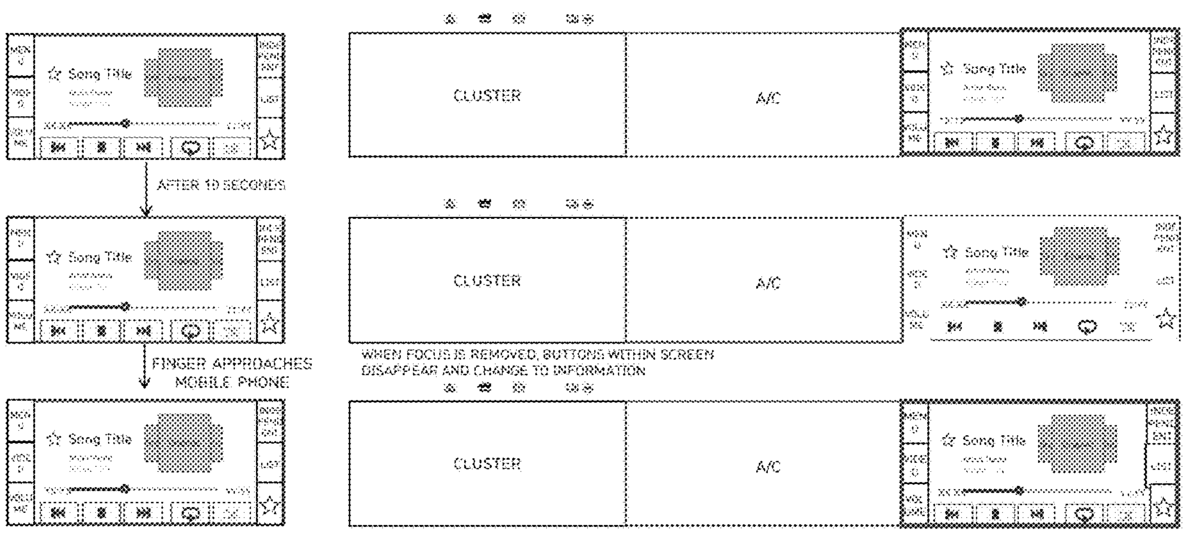

FIG. 20 illustrates an embodiment in which a user's hand approaches a mobile phone after the focus of area other than the cluster area is removed.

When no button manipulation is conducted for a preset time while a media screen is focused, the focus of the media screen is removed, and the buttons within the screen disappear and change to information.

When the user's hand approaches the mobile phone, the media screen of the internal display is focused again.

Figure 21:
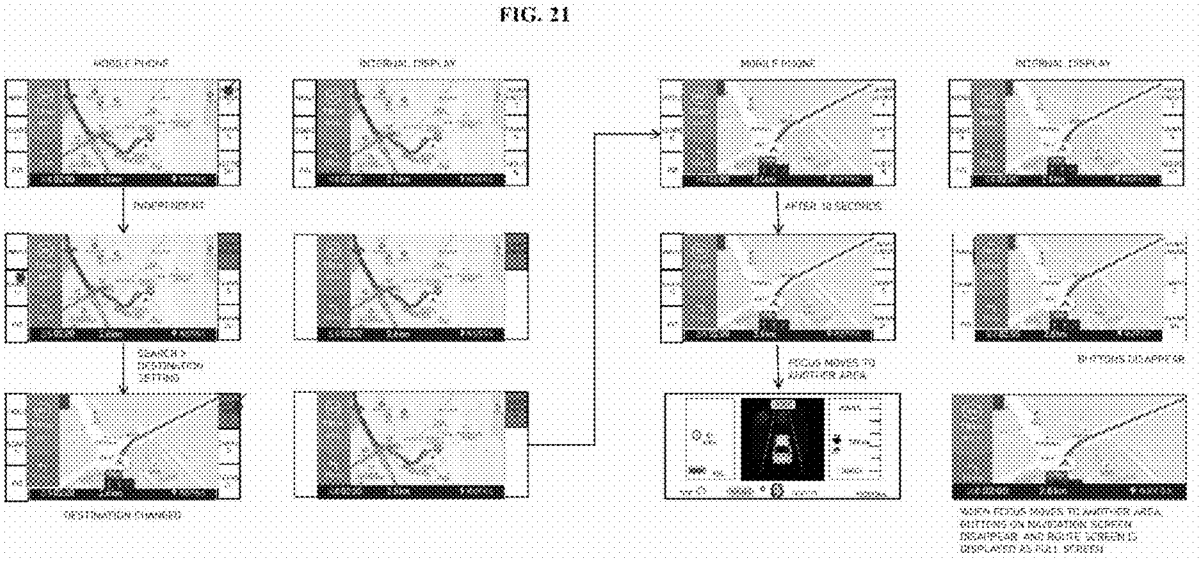

Referring to FIG. 21, when an independent mode is selected on the mobile phone while a navigation screen is displayed, the execution of the independent mode can be checked on the mobile phone screen and the internal display screen.

When no button manipulation is conducted on the mobile phone for a preset time, the buttons on the navigation screen disappear.

When the focus is moved to an area other than the area where the navigation screen is displayed, the buttons on the navigation screen disappear, and a route guide screen is displayed as a full screen.

Figure 22:
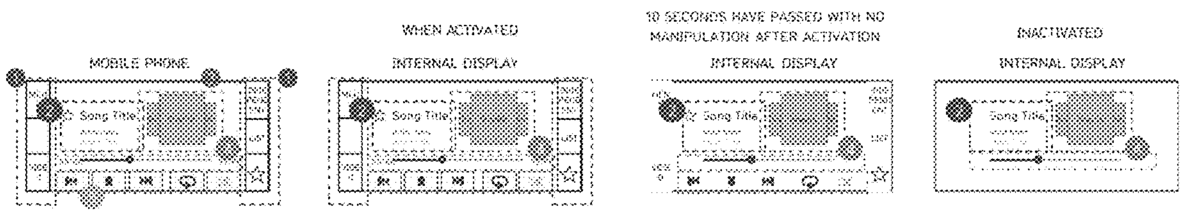

Referring to FIG. 22, a menu is displayed at the left top of ①, a video button whose icon is changed when a video is selected is provided at the left bottom of ①, and an independent button is provided at the right top of ①. When the independent button is activated, the independent mode is performed, and when the independent button is not activated, a mirroring mode is performed. Furthermore, a list button is displayed at the right middle of ①, and a favorites list button is displayed at the right bottom of ①.

In FIG. 22, ② indicates an area where a song title is displayed in a first row thereof, an artist name is displayed in a second row thereof, and an album title is displayed in a third row thereof.

Letters constituting the song title are expanded and displayed, compared to the other pieces of information. When the media function is activated, a favorites icon is provided.

③ indicates an area to display the album information including previous, current and next albums. When there is no album, a default image is displayed.

④ indicates a progress bar showing the current position, the played time and the total time. Time is displayed in the form of M: SS when the time is less than 10 minutes, displayed in the form of MM:SS when the time is equal to or more than 10 minutes, or displayed in the form of X:XX:XX when the time is more than 10 minutes. When the media function is inactivated or 10 seconds have elapsed with no manipulation after the media function was activated, the progress time and the total play time information are not displayed.

⑤ indicates an area to display rewind, play, pause, fast forward, repeat, shuffle buttons. When the repeat button is consecutively pressed, the repeat mode is sequentially changed to "repeat all", "repeat one track" or "repeat within folder", and the shuffle button is displayed as on/off.

Figure 23:
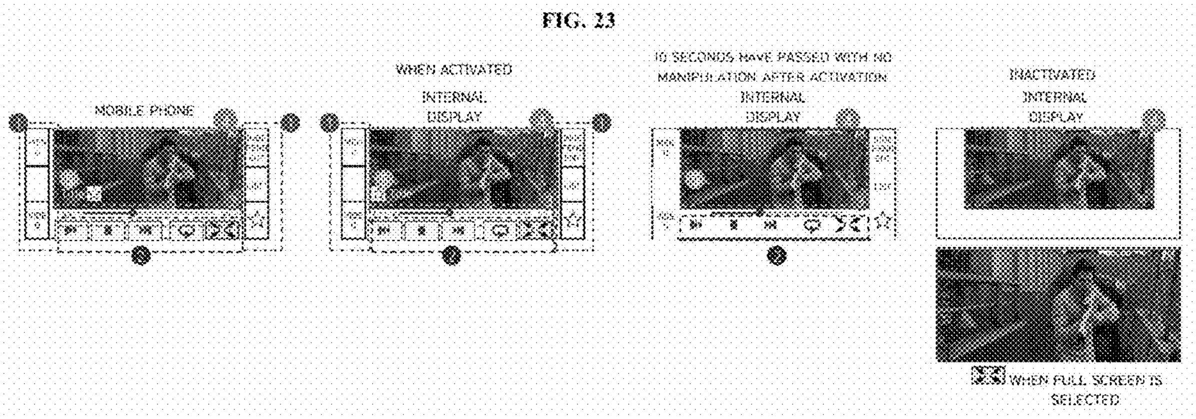

Referring to FIG. 23, a menu is displayed at the left top of ①, a music button is displayed at the left bottom of ①, and changed to a video icon when music is selected, and an independent button is provided at the right top of ①. When the independent button is activated, the independent mode is performed, and when the independent button is not activated, the mirroring mode is performed. Furthermore, a list button is displayed at the right middle of ① and a favorites list button is displayed at the right bottom of ①.

When the media function is inactivated, ① is not displayed on the internal display.

② includes an area to display rewind, play & pause, fast forward, play-on-repeat, screen expansion buttons. When the media screen is inactivated, ② is not displayed on the internal display.

③ indicates a progress bar showing the current position, the played time and the total time. Time is displayed in the form of M: SS when the time is less than 10 minutes, displayed in the form of MM:SS when the time is equal to or more than 10 minutes, or displayed in the form of X:XX:XX when the time is more than 60 minutes. When the media function is inactivated and 10 seconds have elapsed after the media function was activated, the progress time and the total played time are not displayed.

④ indicates an area to display the screen. As the default option, the screen is displayed in a fit-to-screen manner. When the screen is expanded, the screen is displayed in a fill manner.

⑤ indicates an area to display information including a favorites icon and a title. When the media function is inactivated and 10 seconds have passed with no manipulation after the media function was activated, the information of ⑤ is not displayed so as not to block the video on the screen.

When 10 seconds have elapsed with no manipulation after the media function was activated, the buttons are removed, and only the information is displayed. When 10 seconds have elapsed with no manipulation after the media function was activated, the progress time and the total play time are not displayed.

Figure 24:
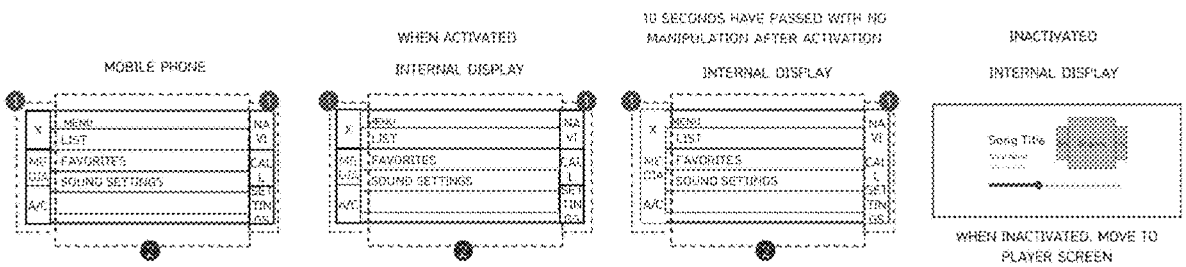

FIG. 24 illustrates a representative screen of the media screen, i.e. a menu.

A media button is displayed at the left middle of ①. When the media button is selected, the screen is moved to a media play screen. An air conditioning button is displayed at the left bottom of ①. When the air conditioning button is selected, the screen is moved to an air conditioning main screen. A navigation button is displayed at the right top of ①. When the navigation button is selected, the screen is moved to the navigation screen. A calling button is displayed at the right middle of ①. When the calling button is selected, the screen is moved to a calling screen. A settings button is displayed at the right bottom of the area ①. When the settings button is selected, the screen is moved to a settings screen.

The corresponding function title, i.e. the menu is displayed at the top of ②, and the list, favorites and sound settings are displayed at the middle and bottom of ②.

When 10 seconds have passed with no manipulation after the menu was activated, the buttons are removed, only the information is displayed, and the list is maintained.

When the menu is inactivated, the internal display is changed to a player screen.

Figure 25:
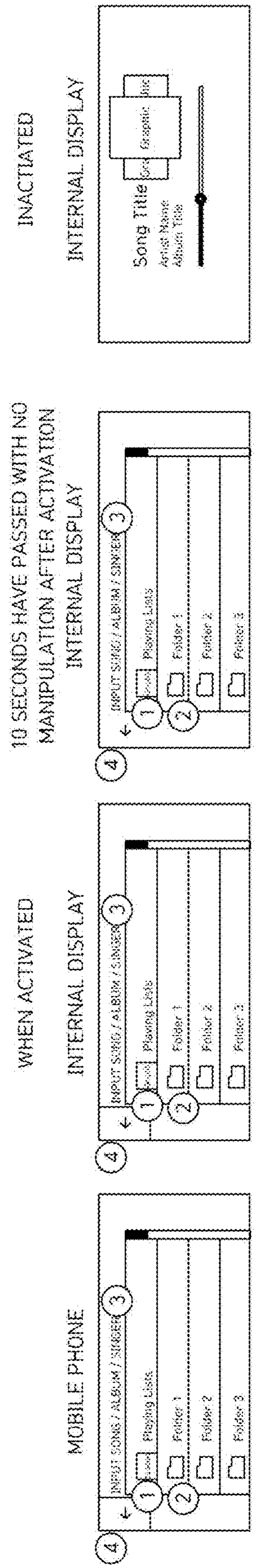

FIG. 25 illustrates a screen for a folder list within the media screen.

① indicates an area to display a playing list, and a folder which is being played is displayed on the area.

② indicates an area to a display a folder. For example, Folder 1 is displayed on the area.

③ indicates an input field where "Input song/album/singer" is displayed as inactive letters. When the input field is touched, a keypad input screen appears.

④ indicates the previous button. When 10 seconds have passed after the folder list screen was activated, the buttons are displayed as information.

When 10 seconds have passed with no manipulation after the folder list screen was activated, the buttons are removed, and only information is displayed. Even when 10 seconds have passed with no manipulation after the folder list screen was activated, the lists are maintained. When the folder list screen is inactivated, the screen is changed to the player screen.

Figure 26:
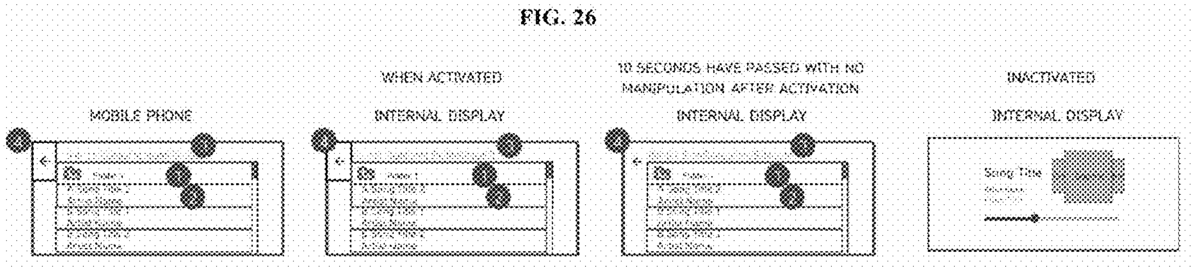

FIG. 26 illustrates a screen for a folder of the folder list within the media screen.

An up button to the upper folder is displayed at ①, a playing list is displayed at ②, an input field is displayed at ③, and a previous button is displayed at ④.

When 10 seconds have passed with no manipulation after the folder list screen was activated, the button is removed, and only the information is displayed. Even when 10 seconds have passed with no manipulation after the folder list screen was activated, the list is maintained. When the folder list screen is inactivated, the screen is changed to the player screen.

Figure 27:
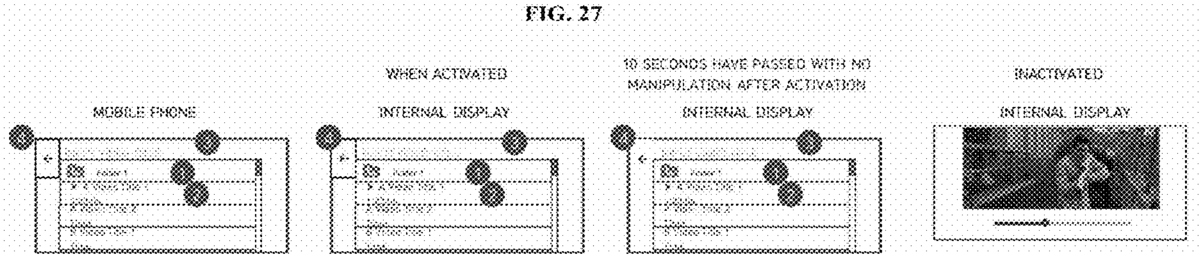

FIG. 27 illustrates a screen for a video list within the media screen.

① indicates an up button to the upper folder, which is provided to move to the upper screen in the case of a small screen.

② indicates a playing list where a title is displayed in the first row thereof and a play time is displayed in the second row thereof. The play time is displayed in the form of MM:SS when the play time is equal to or less than 60 minutes, and displayed in the form of H:MM:SS when the play time exceeds 60 minutes. In the case of a list which is being played, a playing icon is displayed on the left of the list.

③ indicates an input field where "Input song/album/singer" is displayed as inactive letters. When the input field is touched, a keypad input screen appears.

④ indicates a previous button displayed as an icon. When 10 seconds have passed after the video list screen was activated, the button is displayed as information.

When 10 seconds have passed with no manipulation after the video list screen was activated, the button is removed, only the information is displayed, and the list is maintained. When the video list screen is inactivated, the screen is changed to the player screen.

Figure 28:
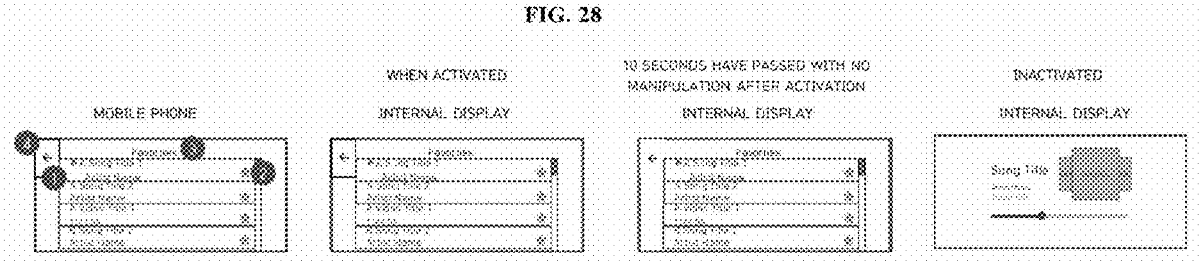

FIG. 28 illustrates a screen for favorites within the media screen.

① indicates an area to display a playing list.

In the case of music, a song title is displayed in a first row of ①, and artist information is displayed in a second row of ①.

In the case of video, a video title is displayed in the first row of ①, and a play time is displayed in the second row of ①.

In the case of a list which is being played, a playing icon may be displayed on the left of ①, and songs in the list may be displayed in alphabet order.

② indicates an area to display a favorites icon. The favorites icon is marked only when a favorites icon for the corresponding video on the player screen is pressed. When the favorites icon on the right of the list is pressed, the mark of the favorites icon is removed.

③ indicates an area to display the corresponding function title, i.e. the favorites.

④ indicates a previous button displayed as an icon. When 10 seconds have passed with no manipulation after a favorites screen was activated, the button is displayed as information.

On the favorites screen, videos and music registered as favorites are listed and displayed together.

Figure 29:
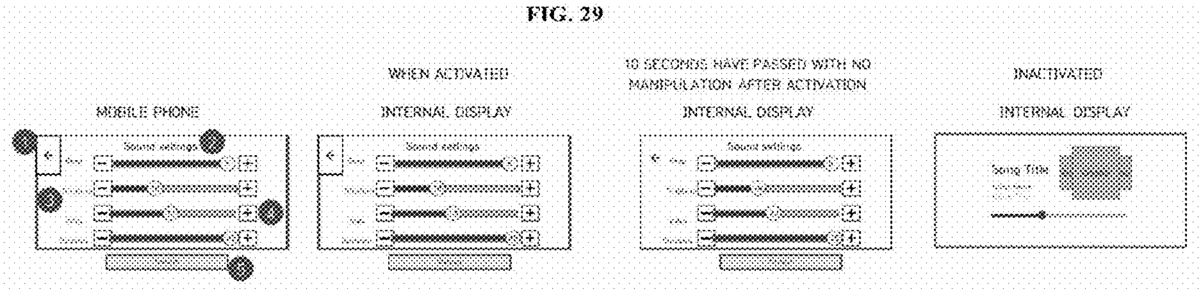

FIG. 29 illustrates a screen for sound settings within the media screen.

① indicates a previous button for returning to the previous module when the previous button is pressed. The previous button is displayed as an icon. When 10 seconds have passed with no manipulation after the sound settings screen was activated, the button is displayed as information.

② indicates an area to display the corresponding function title, i.e. Sound settings.

③ indicates an area where texts are displayed, and the titles of slider bars (e.g. Beep, Ringtone, Voice and Guidance) are displayed.

④ indicates an area where a slider is displayed. When a user taps the +/− button to set a level, a number indicating the step is displayed in a circle.

⑤ indicates a default button. When the default button is touched, the sound settings are changed to default values.

When 10 seconds have passed with no manipulation after the sound settings screen was activated, the button is removed, only the information is displayed, and the display of the internal buttons (−/+ buttons) is maintained. When the sound settings screen is inactivated, the screen is moved to the player screen.

Figure 30:
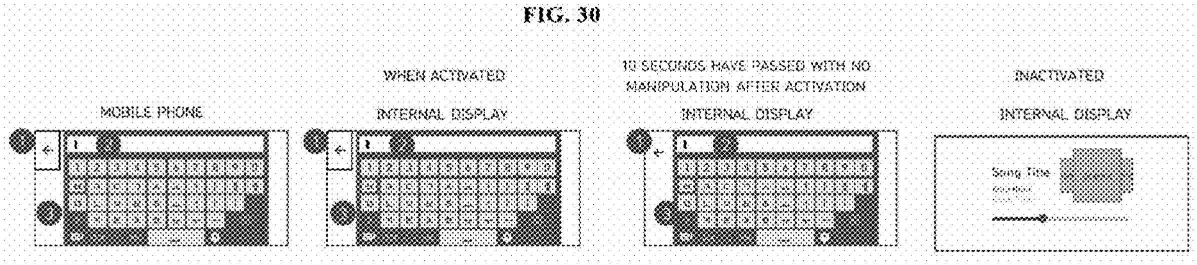

FIG. 30 illustrates a keyboard input screen among representative screens of the media screen.

① indicates a previous button. When the previous button is touched, the screen is moved to the music player.

The previous button is displayed as an icon. When 10 seconds have passed with no manipulation after the key input screen was activated, the button is displayed as information.

② indicates an input window on which the result of a keyboard input is displayed.

③ indicates an area to display a key pad (keyboard) on which input buttons and search buttons are displayed.

When 10 seconds have passed with no manipulation after the key input screen was activated, the button is removed, and only the information is displayed. When the key input screen is inactivated, the screen is changed to the player screen.

Figure 31:
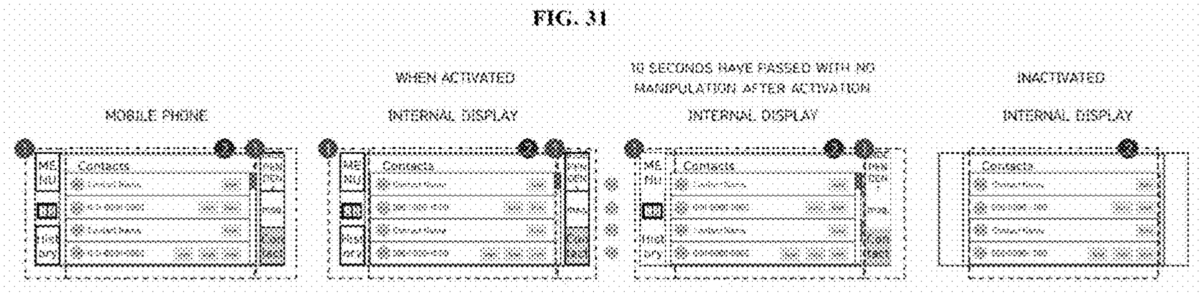

FIG. 31 illustrates a representative screen of the calling screen.

A menu button is displayed at the left top of ①, a keypad button is displayed at the left middle of ①, and a history button is displayed at the left bottom of ①.

An independent button is displayed at the right top of ①. When the independent button is activated, the independent mode is performed, and when the independent button is inactivated, the mirroring mode is performed.

A message button is displayed at the right middle of ①. When the message button is touched, a message input screen is displayed.

At the right bottom of ①, a contacts button is activated and displayed.

A title is displayed as Contacts at the top of ②, and a list, icons (or images) and names are displayed on a main area of ②. When there is no name matched with a number, only the number is displayed.

When an image associated with contact information is stored, the image is displayed with the corresponding name. Furthermore, Mobile/Work/Home/Others icons are displayed as category icons, and the contact names are displayed in alphabet order.

When 10 seconds have passed with no manipulation after the contacts screen was activated, the buttons on both sides thereof are removed, only the information (area ①) is displayed, and the list is maintained. When the contacts screen is inactivated, the buttons on both sides thereof are removed.

Figure 32:
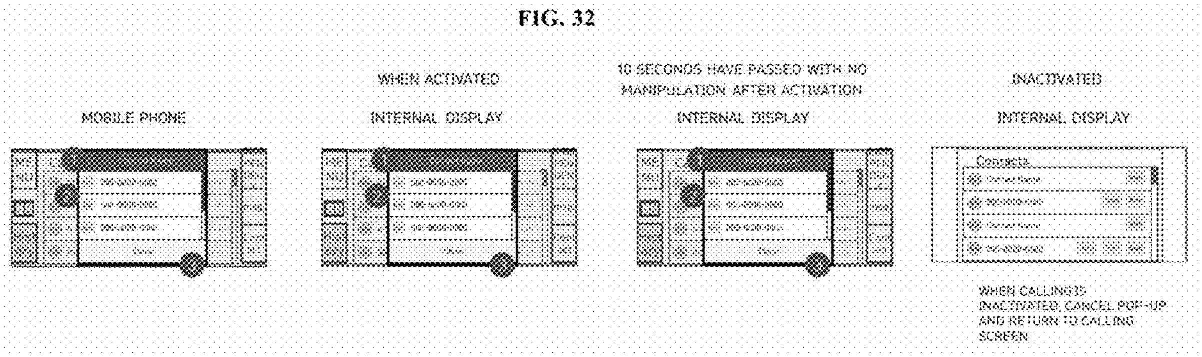

FIG. 32 illustrates a contact pop-up screen.

① indicates a pop-up title on which a name is displayed. When two or more phone numbers are stored for one contact name, the contact pop-up screen is displayed, and the contact name is displayed on the title.

② indicates a list. In the list, left icons indicate category icons (Mobile/Work/Home/Others), and the numbers within the contact are displayed for the respective categories.

③ indicates a close button, i.e. a pop-up close button. When the close button is pressed or the screen outside the pop-up screen is touched, the pop-up screen is closed.

When 10 seconds have passed with no manipulation, the pop-up screen disappears and returns to the calling screen.

Even when the screen outside the pop-up screen as well as the close button is touched, the pop-up screen disappears and returns to the contacts screen.

When the calling screen is inactivated, the pop-up screen disappears and returns to the calling screen.

Figure 33:
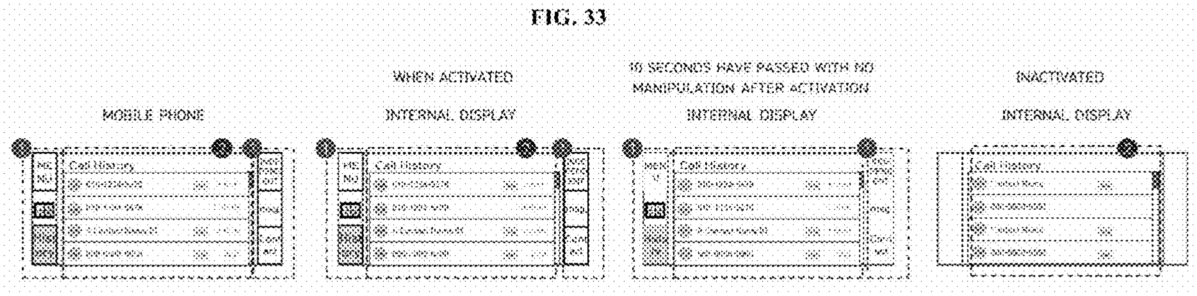

FIG. 33 illustrates a call history screen.

A menu button is displayed at the left top of ①, and a keypad button is displayed at the left middle of ①. When the keypad button is pressed, a keypad screen is displayed.

A history button is displayed at the left bottom of ①. Referring to FIG. 33, the corresponding button is activated.

At the right top of ①, an independent button is displayed. When the independent button is activated, the independent mode is performed, and when the independent button is inactivated, the mirroring mode is performed.

A message button is displayed at the right middle of ①. When the message button is pressed, a message screen is displayed.

A contacts button is displayed at the right bottom of ①.

Call History is displayed as a title at the top of ②, and left icons (incoming call icon, outgoing call icon and unanswered call icon) and contact names are displayed on a main area of ②. When there is no name matched with a phone number, only the phone number is displayed.

Right icons and time are displayed in the main area of ②, the right icons serving as category icons (Mobile/Work/Home/Others). In the case of today, time is displayed in the form of (HH:MM+AM/PM). In the case of days before yesterday, time is displayed in the form of YYYY:MM:DD.

When 10 seconds have passed with no manipulation after the call history screen was activated, the buttons on both sides thereof are removed, and only the information is displayed (area ①). At this time, the display of the list is maintained.

Figure 34:
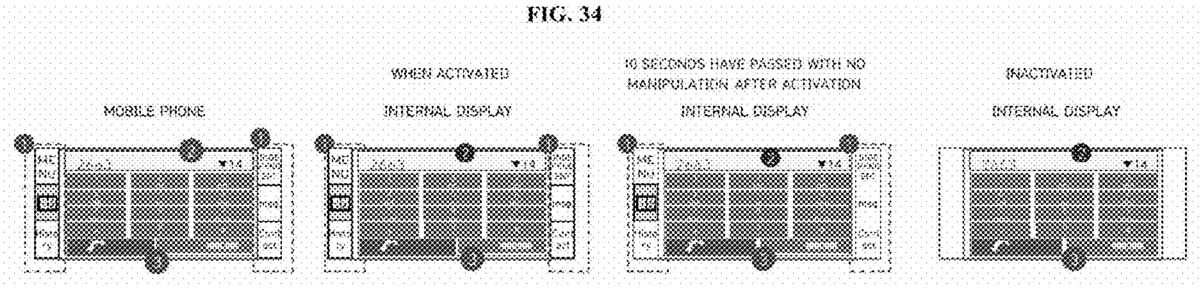

FIG. 34 illustrates a keypad screen during calling.

A menu button is displayed at the left top of ①, a keypad button is displayed at the left middle of ①, and a history button is displayed at the left bottom of ①.

An independent button is displayed at the right top of ①, a message button is displayed at the right middle of ①, and a contacts button is displayed at the right bottom of ①.

② indicates a display window on which numbers inputted through the keypad are displayed. At this time, a phone number including the input numbers or the number of contacts and a symbol are displayed on the display window. When a matched number/symbol is tapped, a pop-up screen for the matched contact/phone number is displayed. When the number of phone numbers is larger than the number of phone numbers which can be displayed on the screen, a scroll function is provided.

③ indicates a keypad screen on which numbers with alphabet characters located thereunder are provided. A call button is displayed at the left bottom of ③, and a delete button is displayed at the right bottom of ③.

When 10 seconds have passed with no manipulation after the keypad screen was activated, the buttons on both sides thereof are removed, only the information is displayed (area ①), and the central button screen is maintained. When the keypad screen is inactivated, the buttons on both sides thereof are removed.

Figure 35:
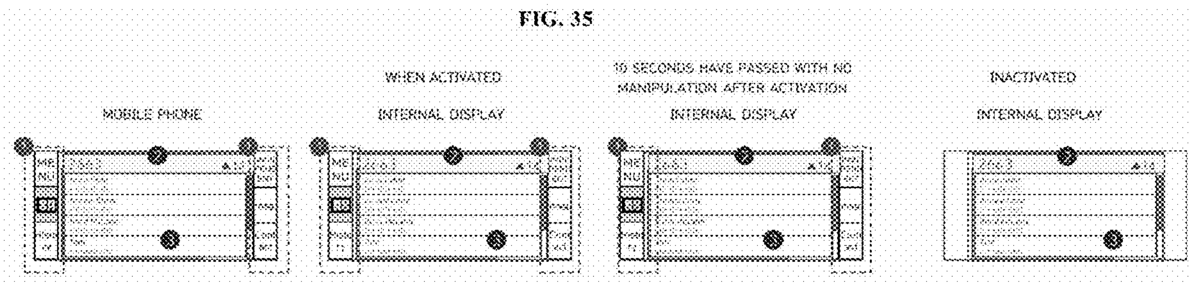

Referring to FIG. 35, a name is displayed in the first row of each entry in a list of ③. When no name is stored, the corresponding entry is displayed as "no name".

A phone number is displayed in the second row of the entry in the list of ③. When a phone number is matched with numbers or letters inputted on the display window, the phone number is displayed in a different color (e.g. blue).

When 10 seconds have passed with no manipulation after the screen was activated, the buttons on both sides thereof are removed, only the information is displayed (area ①), and the display of the central list is maintained. When the screen is inactivated, the buttons on both sides thereof are removed.

Figure 36:
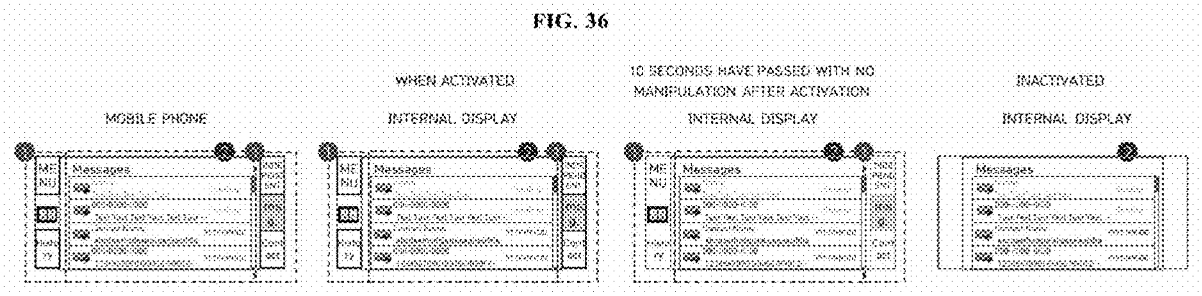

FIG. 36 illustrates a screen when a message button is activated on the representative screen of the calling screen.

Messages is displayed as a title at the top of ②, and icons are divided into sending, sent, unread and read icons.

Each entry of the list is displayed in two rows, such that a name (or phone number in case that no name is stored) is displayed in the first row thereof, and a message text is displayed in the second row thereof. When the contents of a text are longer that the length of the corresponding entry box, the latter part of the text is displayed as . . . , and time information is displayed on the right. The time information may include date, hour and minute information.

When 10 seconds have passed with no manipulation after the screen was activated, the buttons on both sides thereof are removed, only the information is displayed (area ①), and the central list is maintained. When the screen is inactivated, the buttons on both sides thereof are removed.

Figure 37:
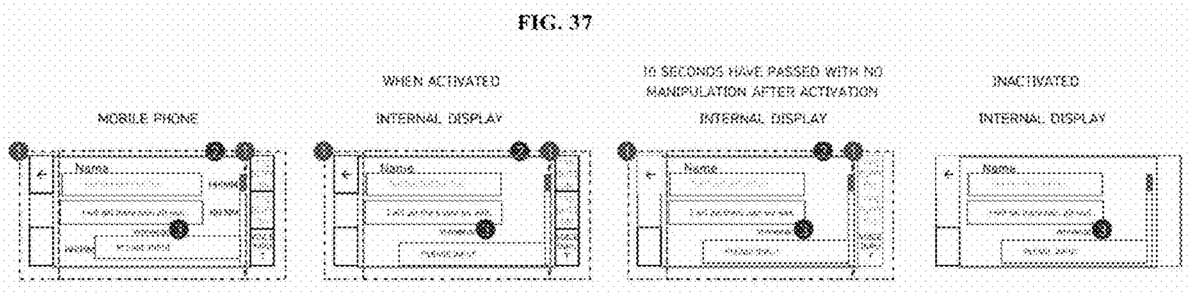

Referring to FIG. 37, a menu button is displayed at the left top of ① and TTS (Text to Speech) buttons are displayed at the right top and middle of ①. When the TTS button is pressed, a message can be transmitted as voice through the TTS system, and an incoming message and an outgoing message can be both transmitted as voice. A voice input button is displayed at the right bottom of ①. When the voice input button is pressed, a text message is provided as voice.

A title, i.e. a recipient name or phone number is displayed as a title at the top of ② and the contents of messages are displayed under the title. Incoming messages are arranged and displayed on the left, and the reception time of each incoming message is displayed on the right of the corresponding message. Outgoing messages are arranged and displayed on the right, and the sending time of each outgoing message is displayed on the left of the corresponding message.

③ indicates an area to display the date information including year, month and day.

Figure 38:
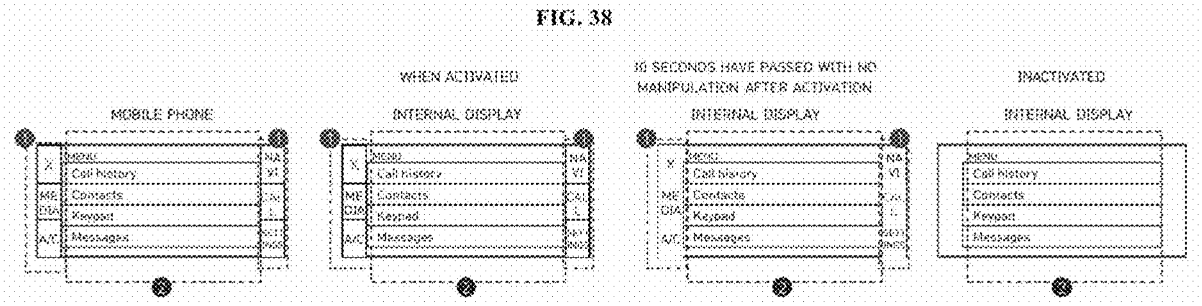

FIG. 38 illustrates a screen for the menu of the representative screen of the calling screen.

A media button is displayed at the left middle of ①, and an air conditioning button is displayed at the left bottom of ①. A navigation button is displayed at the right top of ①, a call button is displayed at the right middle of ①, and a settings button is displayed at the right bottom of ①.

The corresponding function title, i.e. the menu, is displayed at the top of ②, and bars for Call history, Contacts, Keypad are Messages are displayed at the middle and bottom of ②.

When 10 seconds have passed with no manipulation after the menu screen was activated, the buttons are removed, and only the information is displayed. Even when 10 seconds have passed with no manipulation after the menu screen was activated, the display of the list is maintained.

Figure 39:
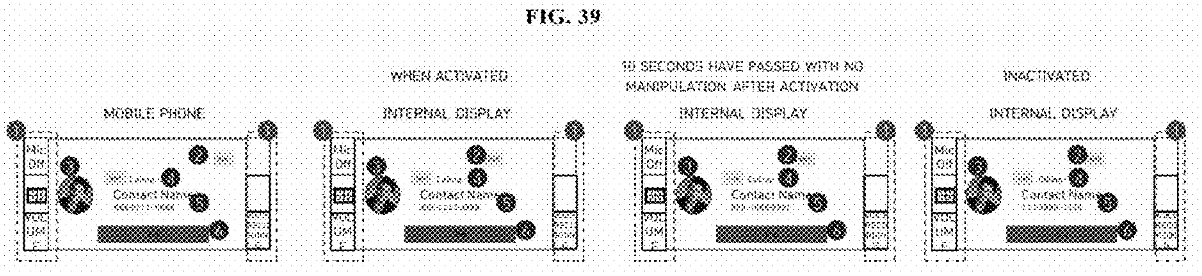

FIG. 39 illustrates a calling screen.

A mic-off button is displayed at the left top of ①, a keypad button is displayed at the left middle of ①, and a volume button is displayed at the left bottom of ①. A voice recording button is displayed at the right bottom of ①.

② indicates an area to display cell signal information or signal strength.

③ indicates an area to display an image of the counterpart. When there is no image, a default image is displayed.

④ indicates an area to display a calling icon and a text saying "Calling . . . ".

⑤ indicates an area where a contact name is displayed in a first row thereof and a phone number is displayed in a second row thereof. In this area, the contact name is displayed in a larger size than the phone number.

⑥ indicates an end button.

Regardless of whether the calling screen is activated or inactivated or 10 seconds have passed with no manipulation after the calling screen was activated, the information is displayed.

Figure 40:
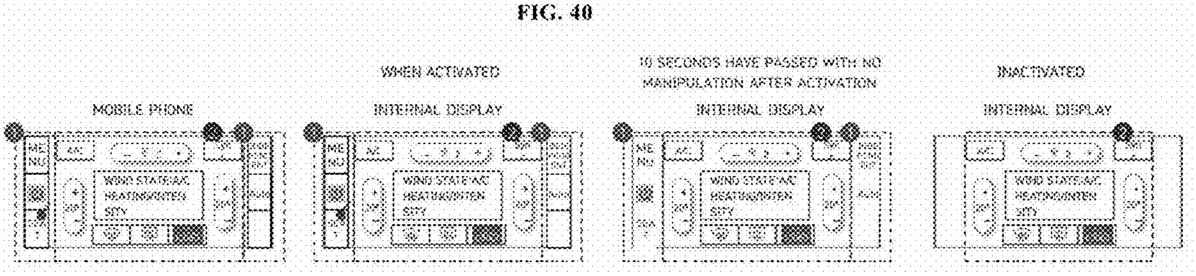

FIG. 40 illustrates a representative screen of the air conditioning screen.

A menu button is displayed at the left top of ①, an air conditioning on/off button is displayed at the left middle of ①, and a seat button is displayed at the left bottom of ①.

An independent button is displayed at the right top of ①, and an auto on/off button is displayed at the right middle of ①.

At the top of ②, an A/C button, an air volume control button and a sync button are displayed.

In the middle of ②, a driver seat temperature control button and a passenger seat temperature control button are displayed. The temperature may rise/fall by 0.5°, and change in the range of 18 to 32°. In the middle of ②, wind state information is displayed, and wind information is displayed in a color corresponding to air conditioning/heating. Wind strength corresponding to the air volume is displayed.

At the bottom of ②, a defrost button and an inside/outside air circulation button are displayed.

When 10 seconds have passed with no manipulation after the air conditioning screen was activated, the buttons on both sides thereof are removed, only the information is displayed (area ①), and the central screen is maintained. When the air conditioning screen is inactivated, the buttons on both sides thereof are removed.

Figure 41:
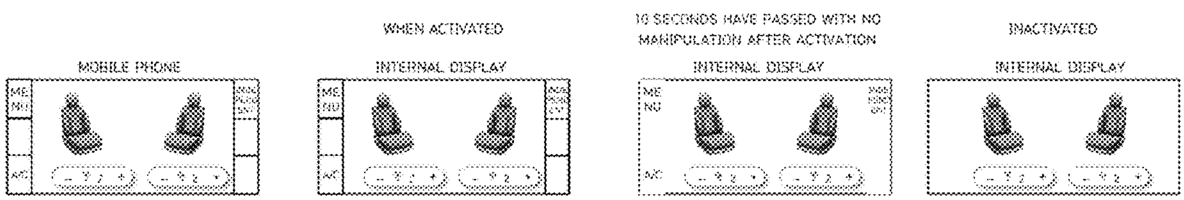

FIG. 41 illustrates a representative screen of the seat screen.

A menu button is displayed at the left top of ①, and a seat/air conditioning toggle button is displayed at the left bottom of ①.

An independent button is displayed at the right top of ①.

The color of a seat is displayed at the top of ②, and changed depending on air conditioning and heating.

A temperature button is displayed at the bottom of ②. The temperature is divided into three stages for air conditioning/heating.

Figure 42:
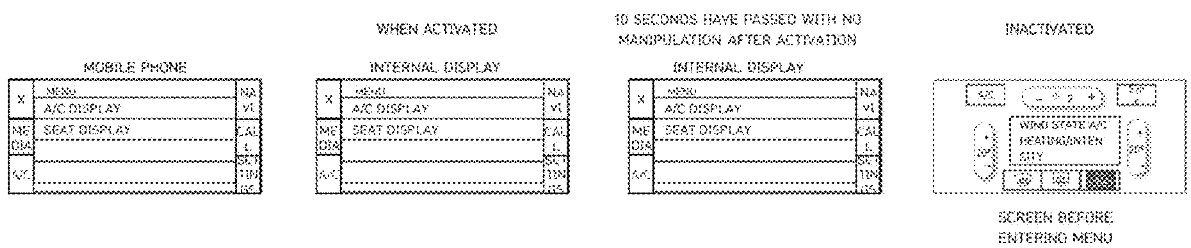

FIG. 42 illustrates a representative screen of the menu of the air conditioning/seat screen.

A media button is displayed at the left middle of the screen, and an air conditioning button is displayed at the left bottom of the screen.

A navigation button is displayed at the right top of the screen, a call button is displayed at the right middle of the screen, and a setting button is displayed at the right bottom of the screen.

The title of the corresponding function, i.e. Menu, is displayed at the top of the central portion of the screen, and an air conditioning screen bar and a seat screen bar are displayed at the middle and bottom of the screen.

When the menu screen is inactivated, the previous screen before the entry of the menu is displayed.

Figure 43:
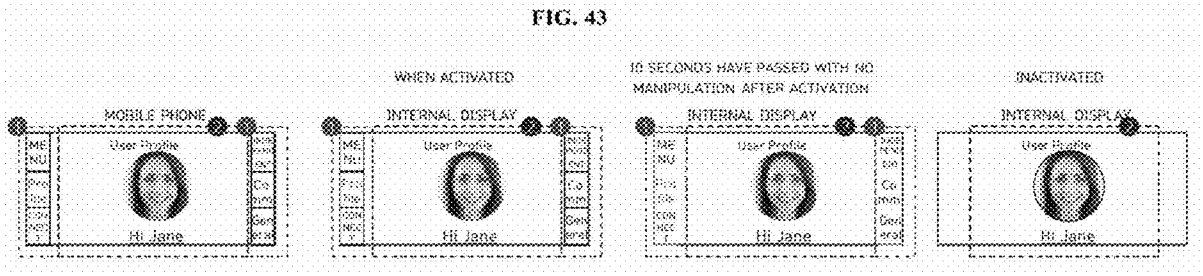

FIG. 43 illustrates a profile registration screen among representative screens of the settings screen.

A menu button is displayed at the left top of ①, a profile button is displayed at the left middle of ①, and a connect-as button is displayed at the left bottom of ①.

An independent button is displayed at the right top of ①, a communication text settings button is displayed at the right middle of ①, and a general settings button is displayed at the right bottom of ①.

User Profile is displayed as a title at the top of ②, an image editing button is displayed in the center of ②, and a text editing button is displayed at the bottom of ①.

When 10 seconds have passed with no manipulation after the profile registration screen was activated, the buttons on both sides thereof are removed, only the information is displayed (area ①), and the central screen is maintained. When the profile registration screen is inactivated, the buttons on both sides thereof are removed.

Figure 44:
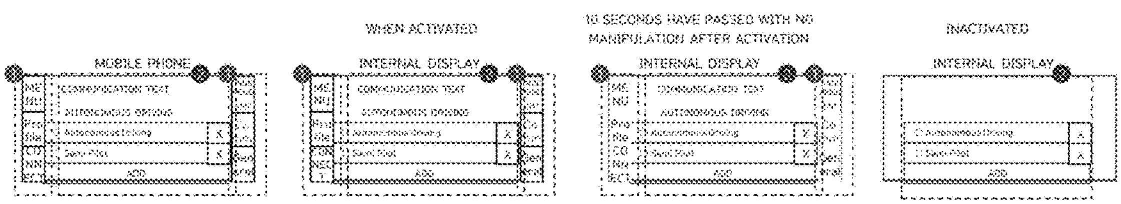

FIG. 44 illustrates a communication text setting screen among the representative screen of the settings screen.

Communication Text is displayed as a tile at the top of ②, and three kinds of sub texts, e.g. autonomous driving, manual driving and vehicle stop, are displayed on a main area of ②.

When autonomous driving, manual driving or vehicle stop is selected, the selected item is displayed through an external display.

A radio button may be selectively provided for each subtitle, but no radio button may be provided for the list in case of the vehicle stop. When the vehicle is stopped, a pop-up screen is provided to ask the driver if there is a pedestrian, which makes it possible to remove misunderstandings between the driver and a pedestrian.

When 10 seconds have passed with no manipulation after the communication text setting screen was activated, the buttons on both sides thereof are removed, only the information is displayed (area ①), and the central screen is maintained. When the communication text setting screen is inactivated, the buttons on both sides thereof are removed.

FIGS. 45 to 61 are diagrams illustrating examples in which information/screen is provided as a user's hand approaches a mobile phone, in accordance with an embodiment of the present disclosure.

The related art provides a technology that enlarges buttons when a user's hand approaches an AVN (Audio, Video and Navigation) system, and changes the corresponding screen to a keyboard screen when the user's hand approaches the AVN system while information is inputted through a control system.

However, the area of the mobile phone needs to be divided to consider a screen which is displayed when the hand approaches the mobile phone, and a screen which is displayed during voice recognition. Furthermore, when a user's hand approaches the mobile phone, a screen needs to be displayed in consideration of the driving safety priority.

In accordance with an embodiment of the present disclosure, when a user's hand approaches a mobile phone for each function while the mobile phone and a display are connected to each other, information suitable for each condition can be provided. Thus, the function can be manipulated without gaze dispersion, which makes it possible to improve driving stability. Furthermore, when the user's hand approaches the mobile phone, information may be displayed according to the driving safety priority, which makes it possible to improve accessibility.

Figure 45:
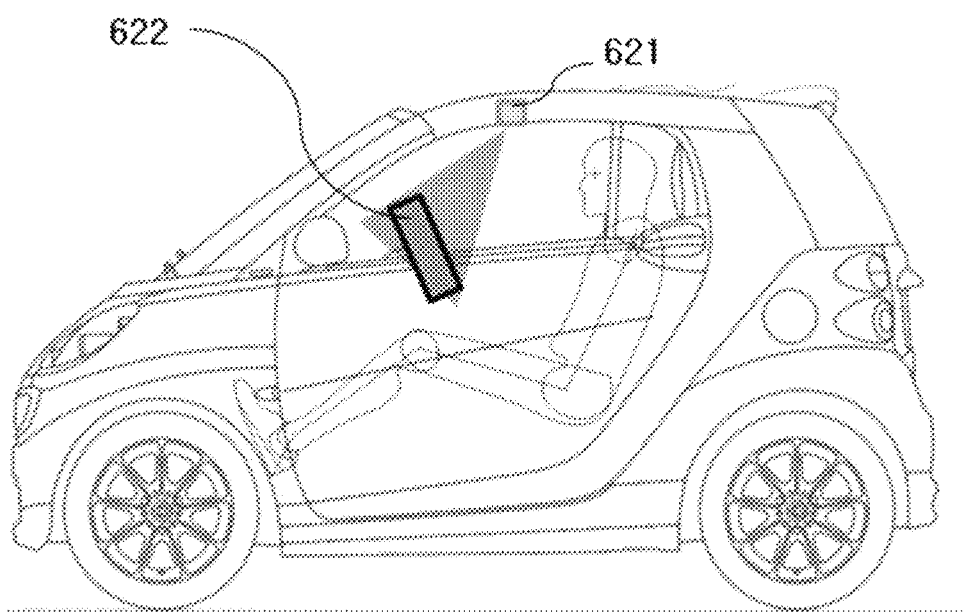
FIGS. 45 to 61 are diagrams illustrating examples in which information/screen is provided as the user's hand approaches the mobile phone, in accordance with an embodiment of the present disclosure.

FIG. 45 illustrates a sensor structure for sensing an approach in accordance with an embodiment of the present disclosure.

A position sensor/camera 621 is disposed to perform location determination logic based on ToF and image. A mobile phone is placed on a steering wheel 622.

Figure 46A:
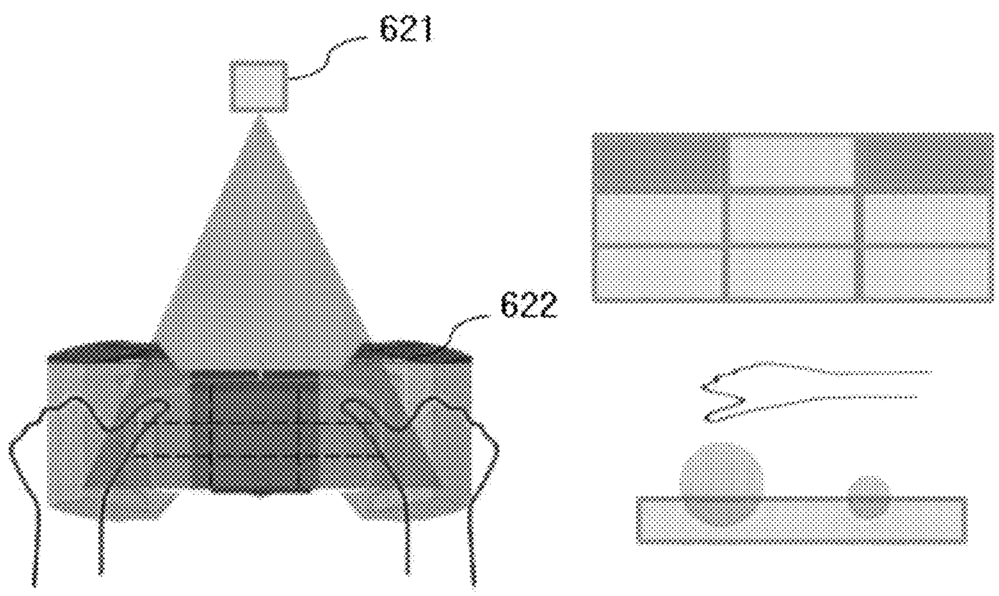

Referring to FIG. 46A, the location of a finger is primarily determined through camera sensing.

At this time, the area where the finger is located is recognized through the camera, in order to determine divided areas of a smart device, and capacitance is increased for each period and each location in advance.

Figure 46B:
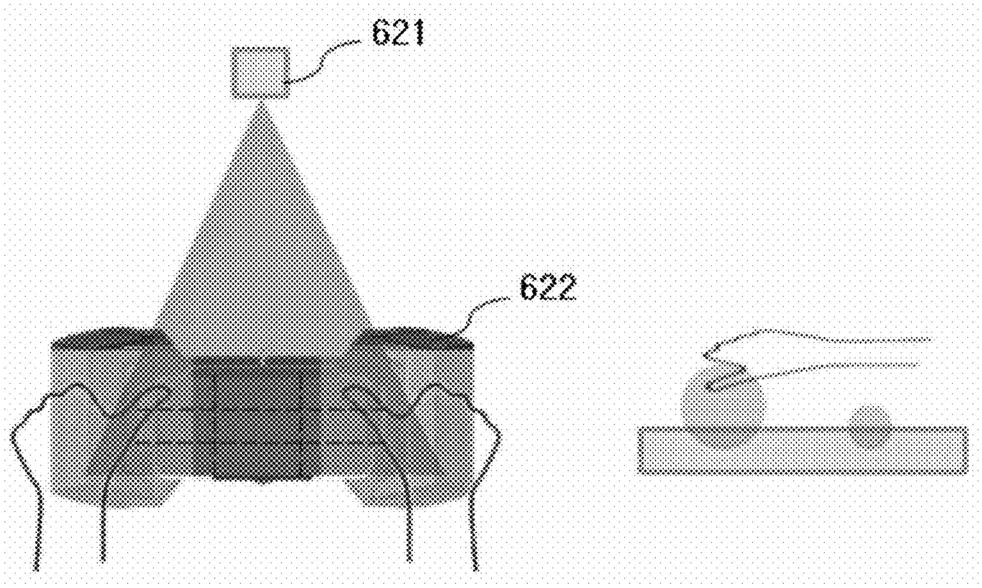

Referring to FIG. 46B, an approach to the smart device is secondarily determined, and the capacitance is increased to provide an UI change when the finger approaches the smart device, not immediately before the smart device is touched.

When the entire capacitance is increased, a problem such as ghost touch may occur. However, the capacitance for each location may be controlled to prevent a malfunction.

Figure 47:
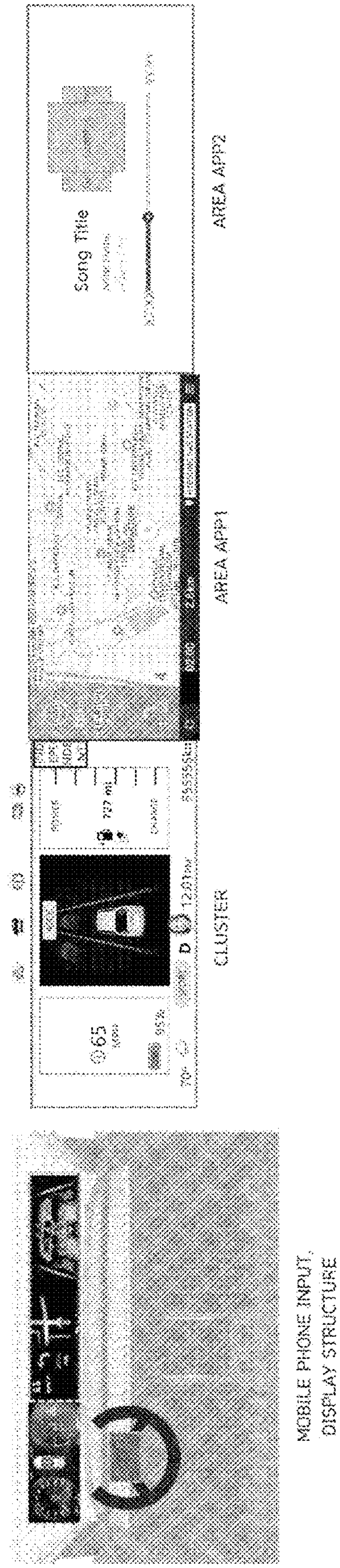

Referring to FIG. 47, the smart device may be placed on the steering wheel, in order to manipulate the internal display through the smart device. In a horizontal mode, the internal display can be manipulated, and in a vertical mode, the entire functions can be manipulated. At this time, the manipulation is set on the basis of a focused area on the display.

Figure 48:
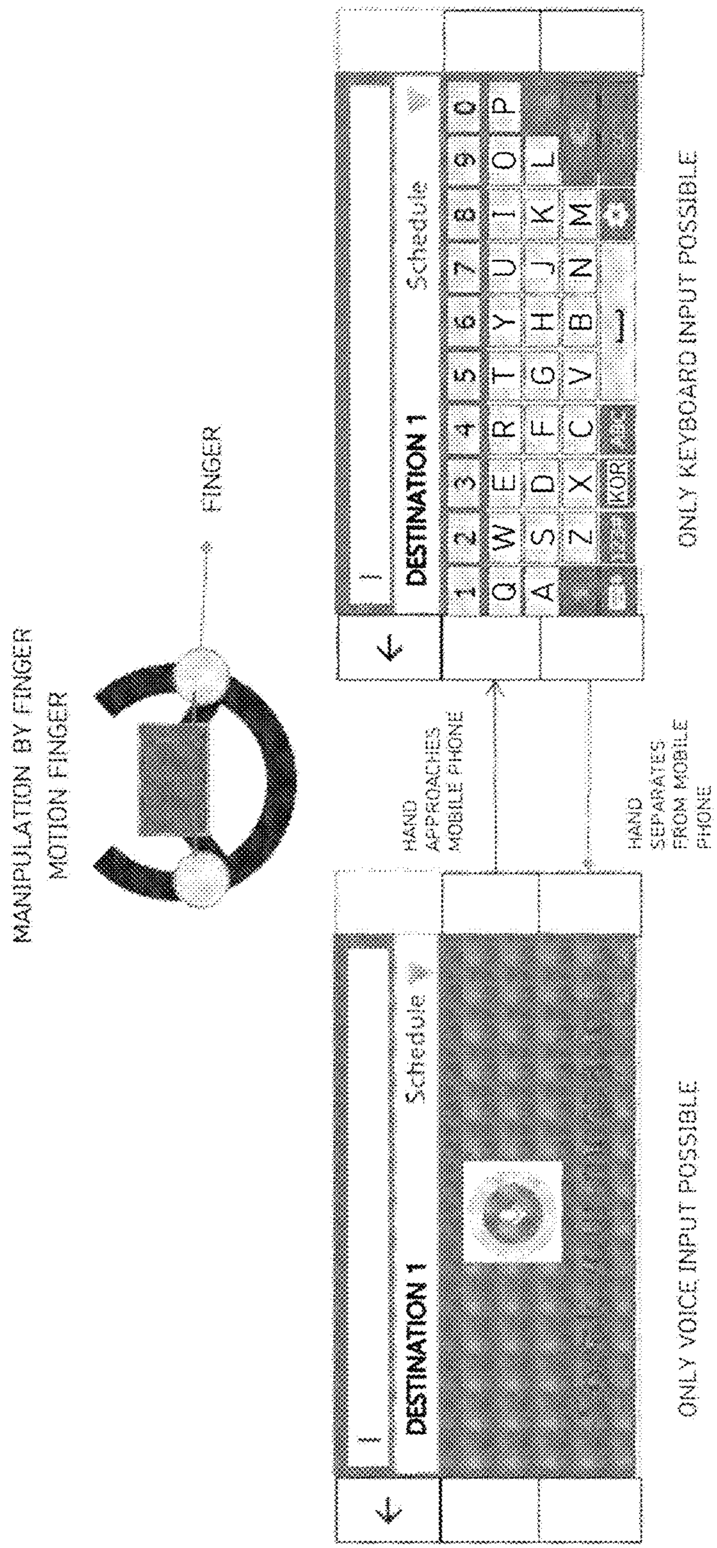

FIG. 48 illustrates a change in input screen depending on approach.

When information is inputted through a mobile phone, the information is inputted through a voice recognition mode or keyboard input mode. Depending on how much a finger approaches the mobile phone, the input screen is switched to the voice recognition mode or the keyboard input mode.

When a hand approaches the mobile phone on the screen in a state where only voice can be inputted, the input screen is changed to the keyboard input mode. Furthermore, when the hand separates from the mobile phone on the screen in a state where information can be inputted only through the keyboard, the input screen is changed to the voice input screen.

At this time, the keyboard input screen may be provided in such a state that voice input and keyboard input can be performed at the same time.

Figure 49:
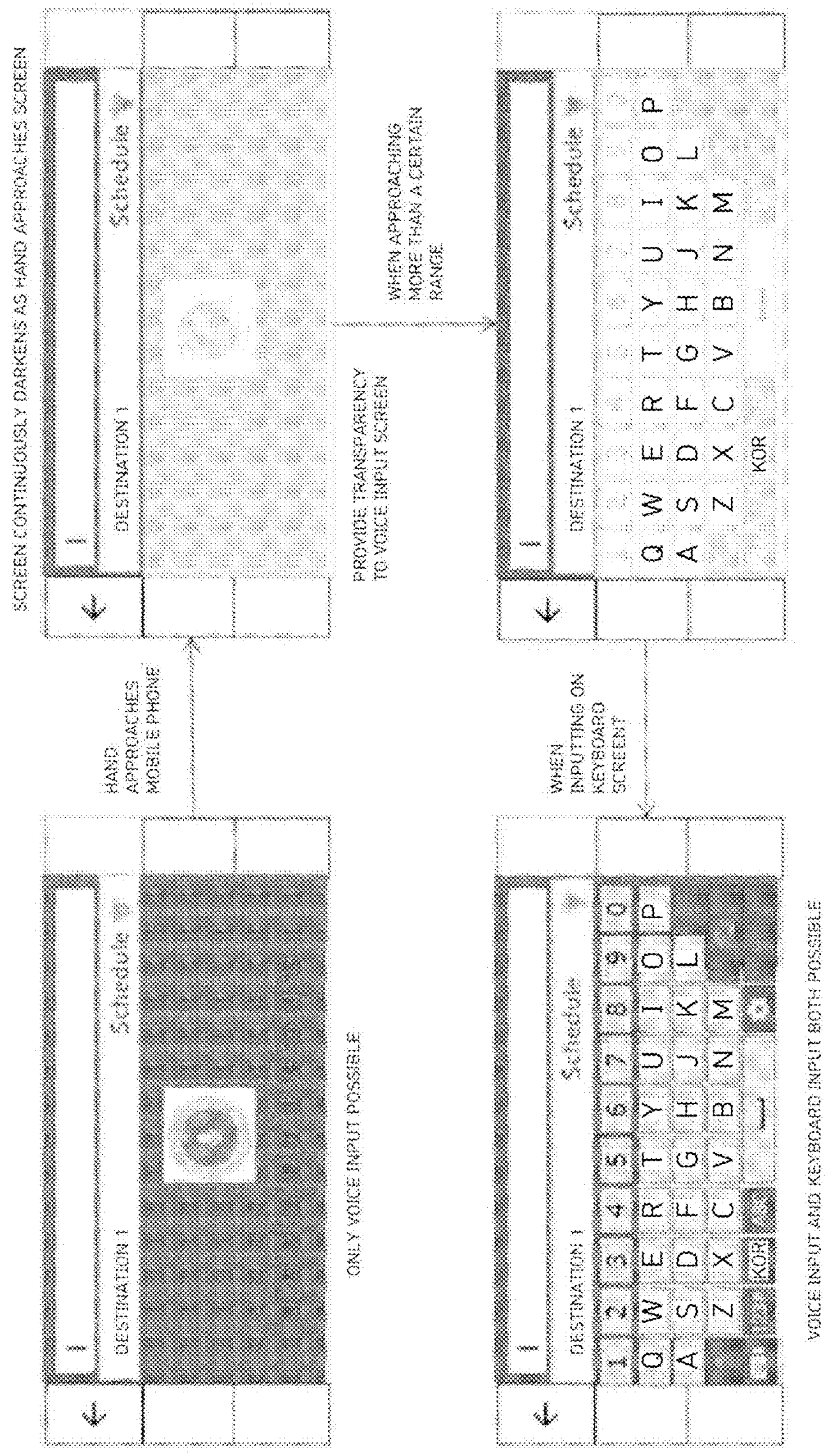

FIG. 49 illustrates a change in a transparency of an image displayed on the screen and a change in application, as the finger approaches or separates from a smart device.

When a hand approaches the mobile phone in a state where only voice can be inputted, the voice input screen darkens as the approach distance decreases. Then, the keyboard screen is displayed when the approach distance falls within a predetermined range. When information is inputted on the keyboard screen, the transparency of the keyboard screen is converted into the initial transparency again. In this state, information can be inputted through both of the keyboard and the voice.

Figure 50:
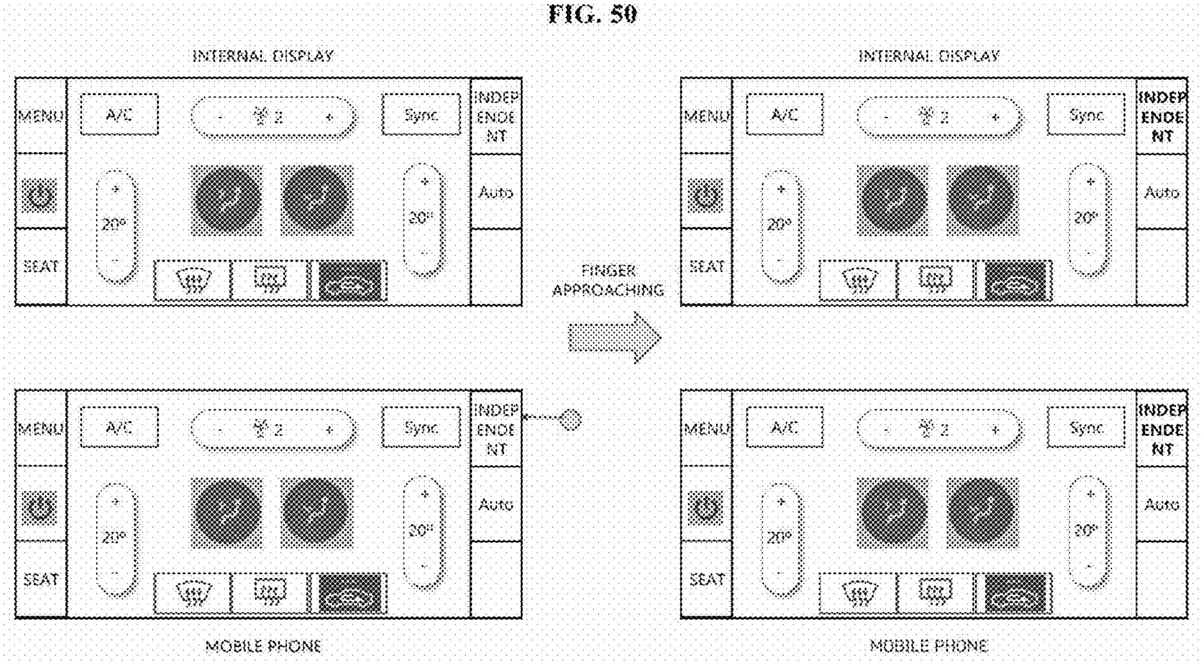

FIG. 50 illustrates that a button within the screen is activated as a finger approaches each area.

When a finger approaches a displayed button, the color of the button is changed to make a user perceive which button the user is approaching.

That is, when the finger approaches an independent button on the mobile phone, the color of the independent button is changed.

Figure 51:
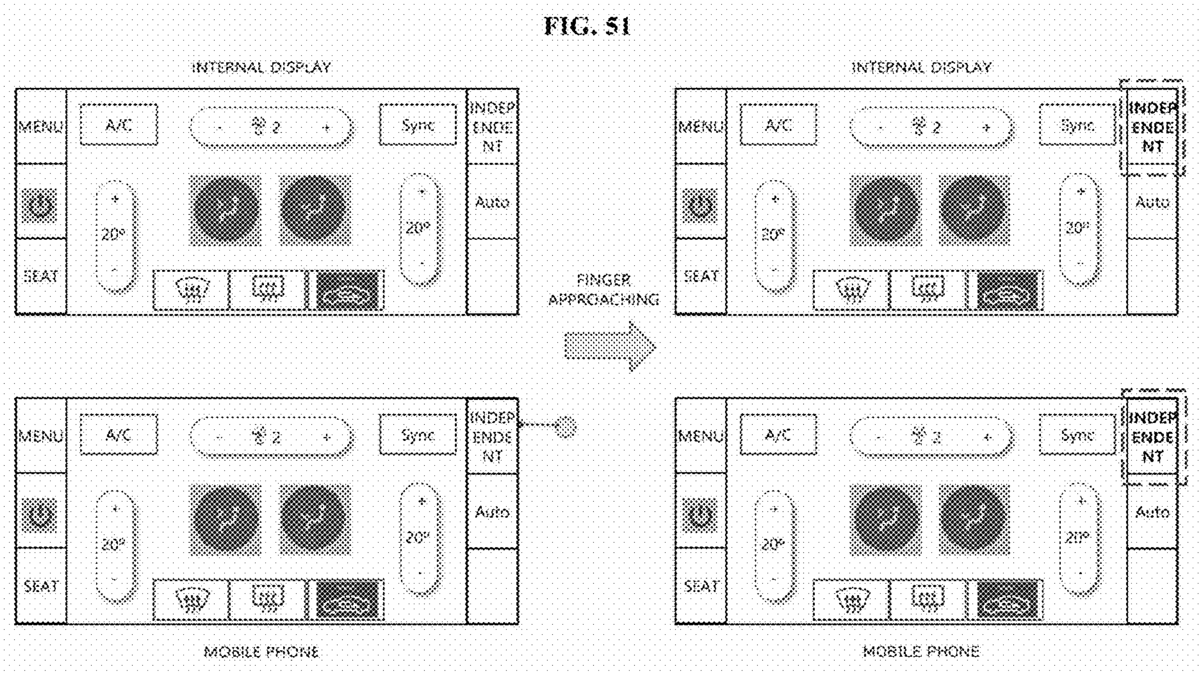

Referring to FIG. 51, when a finger approaches a button, the color and size of the button is changed and displayed.

When the finger approaches the independent button, the color, size and shape of the independent button approached by the finger are changed and displayed.

Figure 52:
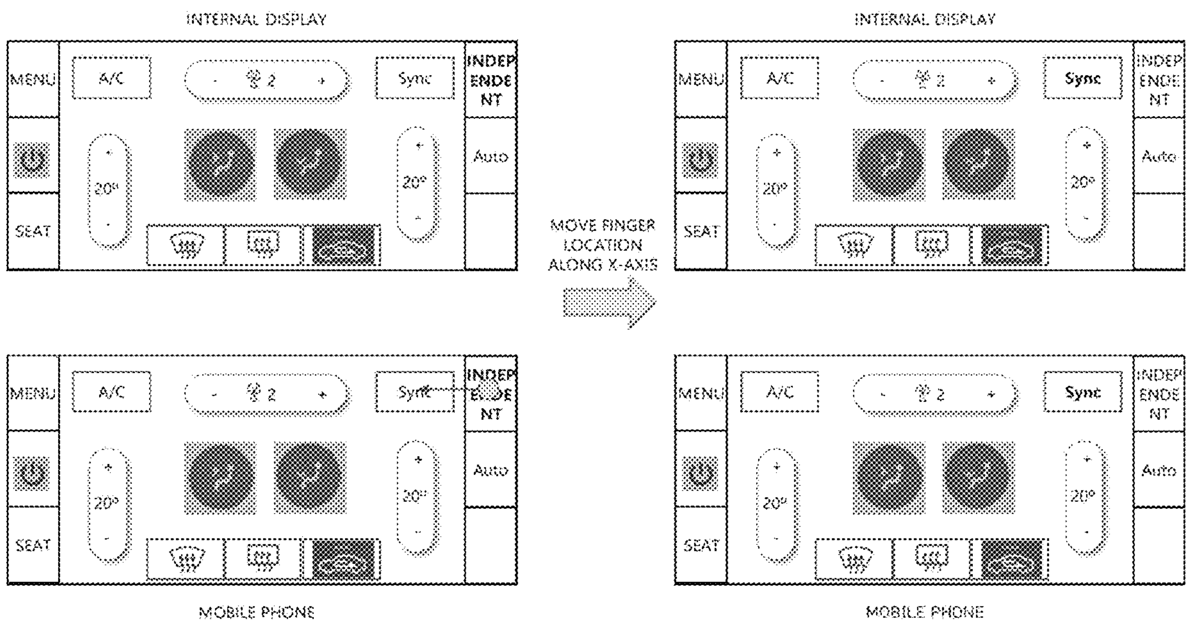

Referring to FIG. 52, when a finger moves from a selected point along the x and y axes, the size/shape of a button selected according to the state in which the finger moves along the x-axis is changed. At this time, the button is displayed in a different color from the previous color of the button, or displayed blinking.

Furthermore, the size of the button may be expanded and displayed without departing from the existing button layout. When the expanded button is touched, the corresponding function is performed.

Figure 53:
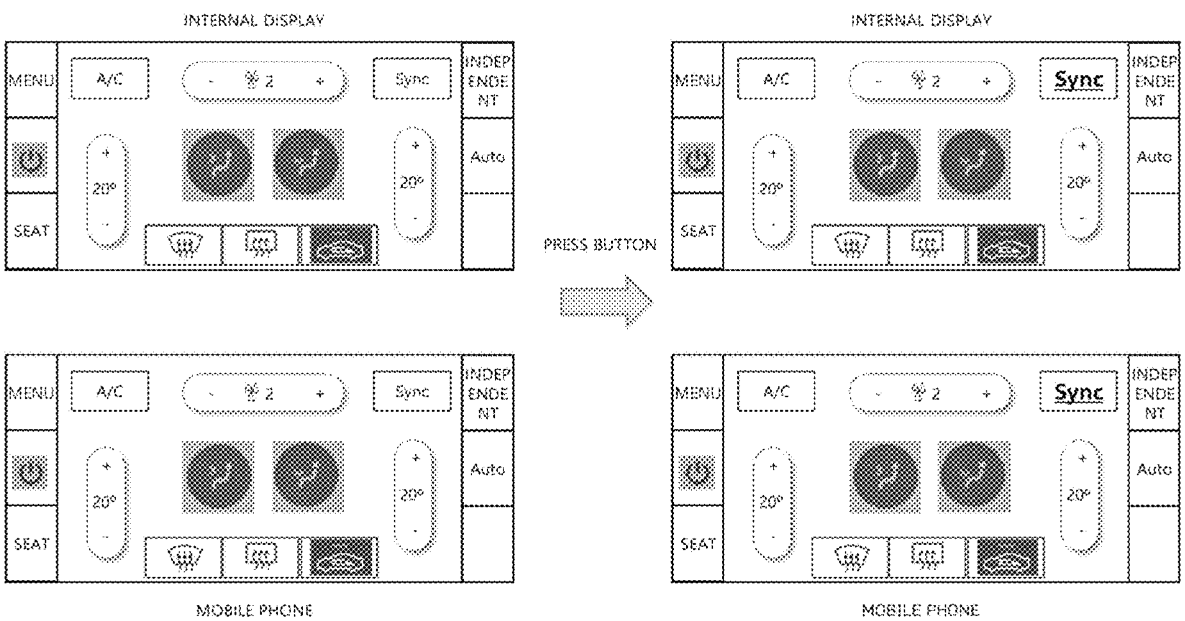

FIG. 53 illustrates the case in which a finger moves from a selected point along the x and y axes. When a button is pressed, the color of the pressed button is displayed in a different color from the color of the button which was approached by the finger, in order to prevent a user's confusion.

Figure 54:
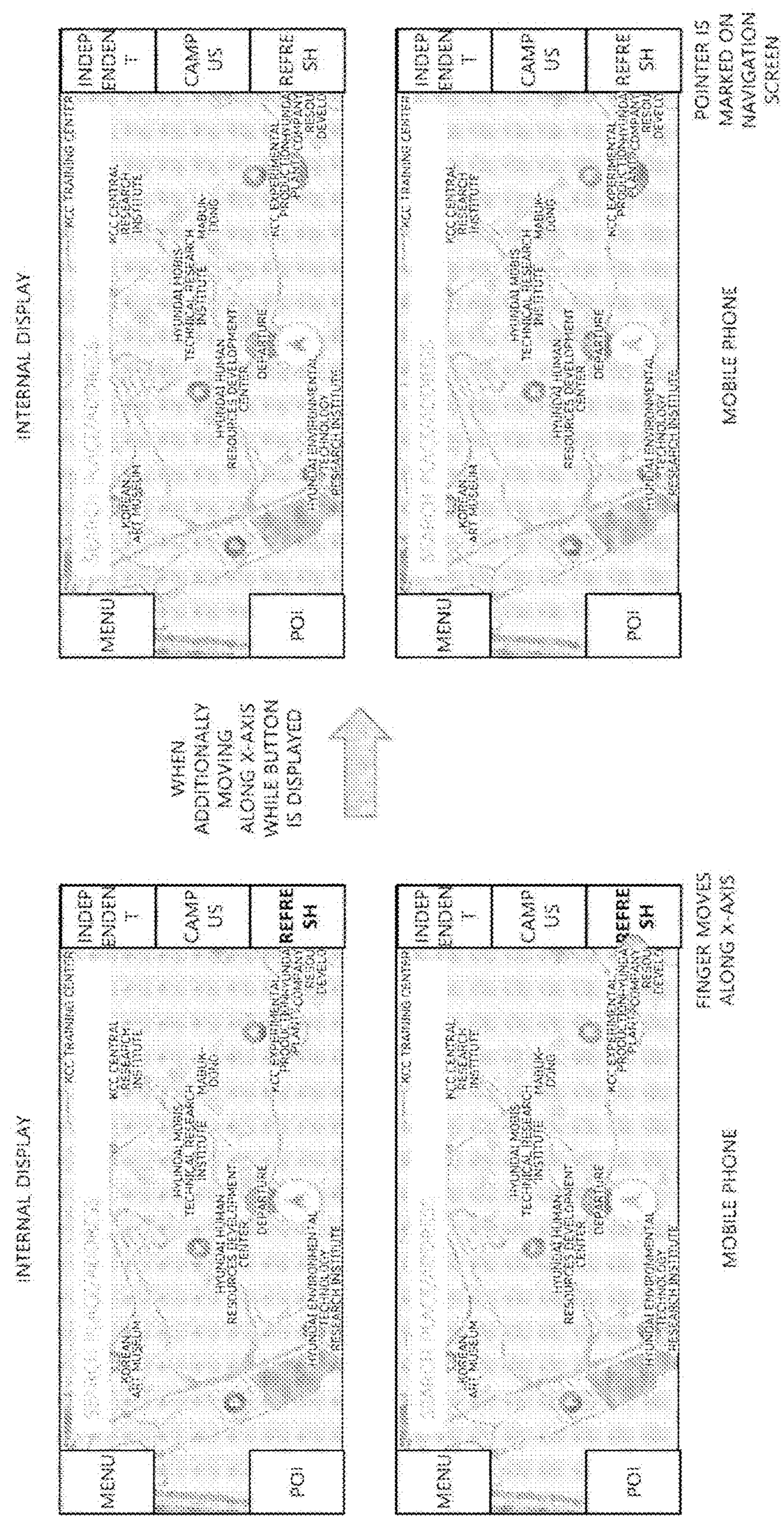

Referring to FIG. 54, when a finger approaches a refresh button, the color or size of the refresh button is changed and displayed on the mobile phone and the internal display.

Figure 55:
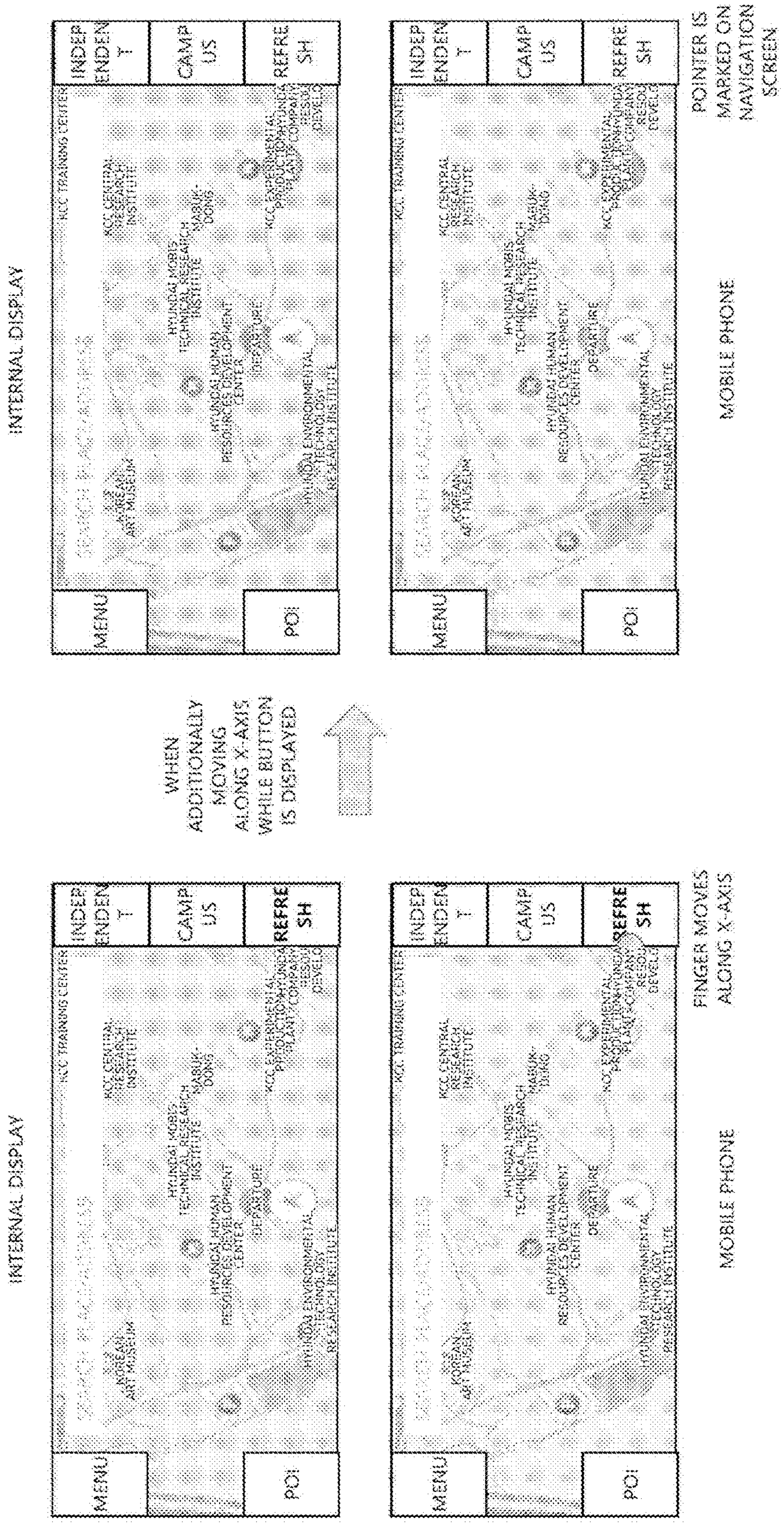

Referring to FIG. 55, when a finger additionally moves along the x-axis while a button is displayed on the navigation screen, a point on the screen is displayed in the form of a mouse pointer.

Figure 56:
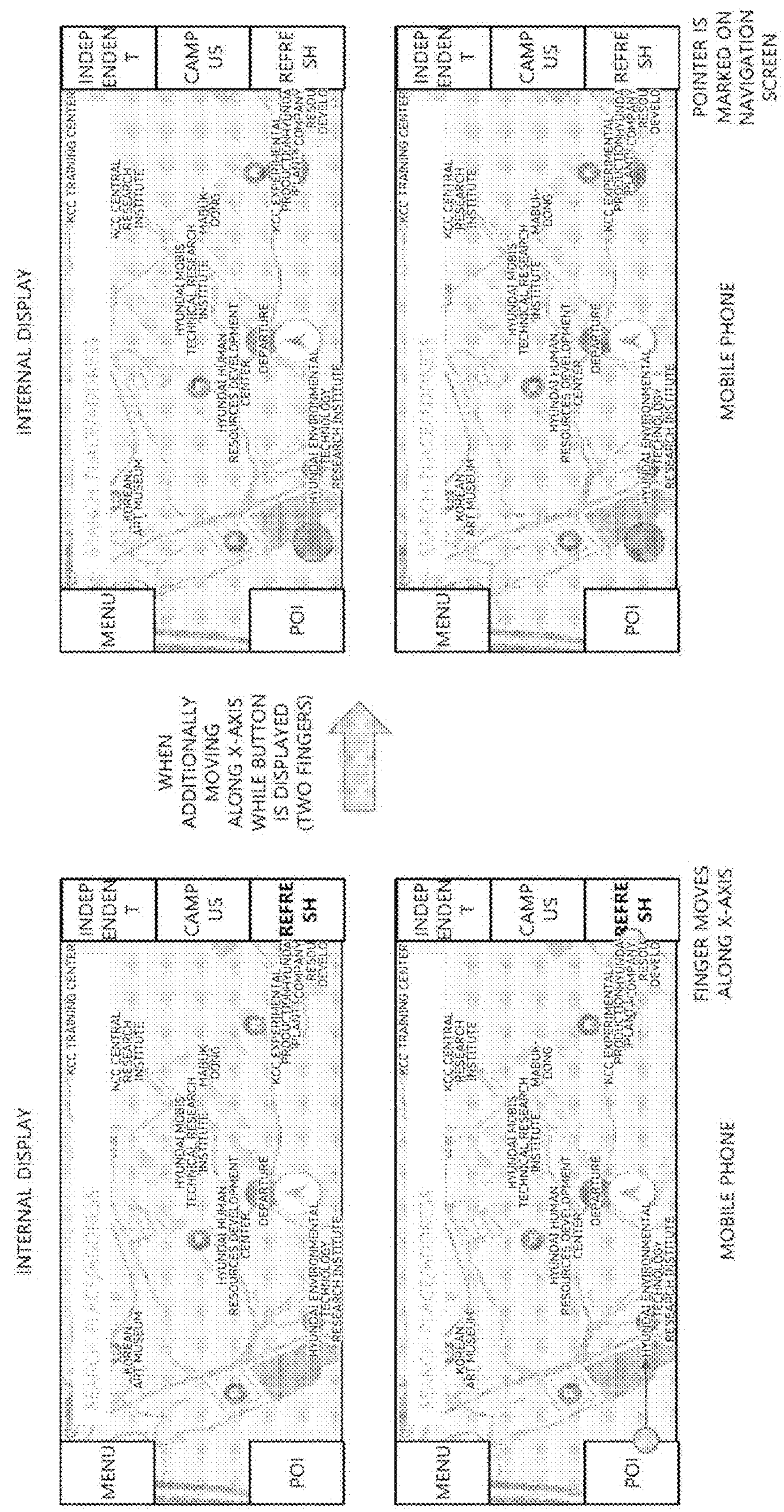

Referring to FIG. 56, a point on the navigation screen is displayed in the form of a mouse pointer. While a button is displayed, two fingers additionally move along the x-axis to perform a manipulation.

Figure 57:
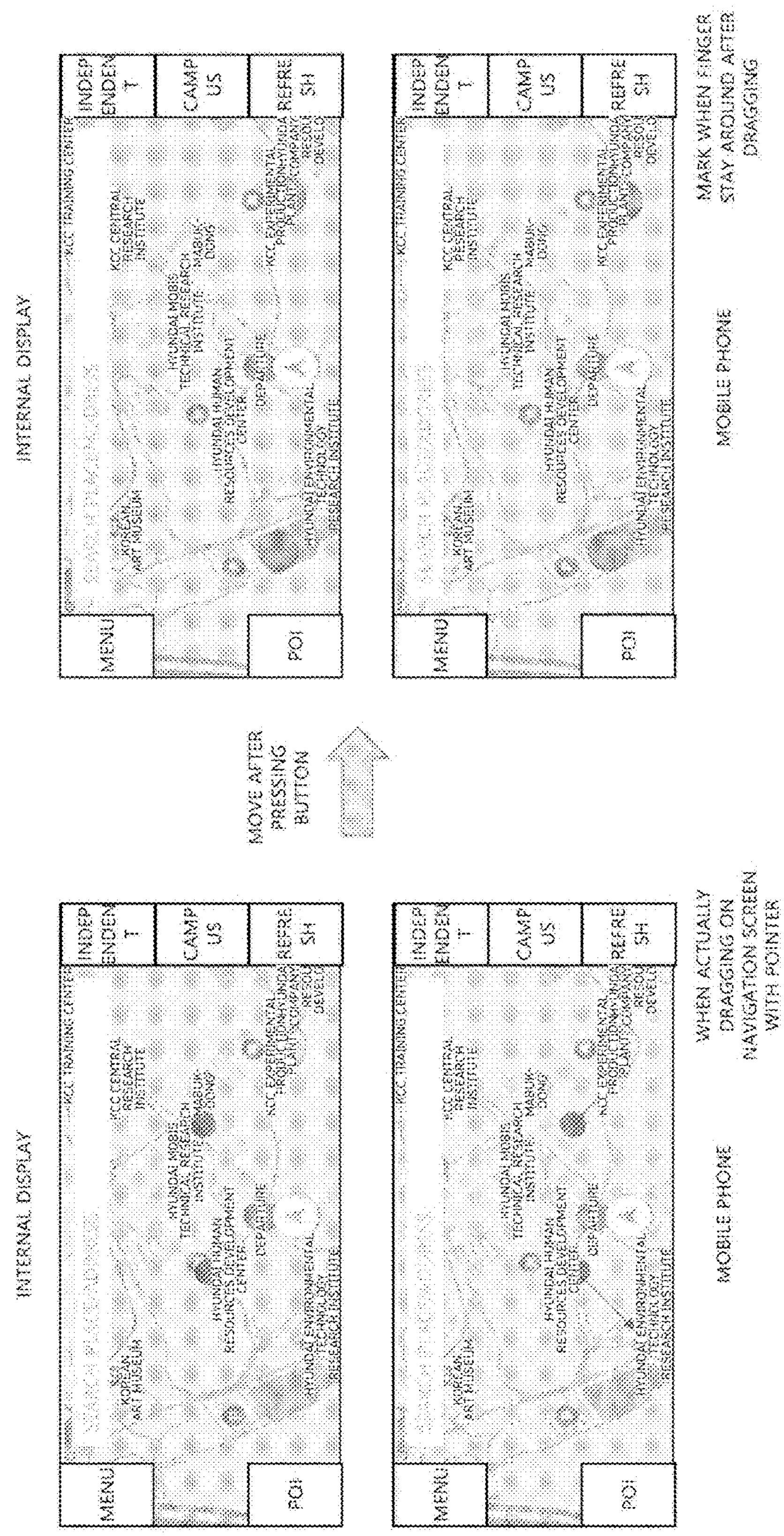

Referring to FIG. 57, 2-fingers pinch out is performed on the navigation screen.

Figure 58:
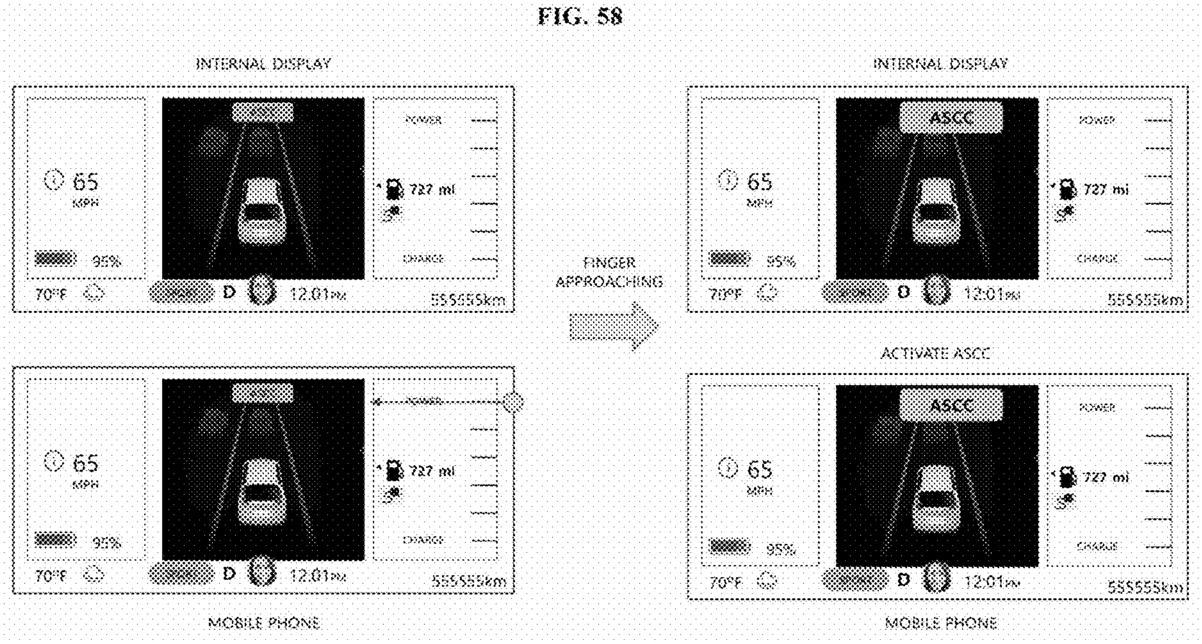

Referring to FIG. 58, one button is provided at each of the top, middle and bottom of the cluster screen in the y-axis direction. When a finger approaches along the x-axis based on the y-axis, the corresponding button is immediately activated.

When the finger approaches along the x-axis at the top of the cluster screen, the ASCC (Advanced Smart Cruise Control) is activated. When the ASCC is activated, the screen of the mobile phone is touched to manipulate the function.

When the finger approaches the along the x-axis at the bottom of the cluster screen, a driving mode is activated.

Figure 59:
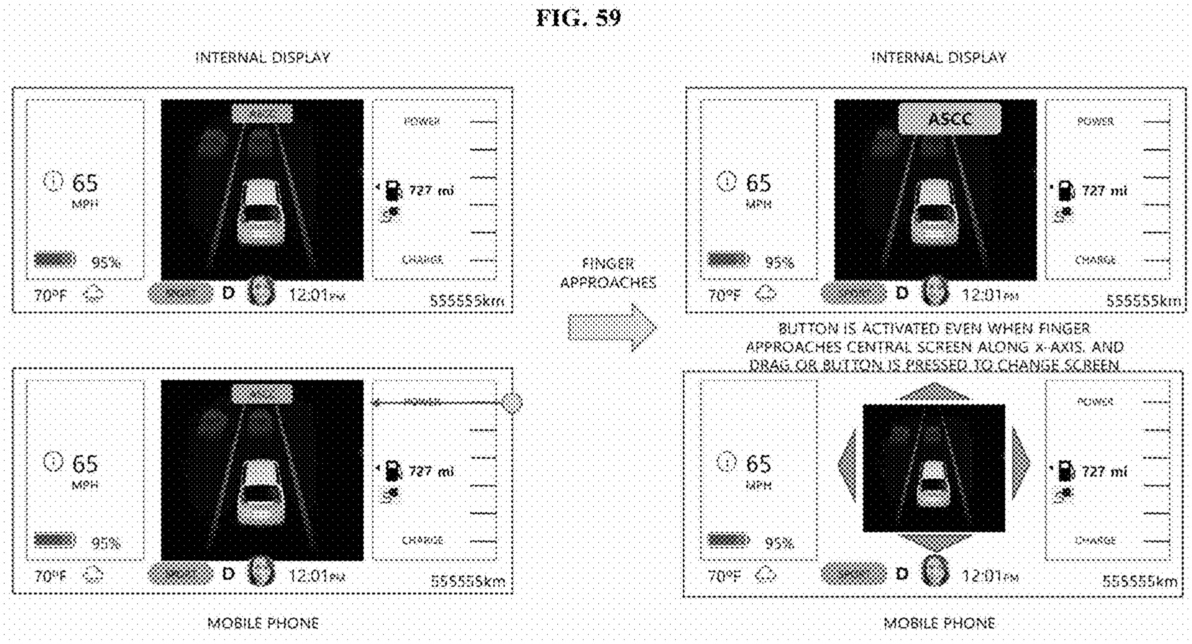

Referring to FIG. 59, one button is provided at each of the top, middle and bottom of the cluster screen in the y-axis direction. Thus, when a finger approaches along the x-axis based on the y-axis, the corresponding button may be immediately activated.

When the finger approaches along the x-axis in the center of the cluster screen, the central screen can be changed and activated. When the central screen is activated, the screen of the mobile phone is touched to manipulate the function.

When the finger approaches the vicinities of the center screen along the x-axis, a button is activated. The screen can be changed through a drag or button touch.

Figure 60:
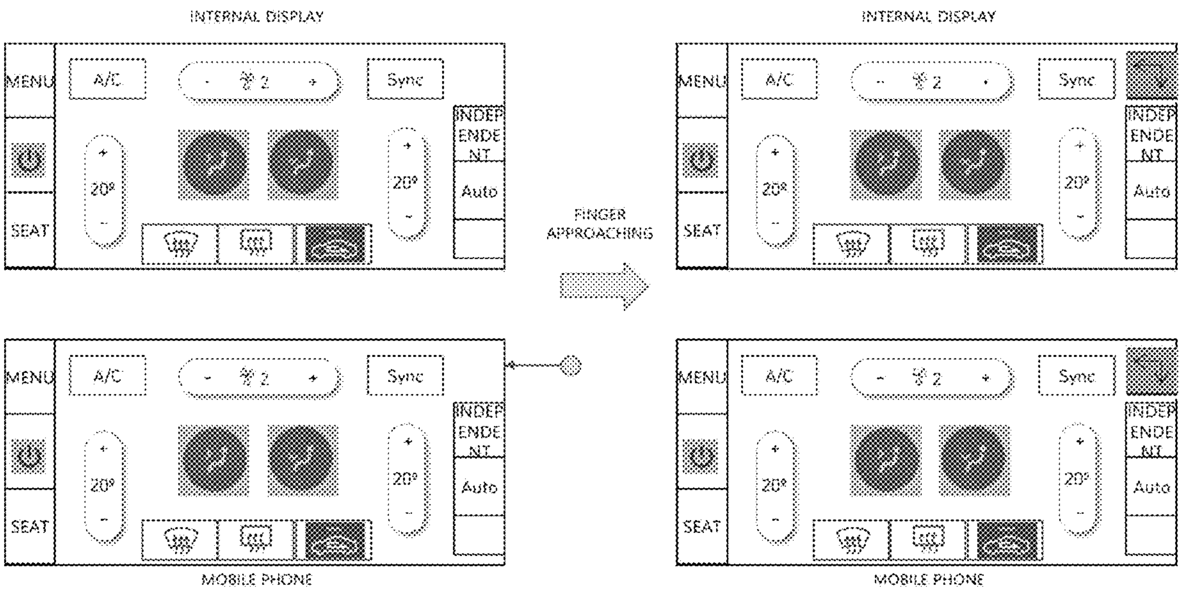

Referring to FIG. 60, driving safety pop-up, volume pop-up or focus movement may be performed only through a gesture.

When a finger approaches the mobile phone, the corresponding guide button is provided. Since the guide button is manipulated only through drag, the guide button is not displayed until the finger approaches the mobile phone.

Figure 61:
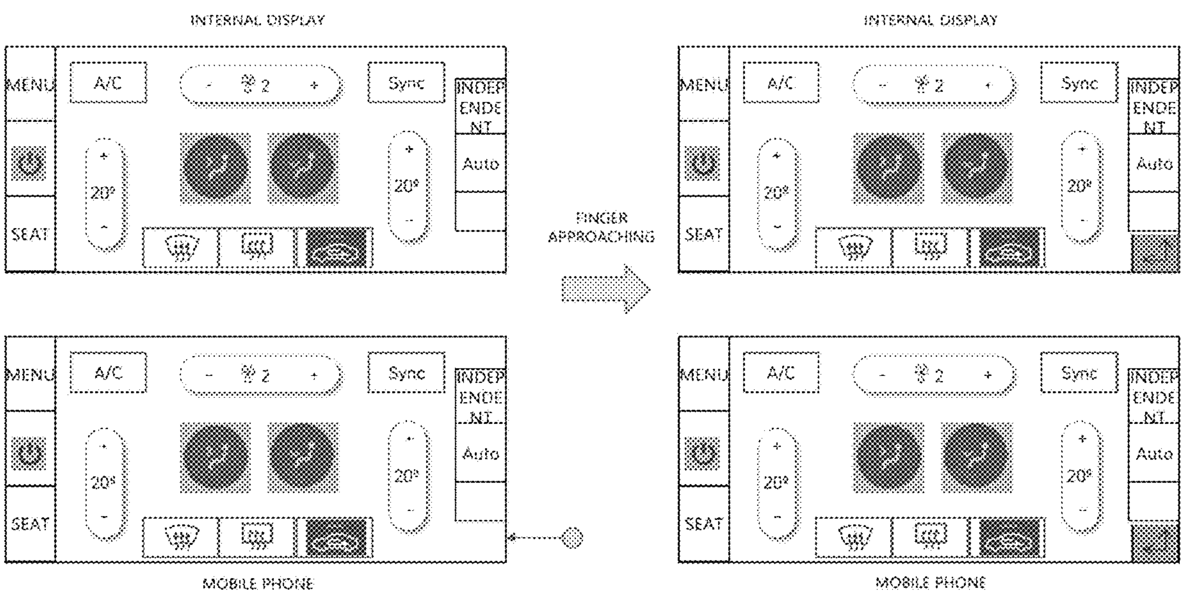

FIG. 61 illustrates a drag screen change depending on approach to each area.

Driving safety pop-up, volume pop-up or focus movement may be performed only through a gesture.

When a finger approaches the mobile phone, the corresponding guide button is provided. Since the guide button is manipulated only through drag, the guide button is not displayed until the finger approaches the mobile phone.

A vehicle information display apparatus in accordance with still another embodiment of the present disclosure includes an input unit configured to receive a voice recognition function call signal, a memory configured to store a program for controlling an internal display to display a voice recognition screen, by using the voice recognition function call signal, and a processor configured to execute the program. The processor controls the internal display to display a voice recognition pop-up screen, when a focused screen on the internal display screen is a cluster screen, and controls the internal display to display the full voice recognition pop-up screen when the focused screen is not the cluster screen.

The processor selectively displays recommended commands on the voice recognition screen in consideration of driving condition information.

The processor receives a voice command for a message, which is to be displayed through an external display, in consideration of the driving condition information, generates external communication text information according to the voice command, and controls the internal display to display the external communication text information.

The processor selects the recommended commands in descending order of recognition rate for the same function, in consideration of the driving condition information.

The processor displays a voice recognition-based function screen on an area excluding the cluster area, among the areas of the internal display screen.

A vehicle information display method in accordance with yet another embodiment of the present disclosure includes step (a) of receiving a voice recognition calling signal, and step (b) of displaying a voice recognition screen on an internal display screen, by using the voice recognition calling signal.

Step (b) includes displaying a voice recognition pop-up screen when a focused screen on the internal display screen is a cluster screen, and displaying the full voice recognition pop-up screen when the focused screen is not the cluster screen.

Step (b) includes selectively displaying recommended commands on the voice recognition screen in consideration of driving condition information.

Step (b) includes receiving a voice command for a message, which is to be displayed through an external display, in consideration of the driving condition information, generating external communication text information according to the voice command, and controlling the internal display to display the external communication text information.

Step (b) includes displaying a voice recognition-based function screen on an area excluding the cluster area, among the areas of the internal display screen.

FIGS. 62 to 68 are diagrams illustrating a voice recognition function in accordance with an embodiment of the present disclosure.

Figure 62:
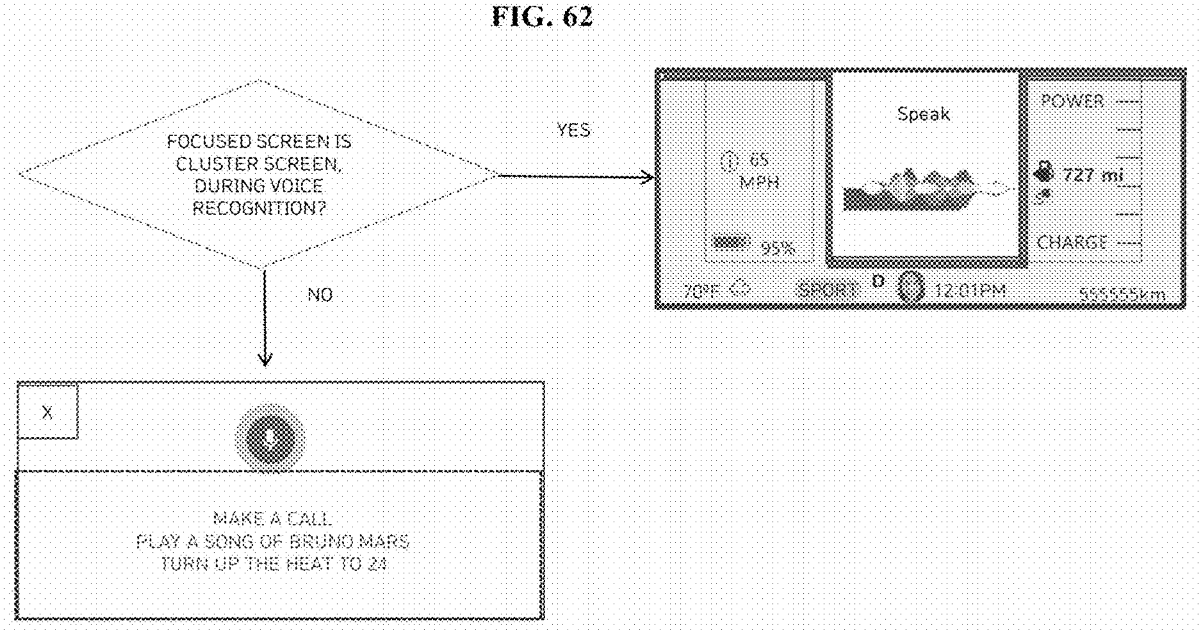
FIGS. 62 to 68 are diagram illustrating a voice recognition function in accordance with an embodiment of the present disclosure.

Referring to FIG. 62, when a focused screen is the cluster screen during voice recognition, a voice recognition screen is displayed as a pop-up screen.

When the focused screen is not the cluster screen during the voice recognition, the voice recognition screen is displayed.

On the voice recognition screen, functions registered in favorites are displayed, and recommended commands are displayed according to the frequencies of recently used functions.

At this time, the recommended commands are selected in consideration of driving information, surrounding environment information and use history information.

Figure 63:
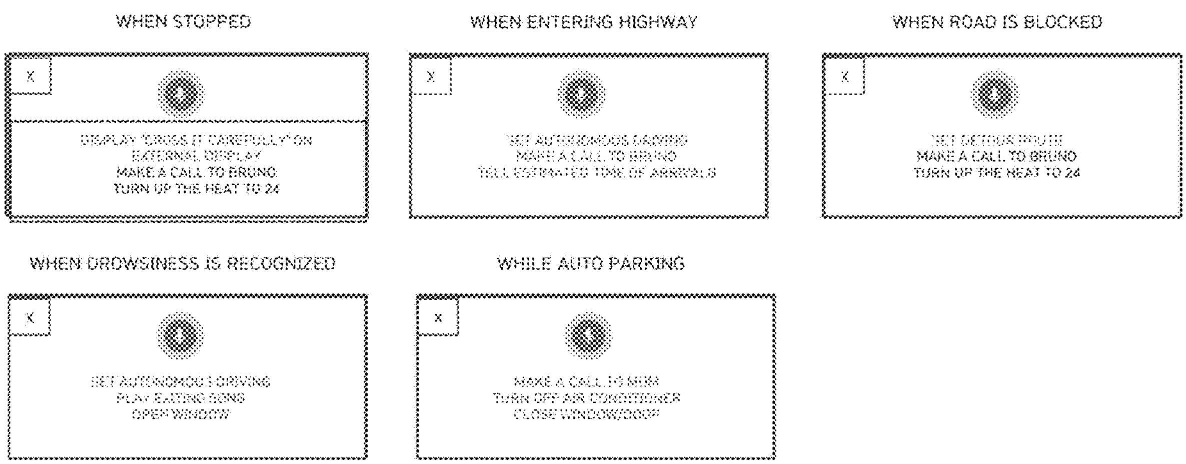

Referring to FIG. 63, recommended commands with priorities given thereto are displayed depending on conditions.

That is, a recommended command for executing a function which is expected to be required for a user is selected and displayed, depending on condition information indicating that the vehicle is stopped or enters a highway, traffic is congested, sleepiness is recognized, or auto parking is being performed.

Figure 64:
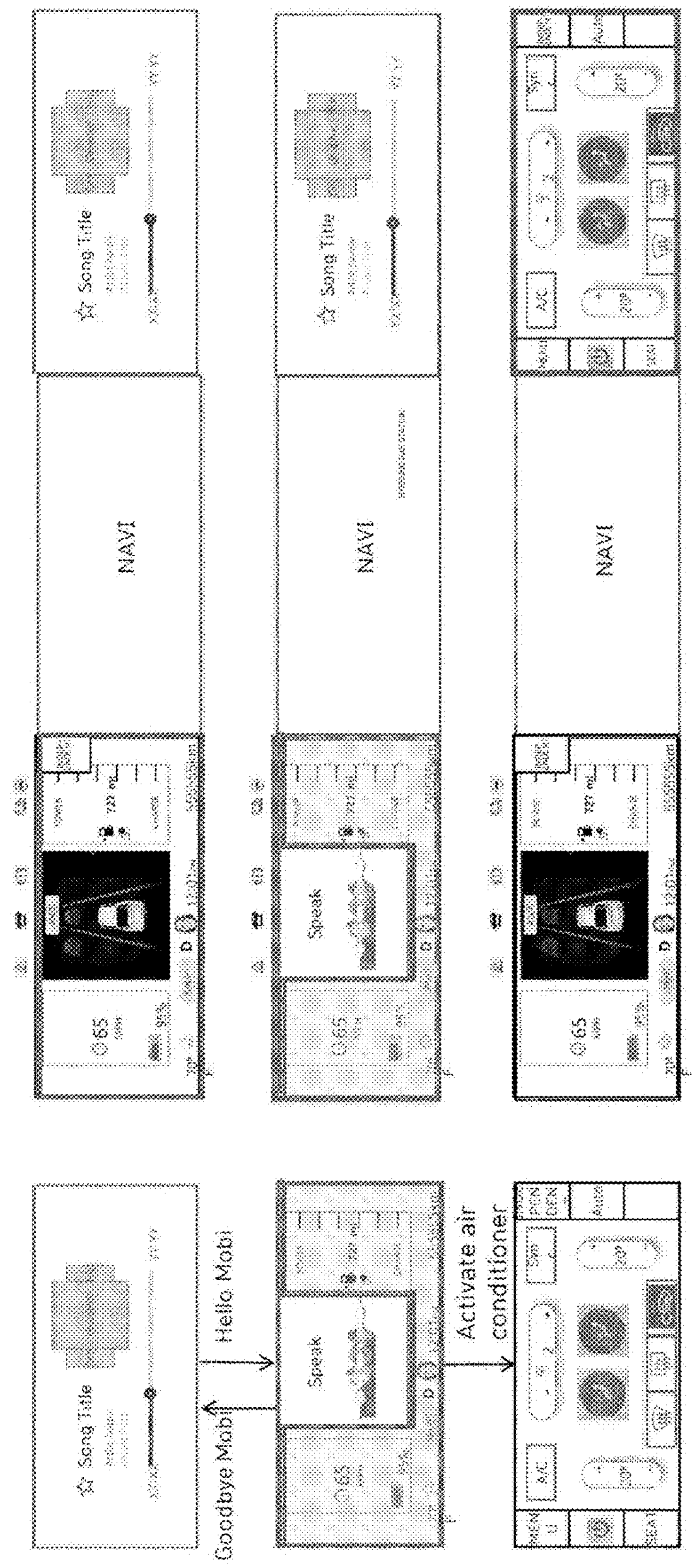

Referring to FIG. 64, the voice recognition function is called through a specific message, e.g. “Hello Mobi”, and canceled through a specific message, e.g. “Goodbye Mobi”, during the voice recognition.

Referring to FIG. 64, when a focused area is the cluster screen, a voice recognition screen is displayed as a pop-up screen on the central screen. When a function (e.g. air conditioning function) which is not displayed on areas App1 and App2 of the cluster screen is called, the corresponding function is displayed on the area App2, and the function which has been displayed on the area App2 disappears from the display screen.

Figure 65:
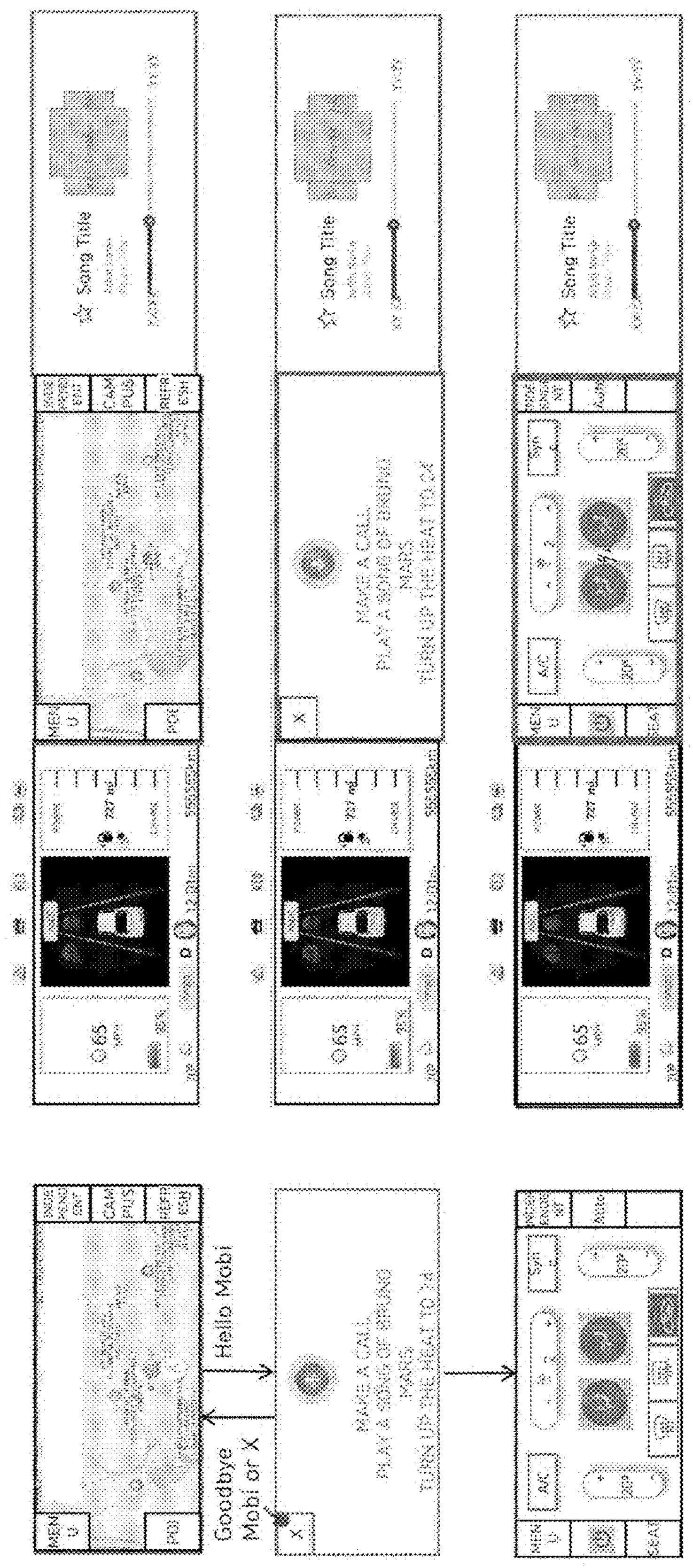

Referring to FIG. 65, when the voice recognition function is called (e.g. Hello Mobi) in case that areas other than the cluster screen are focused or the areas App1 and App2 are focused, the full pop-up screen is displayed.

On the full pop-up screen, recommended commands for functions which can be performed through voice recognition are displayed.

At this time, when a function other than the currently focused function is called, the function screen for the previously focused area is replaced with the corresponding function screen.

Figure 66:
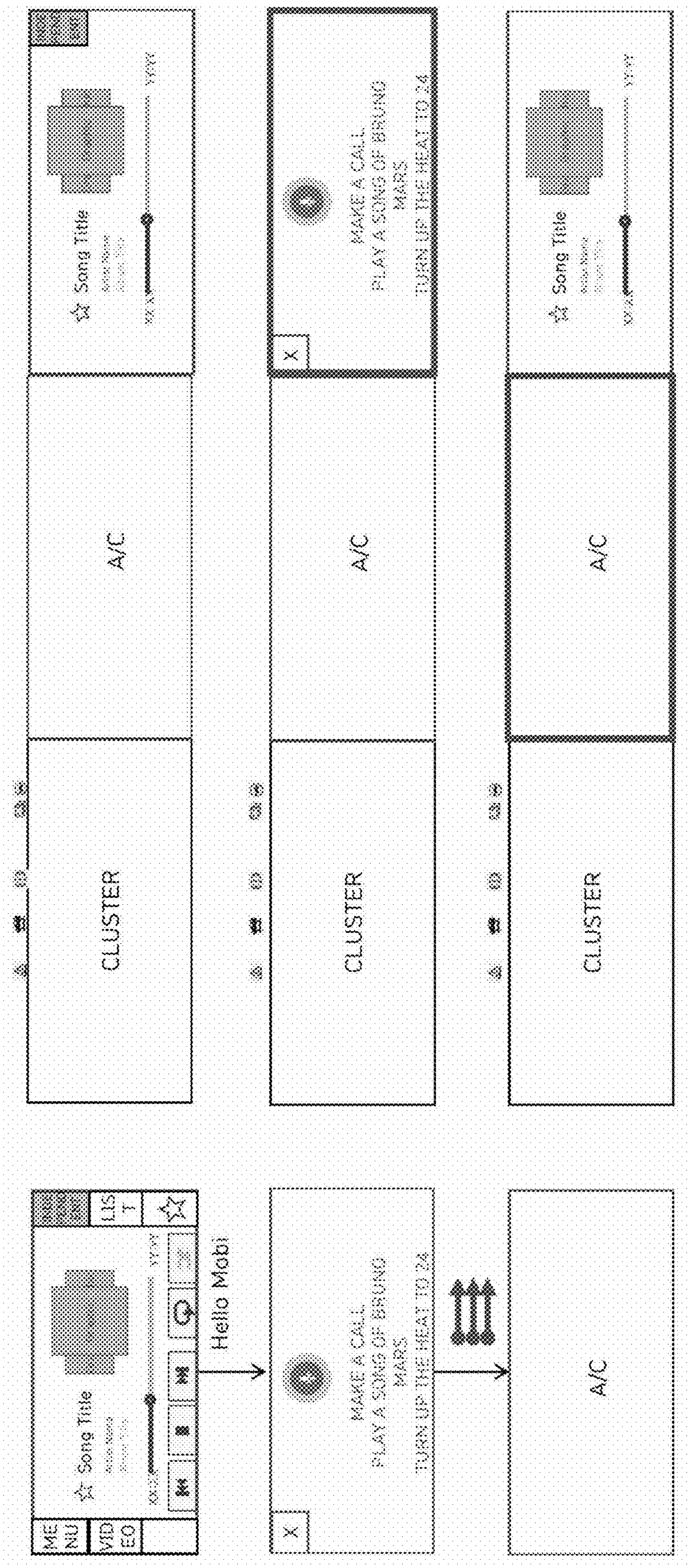

Referring to FIG. 66, when the voice recognition function is called in the independent mode, movement to another function and button manipulation within the screen are performed on the mobile phone. However, the corresponding manipulations are not performed on the internal display.

When the voice recognition function is performed, the mirroring mode is started and displayed.

Figure 67:
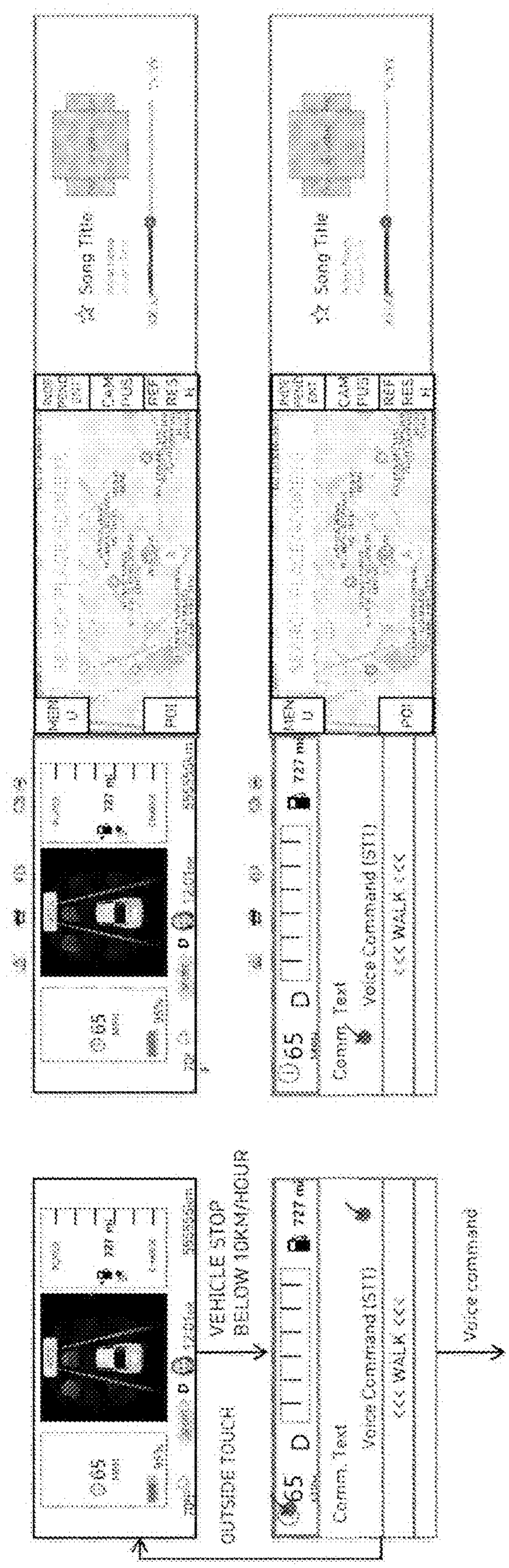
Figure 68:
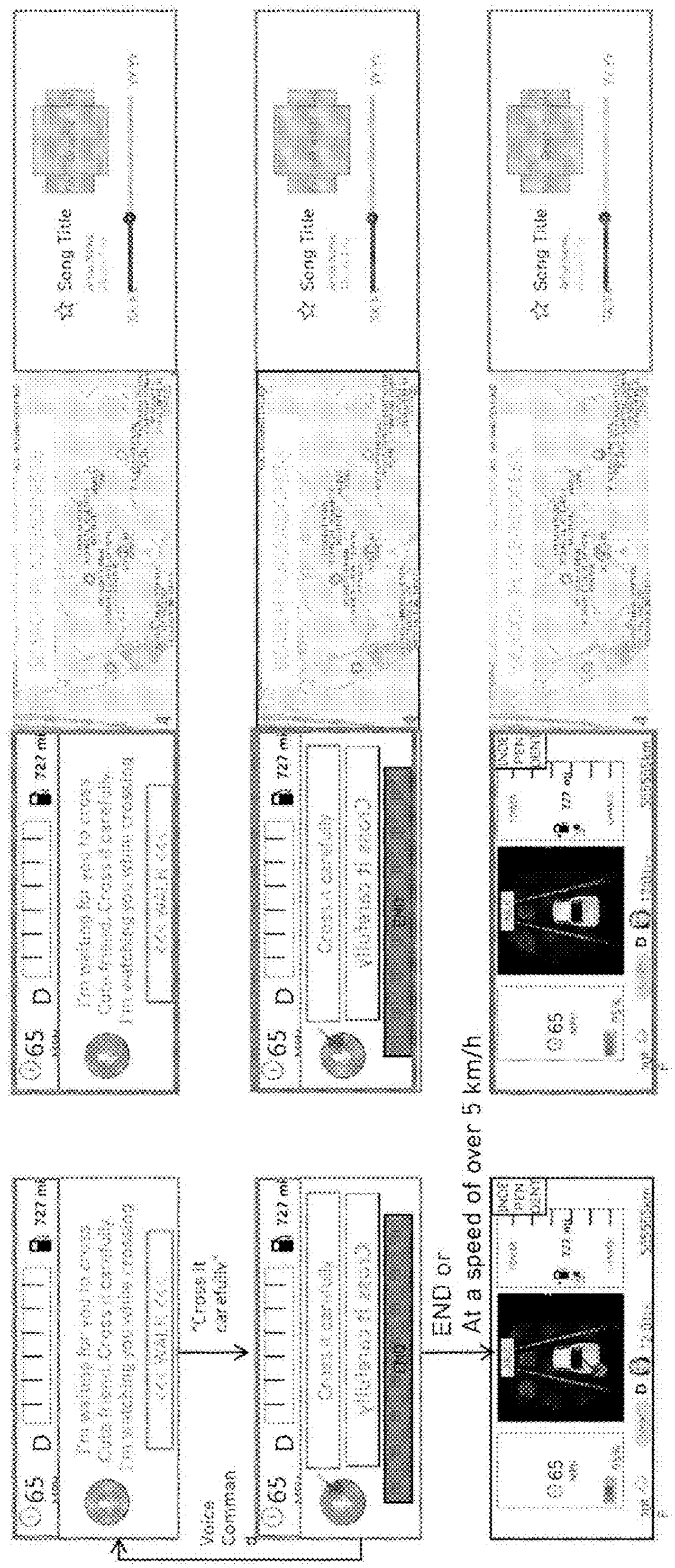

Referring to FIGS. 67 and 68, when the driving speed of the vehicle is equal to or less than preset speed, a screen for communication text is displayed. Then, when a command is inputted through voice recognition, recommended commands under the corresponding condition are displayed.

When a voice for another command based on a recommended command as well as a voice for the recommended command is inputted, a text for the voice can be displayed.

When the vehicle restarts driving after a specific condition (e.g. pedestrian crossing) is ended, the screen for the communication text disappears and returns to the existing cluster screen.

A vehicle information display apparatus in accordance with still yet another embodiment of the present disclosure includes an input unit configured to receive an independent mode setting signal in relation to interconnection between a user's mobile phone and an internal display of a vehicle, a memory configured to store a program for controlling the internal display to display a screen according to the independent mode setting signal, and a processor configured to execute the program. When the independent mode is set, the processor removes the focus of the internal display.

The processor removes the display of the other buttons excluding the independent mode button on the screen of the internal display of the vehicle.

When an area movement command is received through the user mobile terminal while the independent mode is set, the processor focuses an area corresponding to the area movement command.

When the independent mode is canceled, the processor displays a screen for another function, set by the user mobile terminal, on the display area where the independent mode is canceled.

A vehicle information display method in accordance with a further embodiment of the present disclosure includes step (a) of receiving an independent mode setting signal and step (b) of controlling an internal display of a vehicle to display a screen, by using the independent mode setting signal.

Step (b) includes removing the focus of the internal display of the vehicle when the independent mode is set.

Step (b) includes removing the display of the other buttons excluding an independent mode button on the screen of the internal display of the vehicle.

In step (b), when an area movement command for the internal display screen is received through the user mobile terminal while the independent mode is set, an area corresponding to the area movement command is focused.

In step (b), when the independent mode is canceled, a screen for another function set by the user mobile terminal is displayed on the display area where the independent mode is canceled.

FIGS. 69 to 77 are diagrams illustrating an independent mode function in accordance with an embodiment of the present disclosure.

Figure 69:
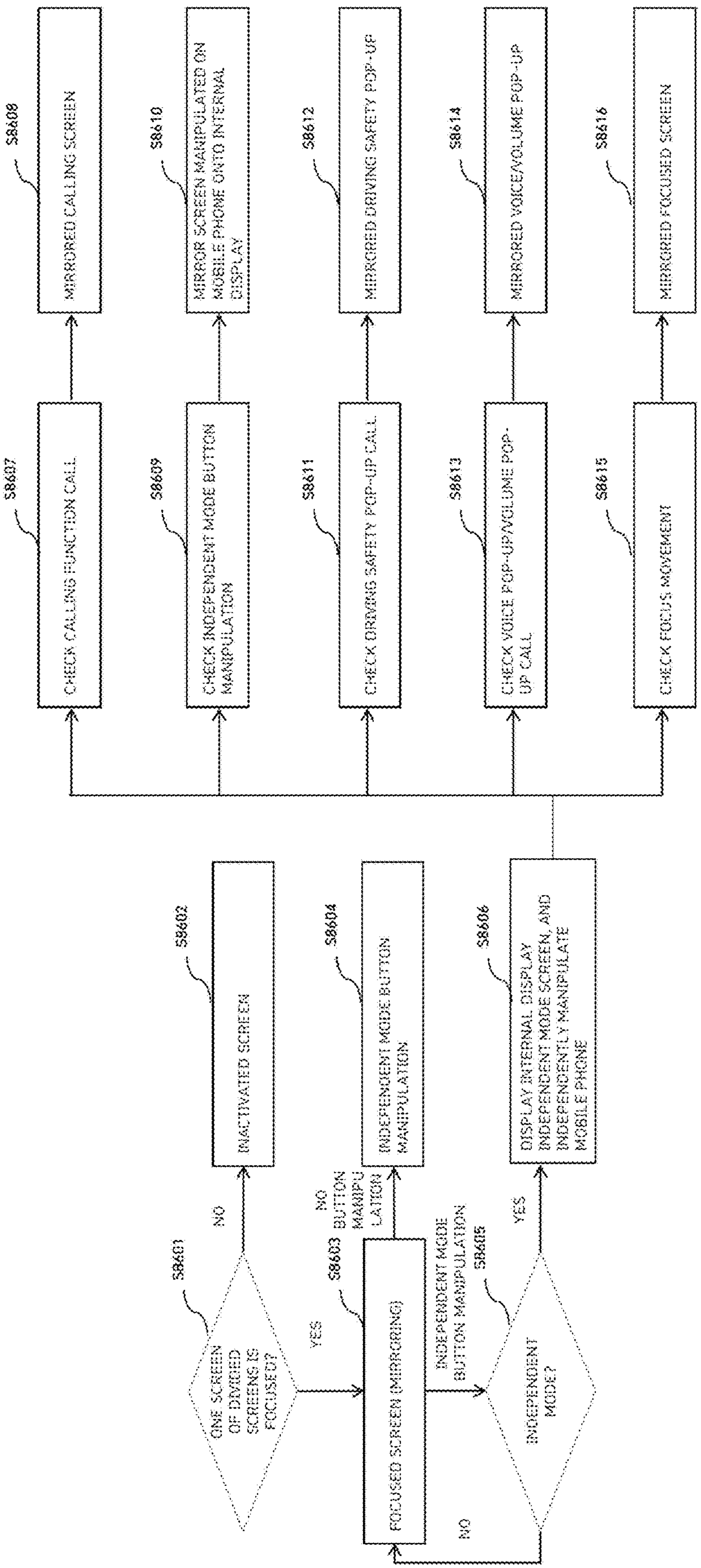
FIGS. 69 to 77 are diagrams illustrating an independent mode function in accordance with an embodiment of the present disclosure.

Referring to FIG. 69, the processor checks whether one screen among divided screens of the internal display is focused, in step S8601. When no screen is focused, the processor displays an inactivated screen in step S8602.

When a screen is focused, the focused screen is mirrored in step S8603.

When a preset time (e.g. 10 seconds) have passed with no button manipulation, the button is displayed as information in step S8604.

When the execution of the independent mode is confirmed in step S8605, an internal display independent mode screen is displayed, and the mobile phone is independently manipulated, in step S8606.

When a calling function call is checked in step S8607, a mirrored calling screen is displayed in step S8608.

When an independent mode button manipulation is checked in step S8609, a screen manipulated on the mobile phone is mirrored on the internal display in step S8610.

When a driving safety pop-up call is checked in step S8611, a mirrored driving safety pop-up screen is displayed in step S8612.

When a voice pop-up/volume pop-up call is checked in step S8613, a mirrored voice/volume pop-up screen is displayed in step S8614.

When the movement of the focus is checked in step S8615, the mirrored screen to which the focus has been moved is displayed in step S8616.

Figure 70:
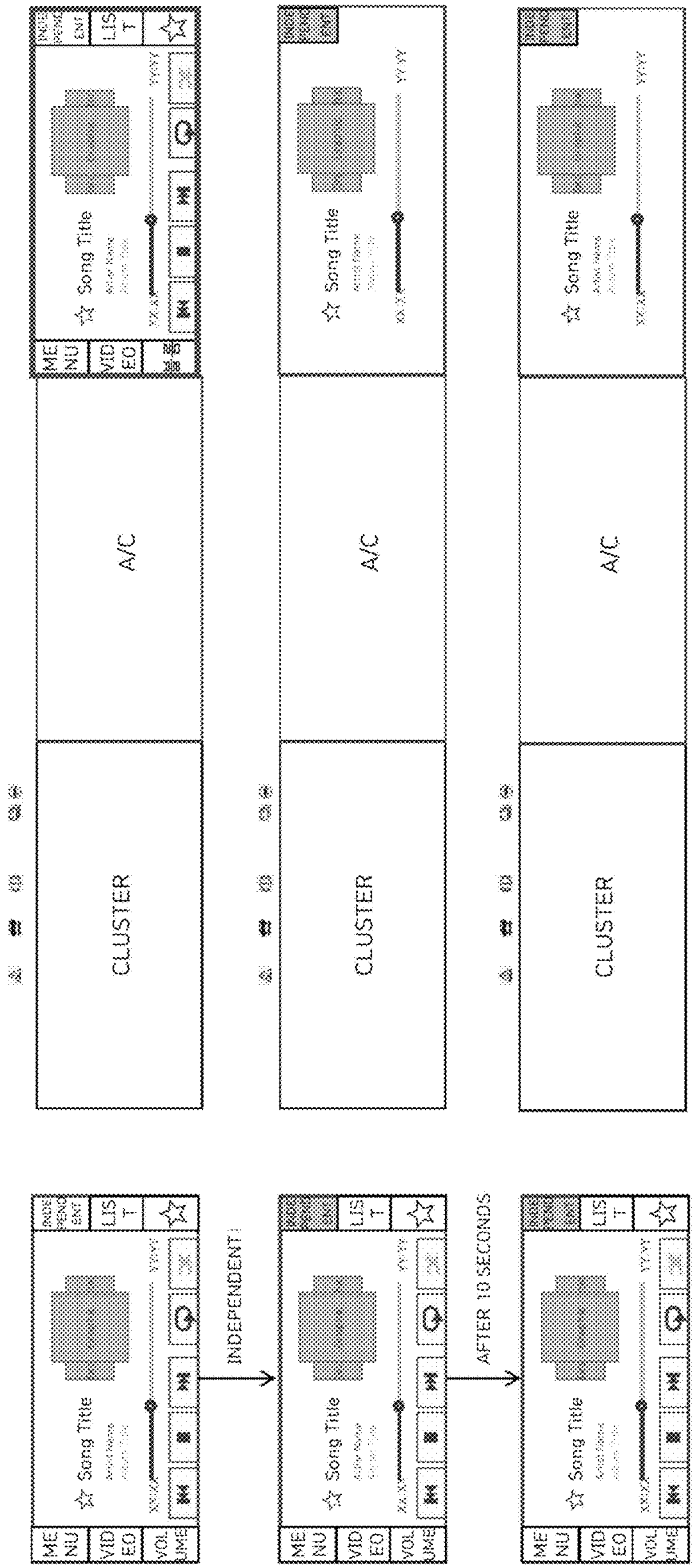

Referring to FIG. 70, when the independent mode is executed, the other buttons excluding the independent mode button are not displayed on the internal display screen, and the focus is removed.

Regardless of whether a preset time has passed after the manipulation, the independent mode is executed, and the focus is removed.

In the independent mode, the button displayed in the mobile phone is maintained.

Figure 71:
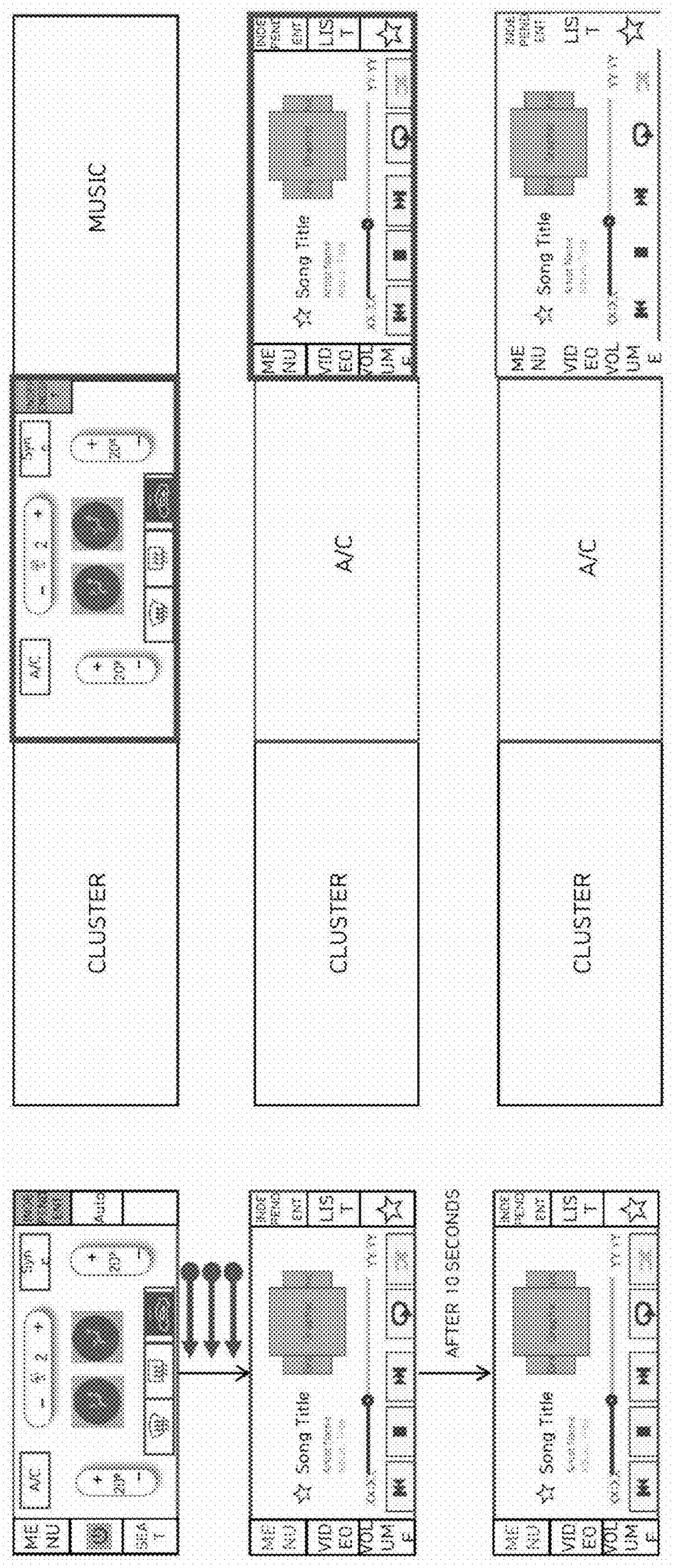

Referring to FIG. 71, when area movement is performed through a preset method (e.g. drag with three fingers) in the independent mode, the independent mode is canceled, and the corresponding area is displayed through mirroring and then focused.

When a preset time has passed without a manipulation while a focus is set on the internal display screen, the focus is removed, and the button on the internal display screen is changed to information.

Figure 72:
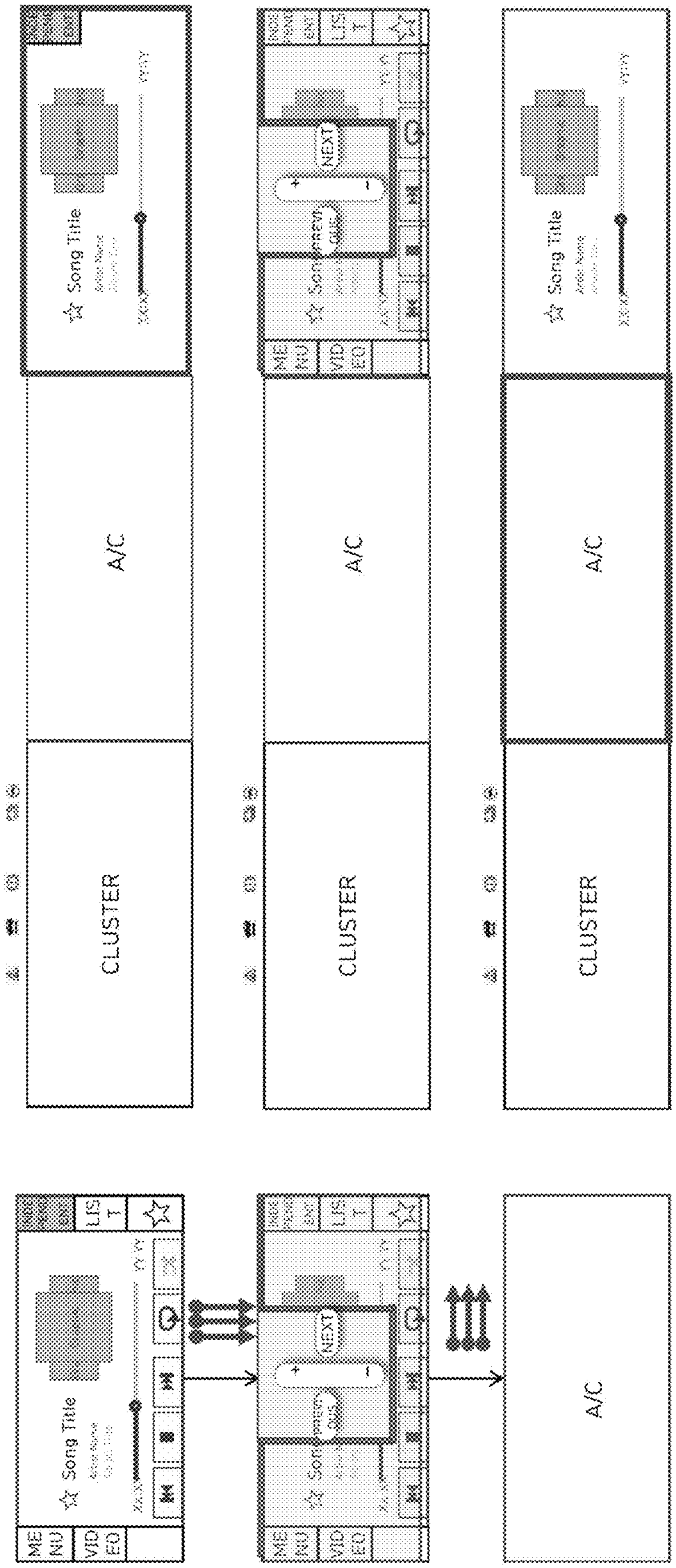

Referring to FIG. 72, when the independent mode is executed, a manipulation for moving to another function through a menu and a button manipulation within the screen are performed only on the mobile phone, and not performed on the display.

At this time, when an input for the volume or driving safety pop-up is conducted through a preset method (e.g. side-to-side drag with three fingers—area movement, up/down drag—volume, or down/up drag—driving safe pop-up), the mirror mode is performed to display the internal display screen.

Figure 73:
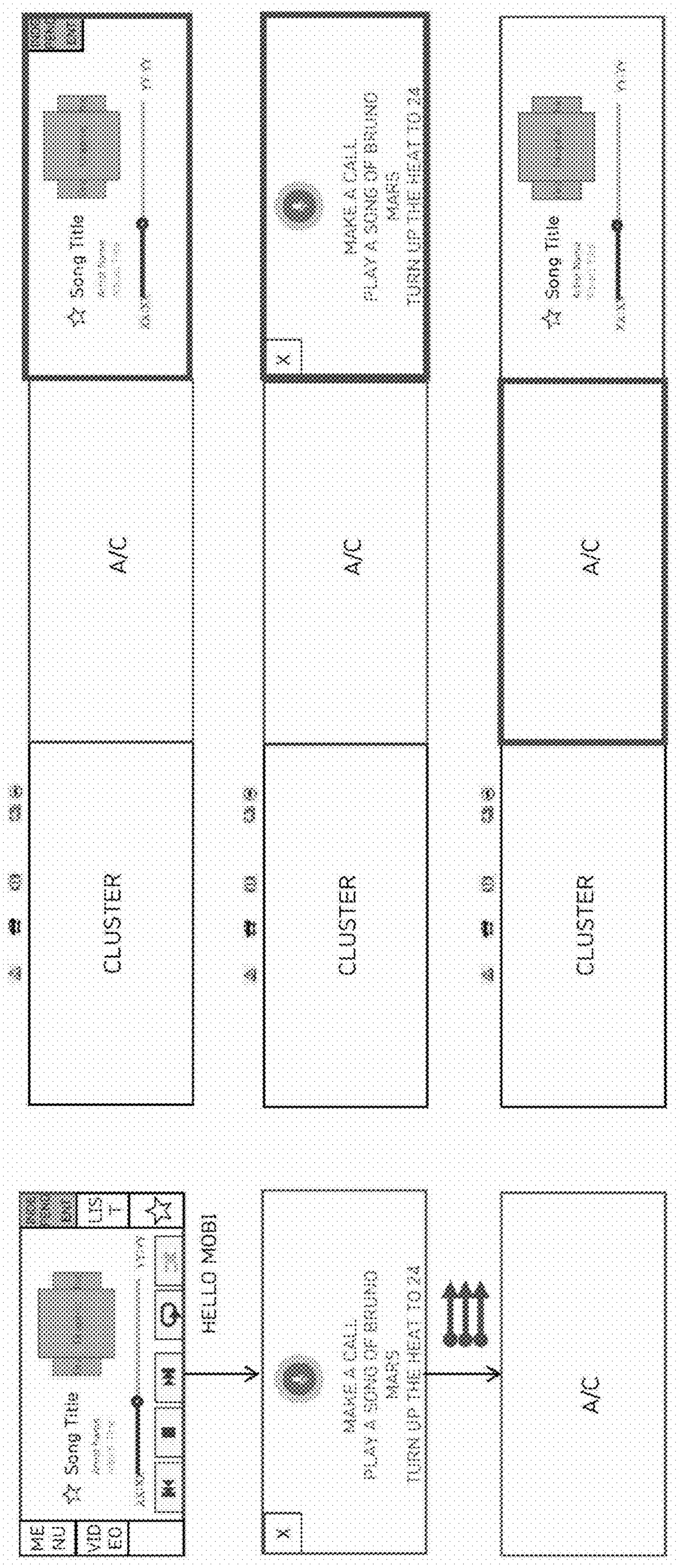

Referring to FIG. 73, when the independent mode is executed, a manipulation for moving to another function through a menu and a button manipulation within the screen is performed only on the mobile phone, and not performed on the display.

When a voice recognition function is performed on the media playing screen, the internal display screen is mirrored to display the voice recognition function.

Figure 74:
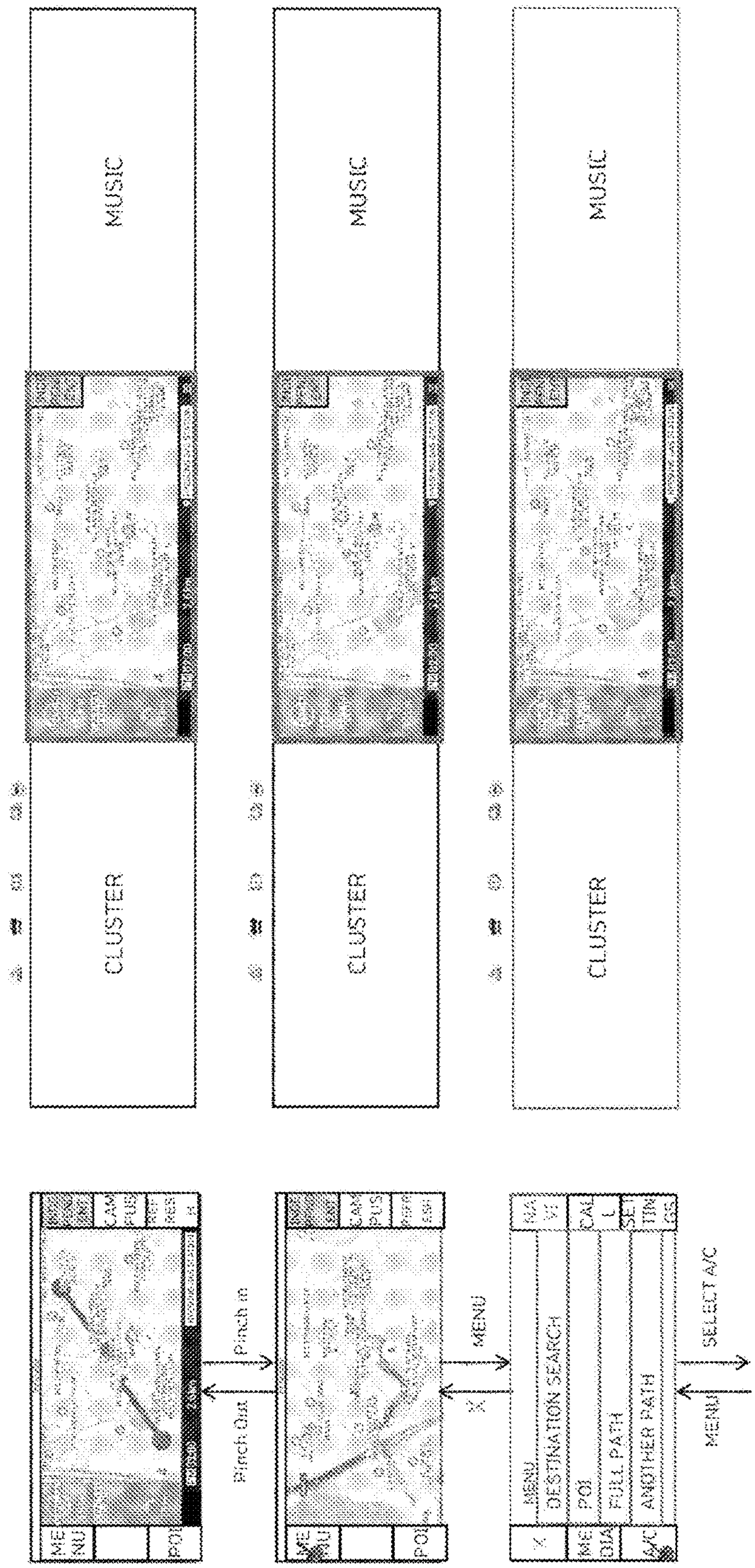
Figure 75:
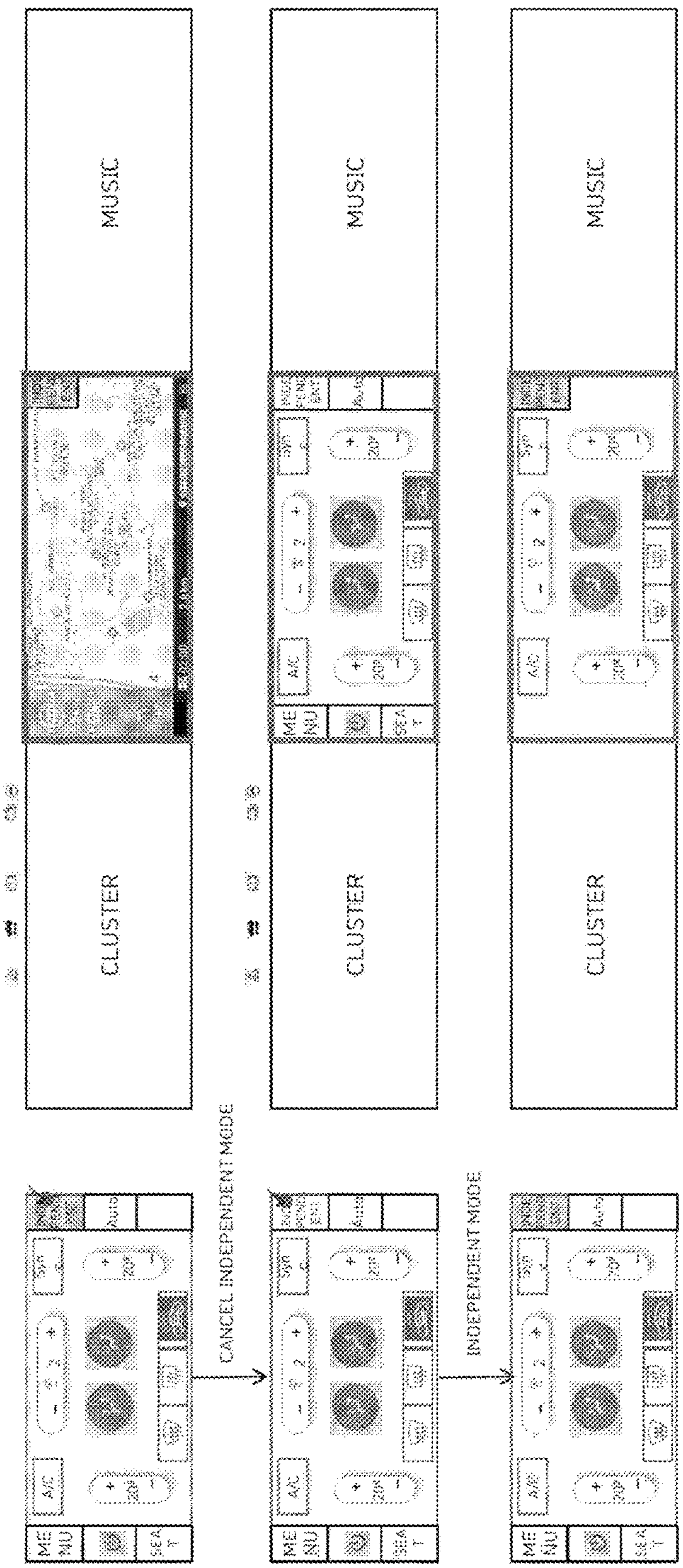

Referring to FIGS. 74 and 75, when the independent mode is set on the navigation screen of the mobile phone, pinch-in and pinch-out are performed only on the screen of the mobile phone.

When the menu button is pressed on the navigation screen on the mobile phone, the menu is displayed only on the screen of the mobile phone.

When the air conditioning button is pressed on the navigation screen of the mobile phone, the air conditioning screen is displayed only on the screen of the mobile phone, and the navigation screen is continuously displayed on an area App1 of the internal display.

When the independent mode is canceled, the current function screen of the mobile phone is mirrored and displayed on the area App1 of the internal display screen, and then focused.

During the independent mode, only the independent mode button is displayed on the internal display screen, and function-related buttons are not provided.

In the dependent mode, a function can be independently performed through the mobile phone, the display of information within the same function can be changed, and the function can be switched to another function through the menu, in order to set function/information.

When the independent mode is canceled, the function of the mobile phone is mirrored on the internal display in case that the function of the area where the independent mode has been performed is removed (navigation→air conditioning, as described above).

Figure 76:
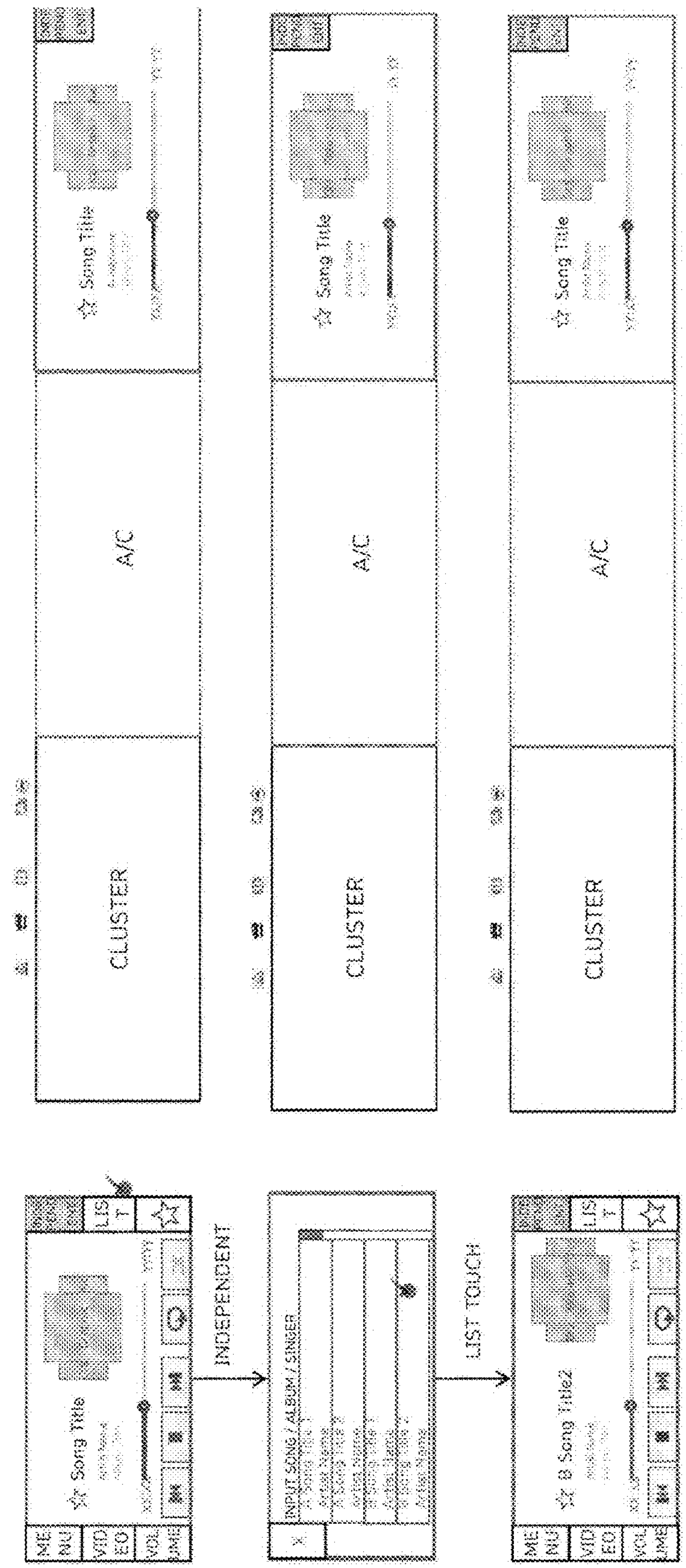

Referring to FIG. 76, a voice in the independent mode is connected to the function displayed on the internal display, and the mobile phone provides only the screen.

For example, when a user selects and plays another list in the mobile phone, music is not played in the mobile phone. When the user presses the independent button again in order to cancel the independent mode, the function/screen of the mobile phone is displayed on the internal display, and music is changed.

Figure 77:
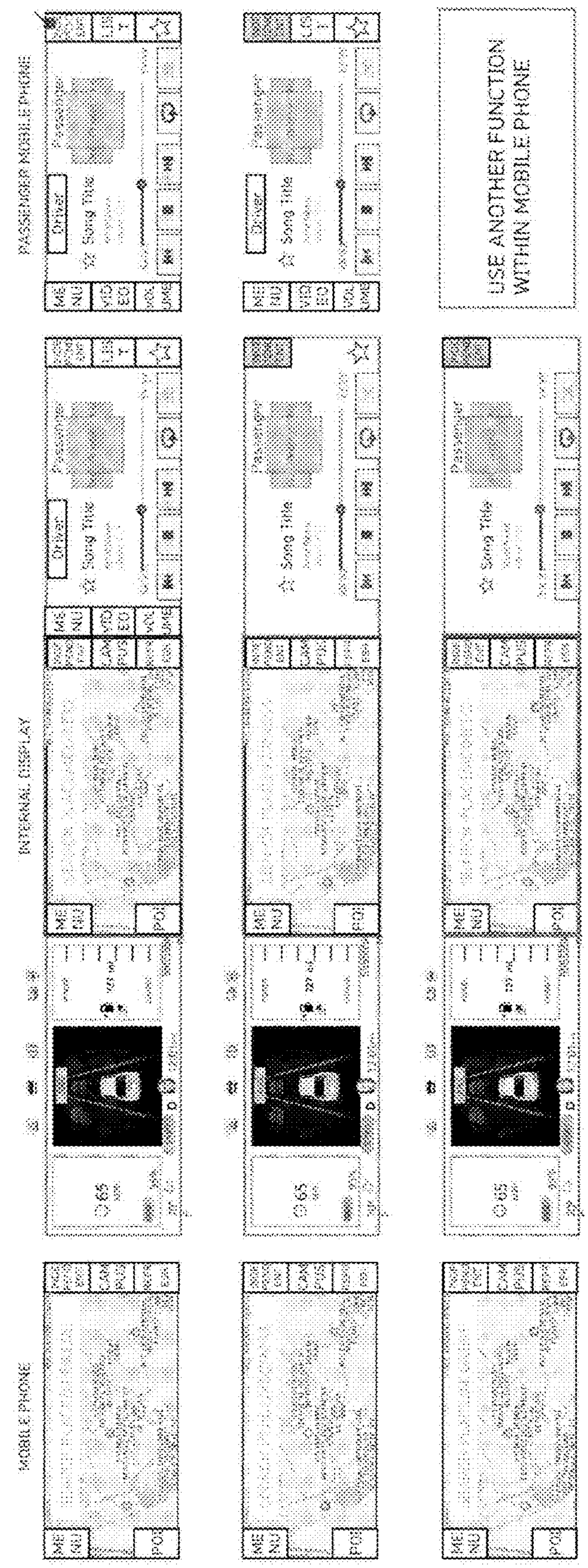

FIG. 77 illustrates an independent mode of a passenger mobile phone. When the independent mode is executed while the media screen is mirrored, the media screen within the internal display is maintained, and another function can be used through a mobile phone application.

When a passenger is seated on a passenger seat, a driver/passenger tab is provided. When no passenger is seated on the passenger seat, the corresponding tab is not displayed.

A vehicle information display apparatus in accordance with another further embodiment of the present disclosure includes an input unit configured to receive driving speed information of a vehicle, a memory configured to store a program for performing speed-based mobile phone screen control by using the driving speed information of the vehicle, and a processor configured to execute the program. The processor adjusts the transparency of an image or a size of a button displayed on the screen of the mobile phone screen according to the driving speed of the vehicle.

The processor adjusts the transparency levels of some areas displayed on the mobile phone screen according to the driving speed of the vehicle in consideration of a preset reference speed range. As the driving speed of the vehicle increases, the processor reduces or lowers the transparency levels.

The processor adjusts the sizes of buttons displayed on the mobile phone screen according to the driving speed of the vehicle in consideration of the preset reference speed range. As the driving speed of the vehicle increases, the processor increases the sizes of the buttons.

When it is checked that a user's hand approaches the mobile phone, the processor increases the sizes of the buttons.

A vehicle information display method in accordance with still another further embodiment of the present disclosure includes step (a) of receiving driving speed information of a vehicle and step (b) of adjusting at least one of the transparency and button size of the screen of a mobile phone mounted on a steering wheel, by using the driving speed information of the vehicle.

In step (b), the transparency levels of some areas displayed on the mobile phone screen are adjusted according to the driving speed information of the vehicle in consideration of a preset reference speed range. As the driving speed of the vehicle increases, the transparency levels are lowered.

In step (b), the sizes of buttons displayed on the mobile phone screen are adjusted according to the information on the driving speed of the vehicle in consideration of the preset reference speed range. As the vehicle speeds up, the button size is increased.

In step (b), when it is checked that a user's hand approaches the mobile phone, the button size is increased.

Figure 78:
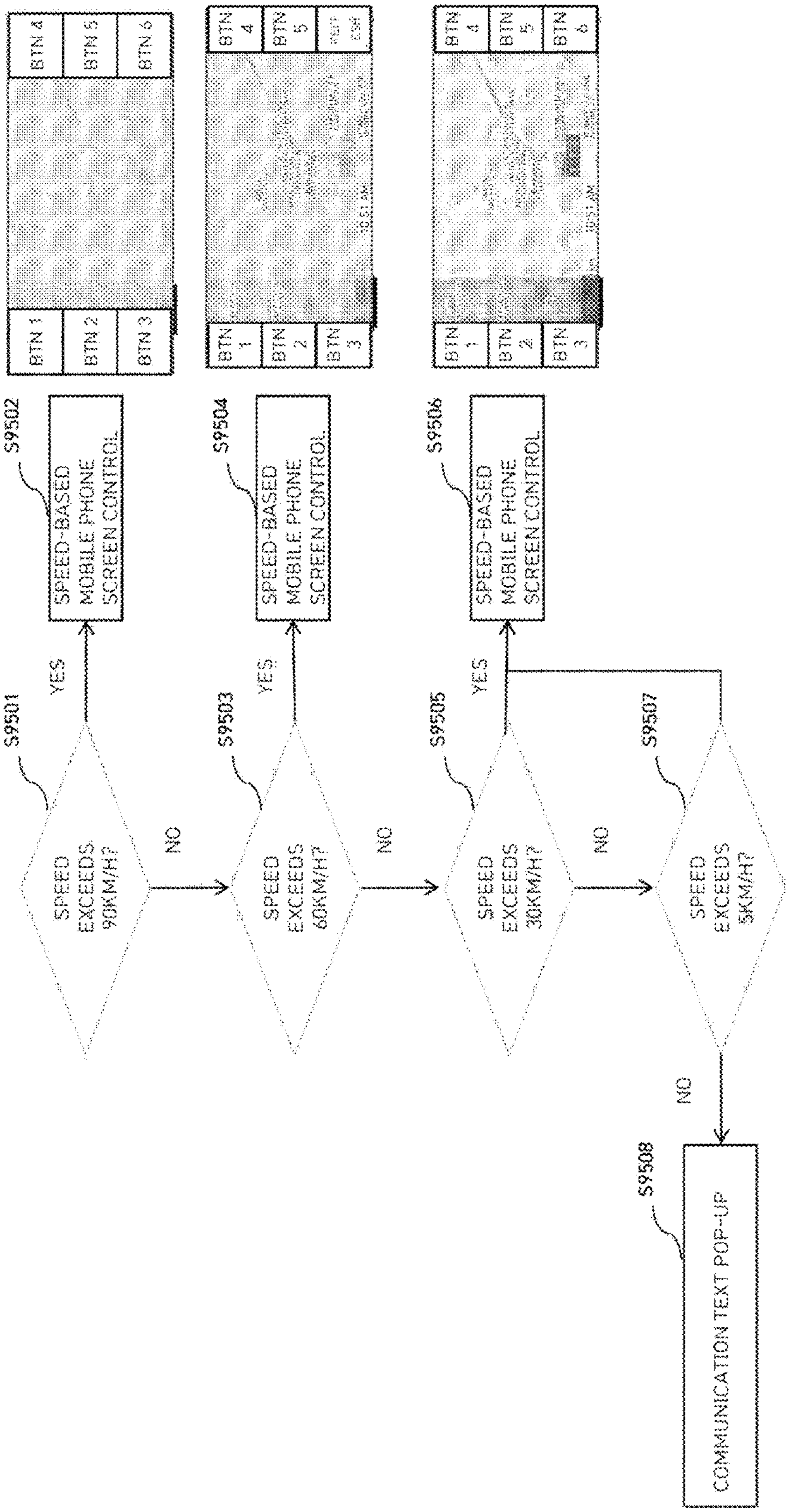
FIGS. 78 and 79 are diagrams illustrating examples in which mobile phone buttons for each driving speed are displayed in accordance with an embodiment of the present disclosure.
Figure 79:
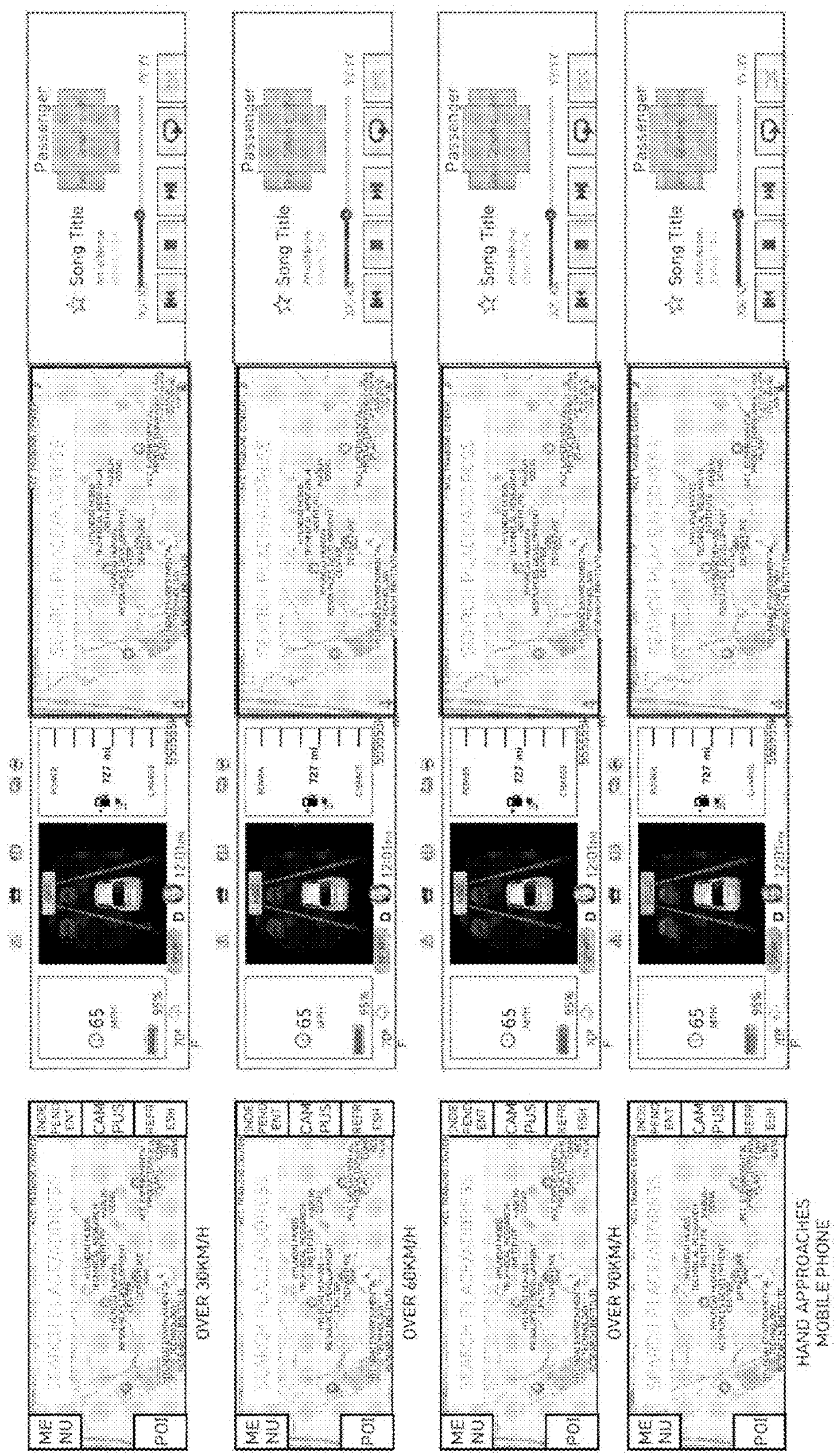

FIGS. 78 and 79 are a flowchart and diagram illustrating an example in which buttons of a mobile phone for each driving speed are displayed in accordance with an embodiment of the present disclosure.

Referring to FIG. 78, speed-based mobile phone screen control is performed according to the driving speed of the vehicle.

In FIG. 78, 90 km/h, 60 km/h, 30 km/h and 5 km/h are examples for promoting understandings of those skilled in the art, and the present disclosure is not limited thereto.

In step S9501, the processor checks whether the driving speed exceeds 90 km/h.

When the driving speed is 90 km/h, the processor sets the transparency of the navigation screen displayed on the mobile phone screen to a first level in step S9502.

In step S9503, the processor checks whether the driving speed exceeds 60 km/h.

When the driving speed exceeds 60 km/h and is equal to or less than 90 km/h, the processor sets the transparency of the navigation screen displayed on the mobile phone screen to a second level in step S9504.

In step S9505, the processor checks whether the driving speed exceeds 30 km/h.

When the driving speed exceeds 30 km/h and is equal to or less than 60 km/h, the processor sets the transparency of the navigation screen displayed on the mobile phone screen to a third level in step S9506.

In step S9507, the processor checks whether the driving speed exceeds 5 km/h.

When the driving speed exceeds 5 km/h and is equal to or less than 30 km/h, the processor sets the transparency of the navigation screen displayed on the mobile phone screen to the third level in step S9506.

When the driving speed is equal to or less than 5 km/h, the processor displays a communication text pop-up screen in step S9508, such that a user selects/inputs a text to be transferred to a pedestrian.

Referring to FIG. 79, the navigation screen displayed on a first area, i.e. the area App1 of the internal display is not varied but maintained. As the driving speed increases, the transparency of the navigation screen displayed on the mobile phone is lowered, or the navigation screen darkens.

When the user's hand approaches the mobile phone, the button size is changed and displayed according to the driving speed. As illustrated in FIG. 79, the sizes of a menu button, re-search button, POI button, independent mode button, compass button and refresh button are increased and displayed.

The vehicle information display method in accordance with the embodiment of the present disclosure may be implemented in a computer system or recorded into a recording medium. The computer system may include one or more processors, a memory, a user input device, a data communication bus, a user output device and a storage place. The above-described components perform data communication through the data communication bus.

The computer system may further include a network interface coupled to a network. The processor may be a CPU (Central Processing Unit) or a semiconductor device configured to process a command stored in the memory and/or storage place.

The memory and the storage place may include various types of volatile or nonvolatile storage media. For example, the memory may include a ROM and RAM.

Therefore, the vehicle information display method in accordance with the embodiment of the present disclosure may be implemented as a method which can be executed in the computer. When the vehicle information display method in accordance with the embodiment of the present disclosure is executed in a computer device, computer readable commands may perform the vehicle information display method in accordance with the present disclosure.

The vehicle information display method in accordance with the present disclosure may be implemented as computer readable codes in a computer readable recording medium. The computer readable recording medium includes all types of recording media capable of storing data which can be read by a computer system. Examples of the computer readable recording medium may include a ROM, RAM, magnetic table, magnetic disk, flash memory, optical data storage device and the like. Furthermore, the computer readable recording medium may be stored and executed as codes which can be distributed in computer systems connected through a computer communication network, and read in a distributed manner.

While various embodiments have been described above, it will be understood to those skilled in the art that the embodiments described are by way of example only. Accordingly, the disclosure described herein should not be limited based on the described embodiments.

What is claimed is:

1. A system for adjusting an image displayed on a screen of a mobile phone mounted on a steering wheel of a vehicle, the image including a map and one or more buttons, the system comprising:
- a processor; and
- a computer-readable medium in communication with the processor and storing instructions that, when executed by the processor, cause the processor to control the system to perform:
  - receiving driving speed information of a vehicle;
  - determining, based on the received driving speed information, whether the vehicle is speeding up;
  - in response to determining that the vehicle is speeding up, performing:
    - decreasing a transparency of the map included in the image displayed on the screen of the mobile phone mounted on the steering wheel of the vehicle; and
    - increasing a size of the one or more buttons included in the image displayed on the screen of the mobile phone mounted on the steering wheel of the vehicle,
  - determining, based on the received driving speed information, whether the vehicle has slowed down such that a driving speed of the vehicle does not exceed a predetermined speed; and
  - in response to determining that the driving speed of the vehicle does not exceed the predetermined speed, displaying a communication text pop-up screen for selecting or inputting a text to be transferred to a pedestrian.

2. The system of claim 1, wherein the instructions, when executed by the processor, further cause the processor to control the system to perform:
- detecting whether a user's hand is approaching the mobile phone mounted on the steering wheel of the vehicle; and
- in response to detecting that the user's hand is approaching the mobile phone mounted on the steering wheel of the vehicle, increasing the size of a button one or more buttons included in the image displayed on the screen of the mobile phone mounted on the steering wheel of the vehicle.

3. A method of adjusting an image displayed on a screen of a mobile phone mounted on a steering wheel of a vehicle, the image comprising a map and one or more buttons, the method comprising:
- receiving driving speed information of a vehicle;
- determining, based on the received driving speed information, whether the vehicle is speeding up;
- in response to determining that the vehicle is speeding up, performing:
  - decreasing a transparency of the map included in the image displayed on the screen of the mobile phone mounted on the steering wheel of the vehicle; and
  - increasing a size of a button one or more buttons included in the image displayed on the screen of the mobile phone mounted on the steering wheel of the vehicle;
- determining, based on the received driving speed information, whether the vehicle has slowed down such that a driving speed of the vehicle does not exceed a predetermined speed; and
- in response to determining that the driving speed of the vehicle does not exceed the predetermined speed, displaying a communication text pop-up screen for selecting or inputting a text to be transferred to a pedestrian.

4. The method of claim 3, further comprising:
- detecting whether a user's hand is approaching the mobile phone mounted on the steering wheel of the vehicle; and
- in response to detecting that the user's hand is approaching the mobile phone mounted on the steering wheel of the vehicle, increasing the size of one or more buttons included in the image displayed on the screen of the mobile phone mounted on the steering wheel of the vehicle.

* * * * *